INVENTOR.
Joseph F. Byrne
BY W. L. Stout
HIS ATTORNEY

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 3

INVENTOR.
Joseph F. Byrne.
BY W. L. Stout.
HIS ATTORNEY

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 7

INVENTOR.
Joseph F. Byrne
BY W. L. Stout.
HIS ATTORNEY

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 8

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 9

INVENTOR
Joseph F. Byrne.
BY W. L. Stout.

INVENTOR.
Joseph F. Byrne
BY W. L. Stout.
HIS ATTORNEY

INVENTOR.
Joseph F. Byrne
BY
W. L. Stout
HIS ATTORNEY

INVENTOR.
Joseph F. Byrne
BY W. L. Stout
HIS ATTORNEY

INVENTOR.
Joseph F. Byrne.
BY W. L. Stout.
HIS ATTORNEY

INVENTOR.
Joseph F. Byrne.
BY W. L. Stout.
HIS ATTORNEY

INVENTOR.
Joseph F. Byrne.
BY W. L. Stout.
HIS ATTORNEY

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 17

INVENTOR.
Joseph F. Byrne
BY W. L. Stout.
HIS ATTORNEY

INVENTOR.
Joseph F. Byrne
BY W. L. Stout
HIS ATTORNEY

INVENTOR.
Joseph F. Byrne
BY W. L. Stout
HIS ATTORNEY

INVENTOR.
Joseph F. Byrne
BY W. L. Stout
HIS ATTORNEY

INVENTOR.
Joseph F. Byrne
BY W. L. Stout
HIS ATTORNEY

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 26

INVENTOR.
Joseph F. Byrne
BY W. L. Stout
HIS ATTORNEY

INVENTOR.
Joseph F. Byrne
BY W. L. Stout
HIS ATTORNEY

INVENTOR.
Joseph F. Byrne
BY W. L. Stout
HIS ATTORNEY

INVENTOR.
Joseph F. Byrne.
BY W. L. Stout
HIS ATTORNEY

INVENTOR.
Joseph F. Byrne.
BY W. L. Stout
HIS ATTORNEY

INVENTOR.
Joseph F. Byrne.
BY W. L. Stout.
HIS ATTORNEY

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 36

INVENTOR.
Joseph F. Byrne
BY
W. L. Stout.
HIS ATTORNEY

July 30, 1963 J. F. BYRNE 3,099,742

DIGITAL FLOW COMPUTER EMPLOYING A LOGARITHMIC MODE OF COMPUTATION

Filed March 13, 1959 37 Sheets-Sheet 37

United States Patent Office 3,099,742

Patented July 30, 1963

3,099,742

DIGITAL FLOW COMPUTER EMPLOYING A LOGARITHMIC MODE OF COMPUTATION

Joseph F. Byrne, O'Hara Township, Allegheny County, Pa., assignor to Westinghouse Air Brake Company, Wilmerding, Pa., a corporation of Pennsylvania Filed Mar. 13, 1959, Ser. No. 799,155
27 Claims. (Cl. 235—150)

This invention relates to a flow computer employing a logarithmic mode of computation, and in particular to an improved modulator binary digital computing system.

For the control of industrial systems and processes, as well as for telemetering and indication, it is frequently desirable to employ quantities which are derived from the measurement of a plurality of other quantities, and which must be available substantially on a real-time basis. For example, in the remote control of pipe-line pumping stations, it is desirable to indicate from time to time at a central office location the flow of gas through a pipe line at a field location. Since the flow is not available directly, but only in terms of measurements made, for example, around a metering orifice, the value of the flow must be computed from the measurements before it can be indicated to an operator or employed as a control variable.

The various computing means known to the art may conveniently be divided into analog and digital systems, depending on whether they employ continuous or quantized information, respectively. These systems may further be subdivided into serial or parallel operating systems, depending on whether they produce outputs substantially coincident with their inputs, or whether they sequence the inputs to the system and only obtain an output after the last input has been received.

Analog devices as a class are highly useful in many applications. However, in general they require moving parts such as servomotor shafts, which inherently limit their life and reliability. Further, as increasingly higher accuracy is required of such systems, their cost increases disproportionately. It is generally uneconomical or physically impossible to carry the accuracy of analog equipment beyond a certain point, usually on the order of 1/10 of 1 percent. On the other hand, while known digital computers have no inherent accuracy limitations, for purposes such as the example described above, they are generally uneconomically complex; or, is serially operated, they are too slow.

It is a primary object of my present invention to provide a digital computing system which will be simple and economical, which will have any desired accuracy, which will have a cost substantially linearly related to the desired accuracy, and which will operate substantially in real time on an on-line, parallel-input basis.

It is a further object of my invention to provide a digital computer in which multiplication, division, and power and root processes are carried out by logarithmic means.

It is a further object of my invention to provide a modular digital computing system containing a relatively small number of basic modules which may be arranged in any desired manner to carry out any of the calculations encountered in mathematics or in industrial processes or sytsems.

It is a further object of my invention to provide apparatus for generating logarithms to the base 2.

It is a further object of my invention to provide an improved gas flow computer for indicating the flow through a plurality of pipes in response to measurements made around an orifice in one of the pipes.

It is a further particular object of my invention to provide an improved translation circuit for translating information expressed in weighted binary code to decimal binary code.

It is a further particular object of my invention to provide improved means for translating information expressed in decimal binary code to weighted binary code.

It is a further particular object of my invention to provide an improved relay subtraction circuit.

It is a further particular object of my invention to provide an improved relay adder circuit.

It is a further object of my invention to provide circuits for digital addition which operate on the parallel input principle and which require relatively simple apparatus.

It is a further object of my invention to provide a digital addition circuit which is modular in nature and which can be extended to handle any number of input digits without need for the design of additional circuits.

It is a further object of my invention to provide an improved modular digital adder for use with numerical information expressed in the well-known binary code.

A further object of my invention is to provide a simplified circuit for generating the binary logarithm of a binary number less than 10.

Other objects and further advantages of my invention will become apparent to those skilled in the art as the description proceeds.

In practicing my invention, I provide a number of modules determined by the problem at hand, which will, when properly interconnected, supply an output in accordance with any desired function or functions of a group of applied inputs. Where the problem at hand requires multiplication, division, power or root processes, or processes which can be represented by such processes, these modules include modules for generating logarithms to the base 2 of an applied binary signal. Where addition or multiplication, or the equivalent is involved, I provide modules for adding binary numbers connected to the outputs of two logarithmic generating modules to generate the logarithm of the product. Where subtraction or division processes, or their equivalents, are involved, I provide subtraction modules for subtracting binary numbers; for example, for subtracting two binary logarithms to get the binary logarithm of the quotient. Where processes involving constant powers or roots are involved, and where these powers or roots are even, I provide means for register-shifting the binary logarithm of the number to get the binary logarithm of the desired power or root. Where odd powers or roots are involved, I may use additional logarithm generators to produce the logarithms of logarithms so that the processes may be reduced to multiplication and division processes, but where it is convenient to do so, I prefer to treat an odd power or root as a multiplication by one or more even powers or roots.

I further provide modules for generating the antilogarithms of numbers. Where it is convenient to employ inputs or outputs in some form other than weighted binary, I employ special code translation modules.

In constructing a logarithm generating module in accordance with my invention, I employ means, such as relays or the like, for registering a number in binary form, means, such as circuits controlled by contacts operated by the registering means, or the like, for generating the characteristic of the binary logarithm of the number, and means, such as circuits controlled by contacts operated by the registering means, or the like, for generating the approximate mantissa of the logarithm of the number. Where accuracy so requires, I provide modules controlled by the approximate mantissa for generating a correction factor which corrects the approximate mantissa of the derived logarithm to any desired precision.

In constructing an anti-logarithm generator in accordance with my invention, I provide means controlled by the mantissa of the logarithm for generating the binary sequence of digits in the anti-logarithm, and means controlled by the characteristic of the logarithm for properly registering the sequence of digits obtained from the mantissa. Where accuracy so requires, I provide a module for generating a correction factor for correcting the anti-logarithm derived from the mantissa to any desired precision.

In constructing the adder module of my invention, I provide a series of unit modules for registering the digits of the numbers to be added, each module comprising a differential relay or the like. Contacts of these relays are interconnected, in a manner to be described, to generate the sum of the digits so registered. I also provide means for applying to the register modules the negative truth values of one of the input variables, and means are provided in the modules for generating the negative truth values of the output sum.

In constructing the subtracter of my invention, I provide a series of differential relay registering modules similar to those employed in the adder modules. Contacts of the subtracter modules are, however, so connected as to generate the truth and negative values of the difference of the applied inputs.

In constructing translator circuits in accordance with my invention, I provide a series of registers, such as relays or the like, for the binary digits of information expressed in a first code, and employ contacts actuated by these registers and connected as will be described to control circuits, in accordance with the information applied to the input, so that the output is expressed in a second desired code.

In constructing the simplified logarithm generator of my invention, I provide a series of register relays for registering certain digits of a binary number less than 10, and contacts controlled by these relays and interconnected in a manner to be described to generate the binary logarithm of the applied number.

In constructing a flow computer, in accordance with the preferred embodiment of my invention, which is adapted to compute the flow of fluid through a series of parallel pipes, one of which is supplied with a metering orifice having pressure transducers connected above and below the orifice, I provide the following equipment: First, means for translating static pressure S above the orifice, and the differential pressure D across the orifice, as measured by the transducers, to weighted binary code, means for supplying an orifice constant C characterizing the performance of the orifice in binary code, and means for supplying a number N, indicating the number of parallel pipes which are open, in binary code. For each of the inputs, I provide logarithmic generating modules. In accordance with the particular embodiment of my invention to be described, flow is computed in accordance with the equation $Q=CN\sqrt{D(S+15)}$. Accordingly, I modify the module for translating the static pressure S into binary code such that it provides the binary equivalent of $S+15$ instead of S. I provide means for adding the logarithms of D and $S+15$, means for adding the logarithms of C and N, and means for adding the logarithm of CN to the register shifted logarithm of $D(S+15)$ to generate the logarithm of Q. To economize on circuitry, I introduce factors of multiples of 10, in a manner to be described, and provide means for subtracting the logarithm of any fractional power of 10 which may remain in the logarithm of the answer as the result of this multiplacation. I further provide an anti-logarithm generator for converting the logarithm of the answer Q to Q, and means for translating the answer to decimal binary code. In addition, I provide means for shifting the registers of the answer in accordance with the inputs and to cancel the effects of the powers of 10 introduced for convenience in the computation process.

The details of the above described structure will become clear, and additional details and features will be made apparent, as the description proceeds.

I shall first describe various embodiments of my invention in detail, and shall then point out the novel features thereof in claims.

In the detailed description of the several embodiments of my invention, a conventional D.C. power source, not shown, is schematically indicated by the terminals designated B and N, corresponding, respectively, to the positive and negative terminals of a battery.

The several embodiments of my invention to be described will best be understood by reference to the drawings, in which.

Figure 5A:
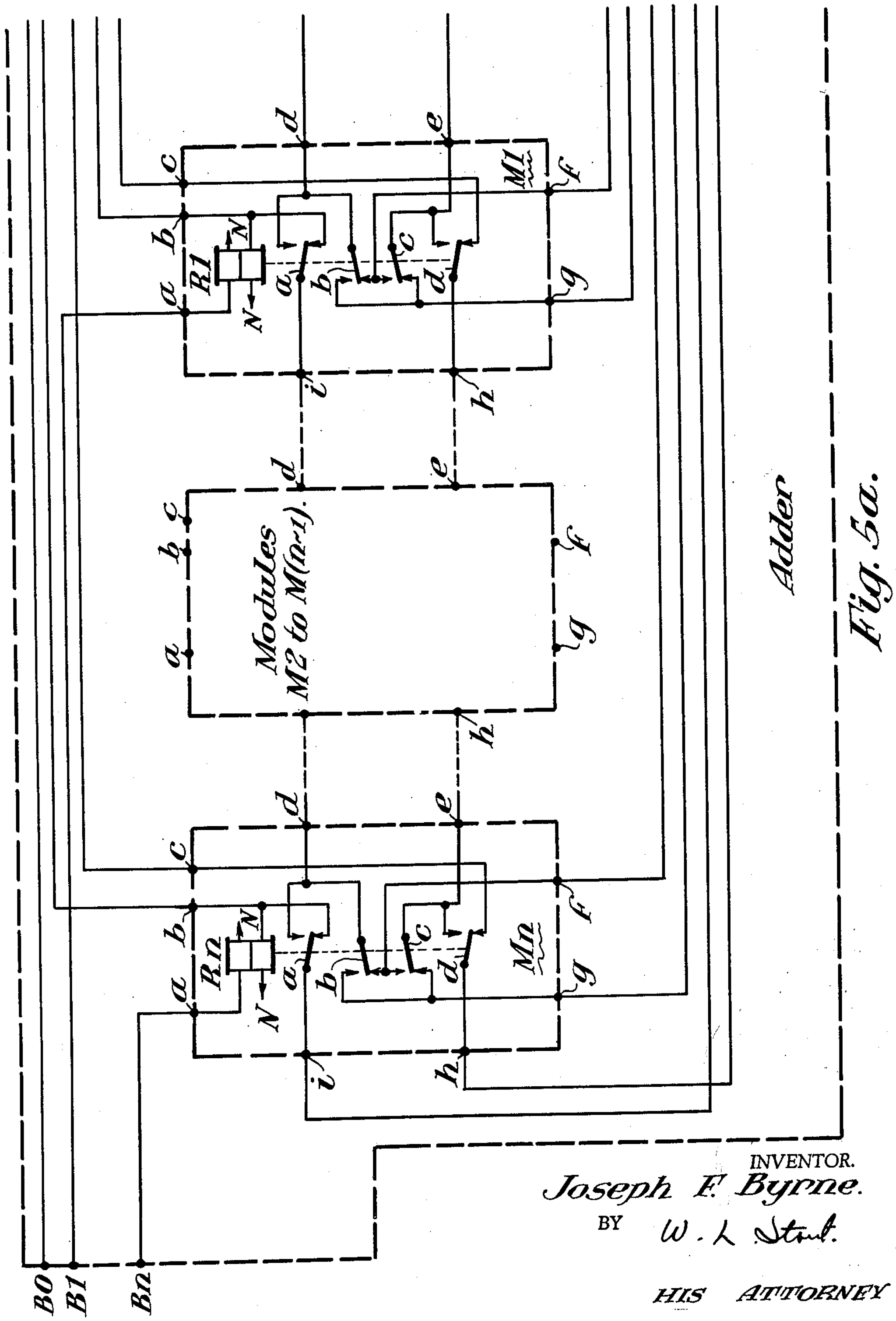
Figure 5B:
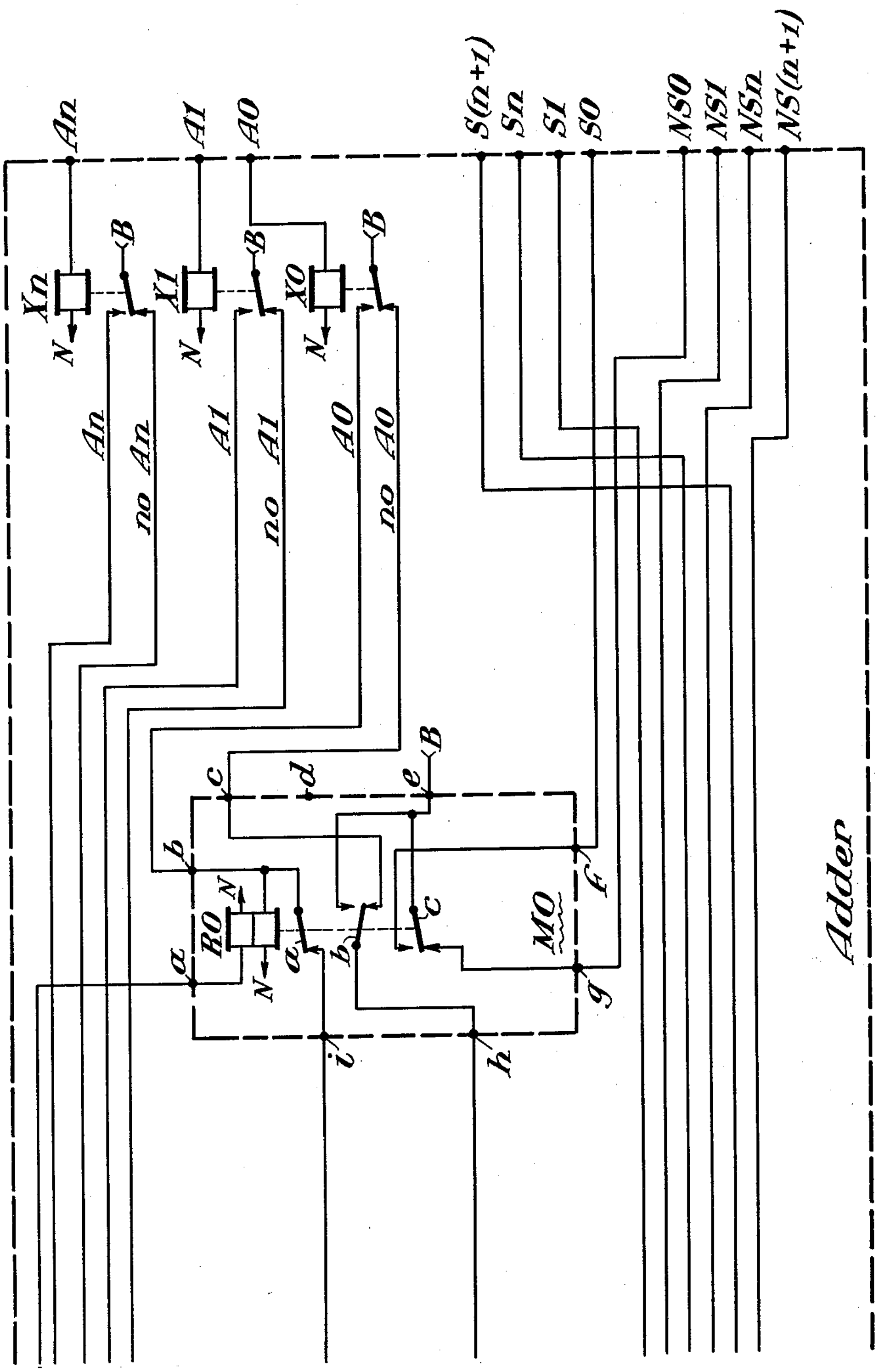
Figure 6A:
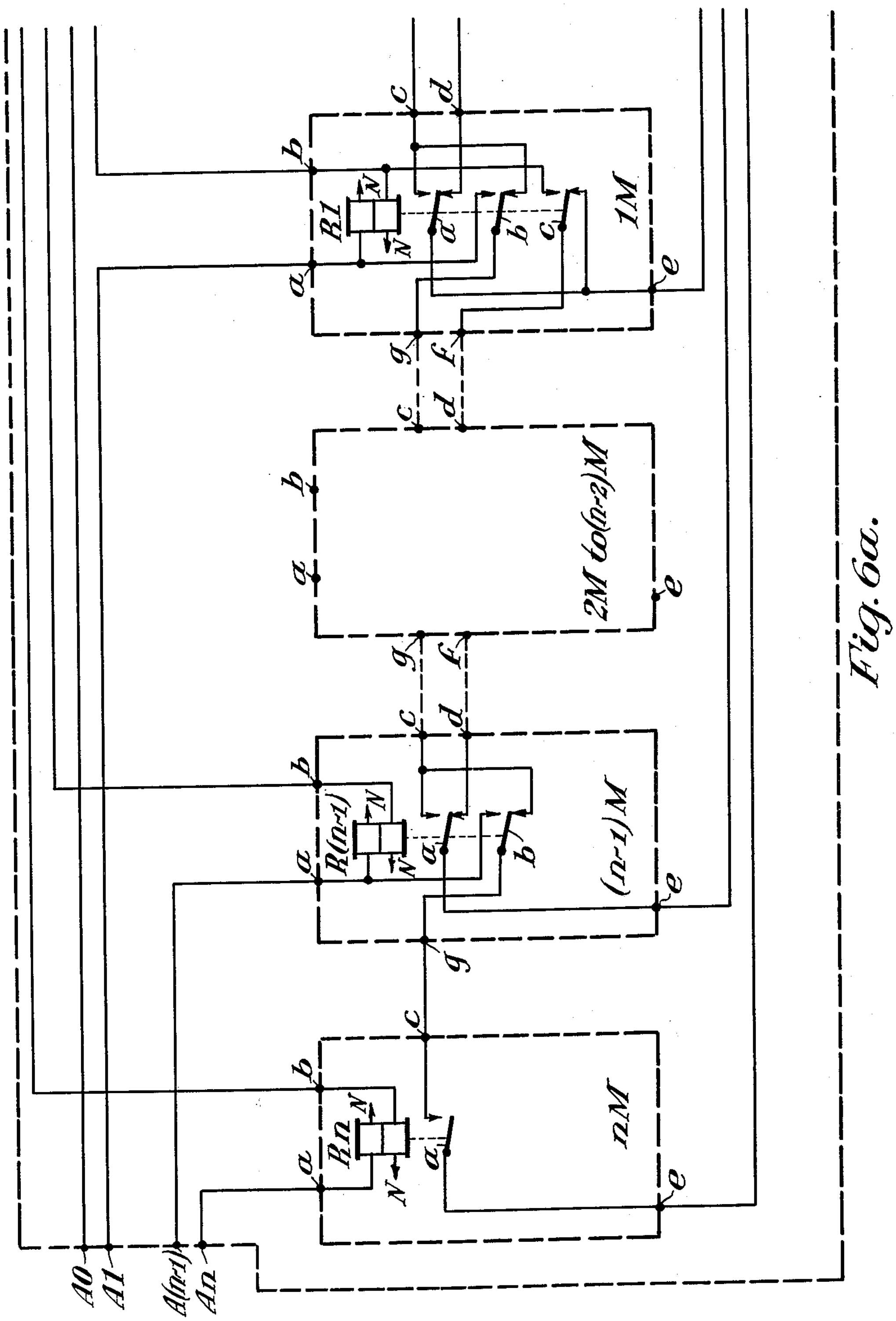
Figure 6B:
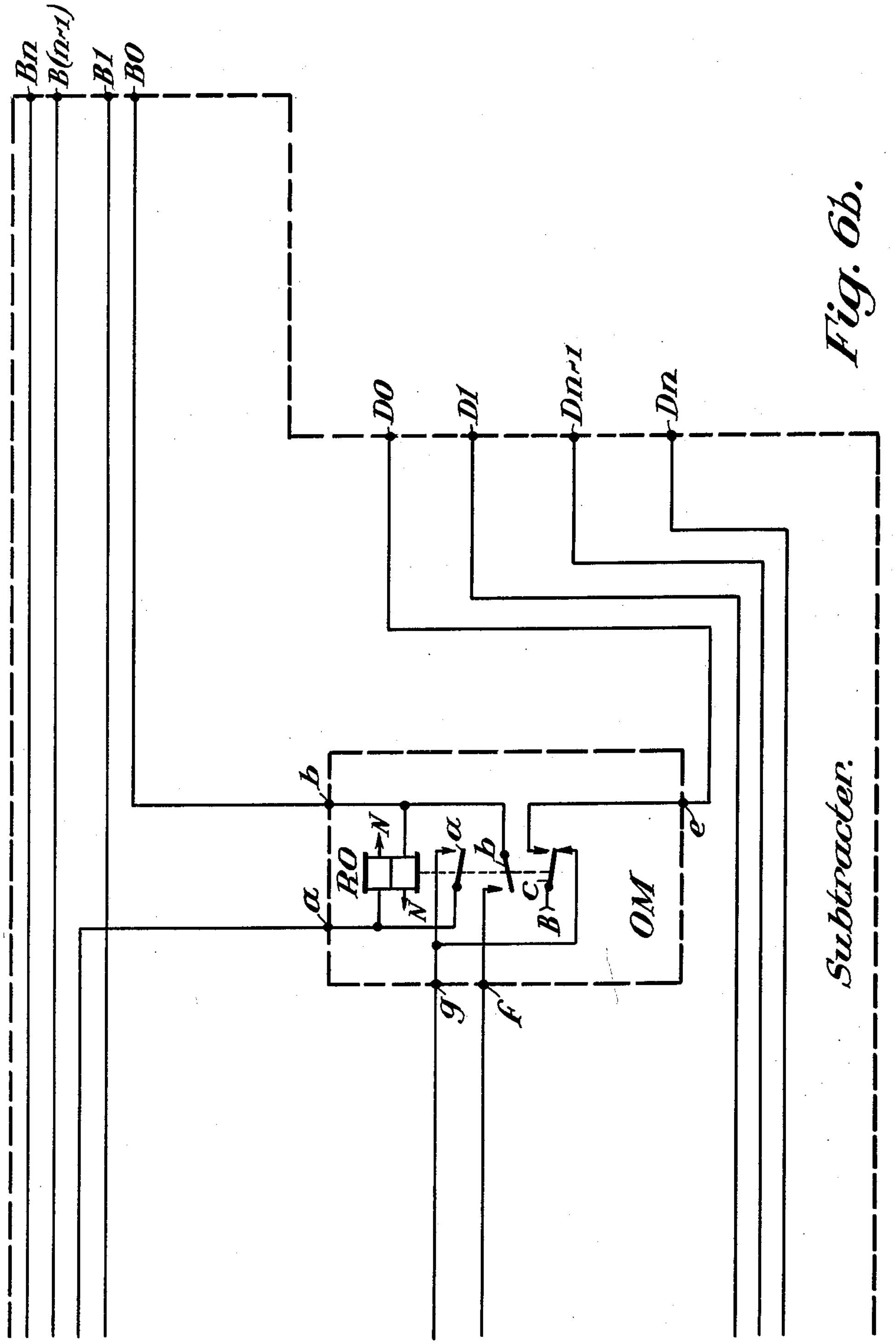
Figure 7:
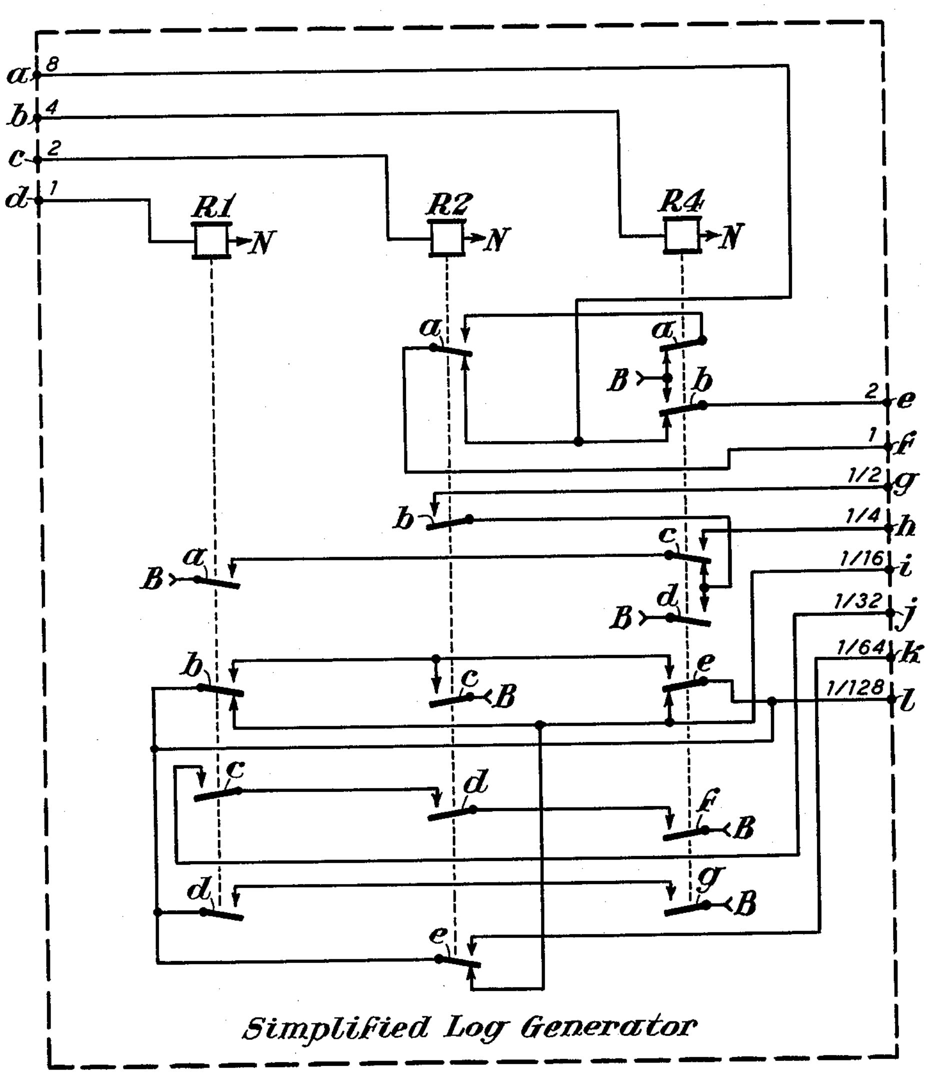
Figure 8A:
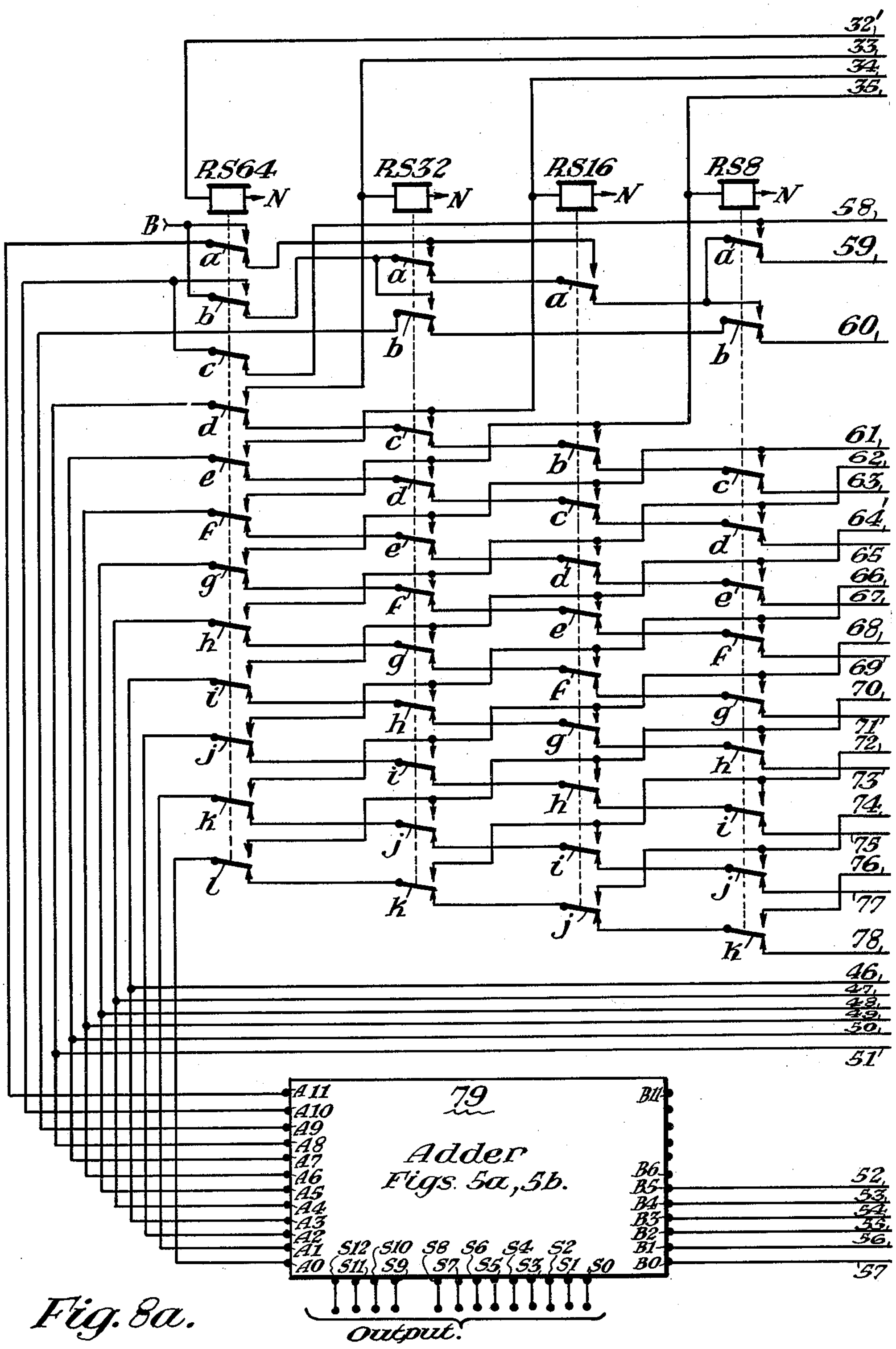
Figure 8B:
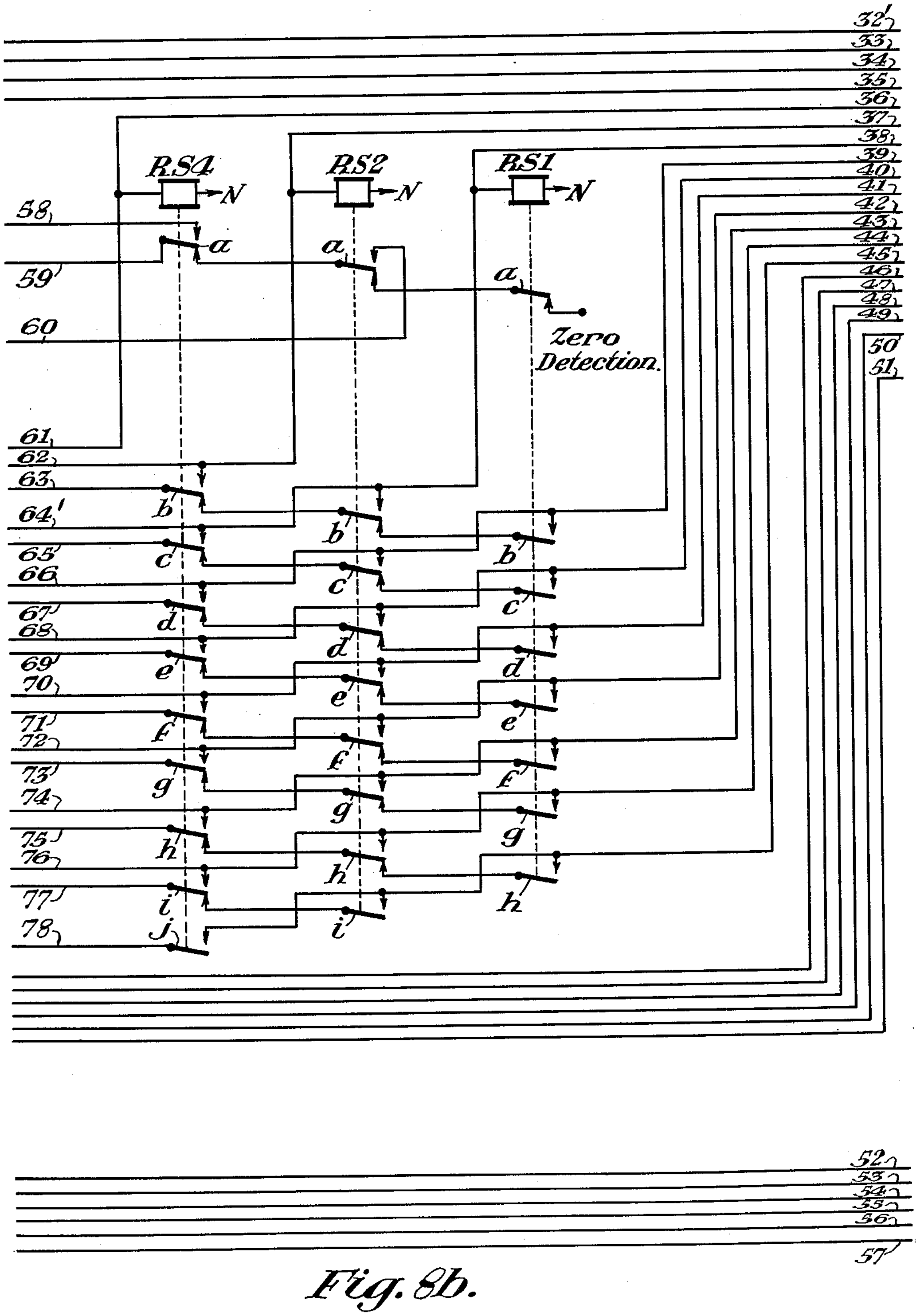
Figure 8C:
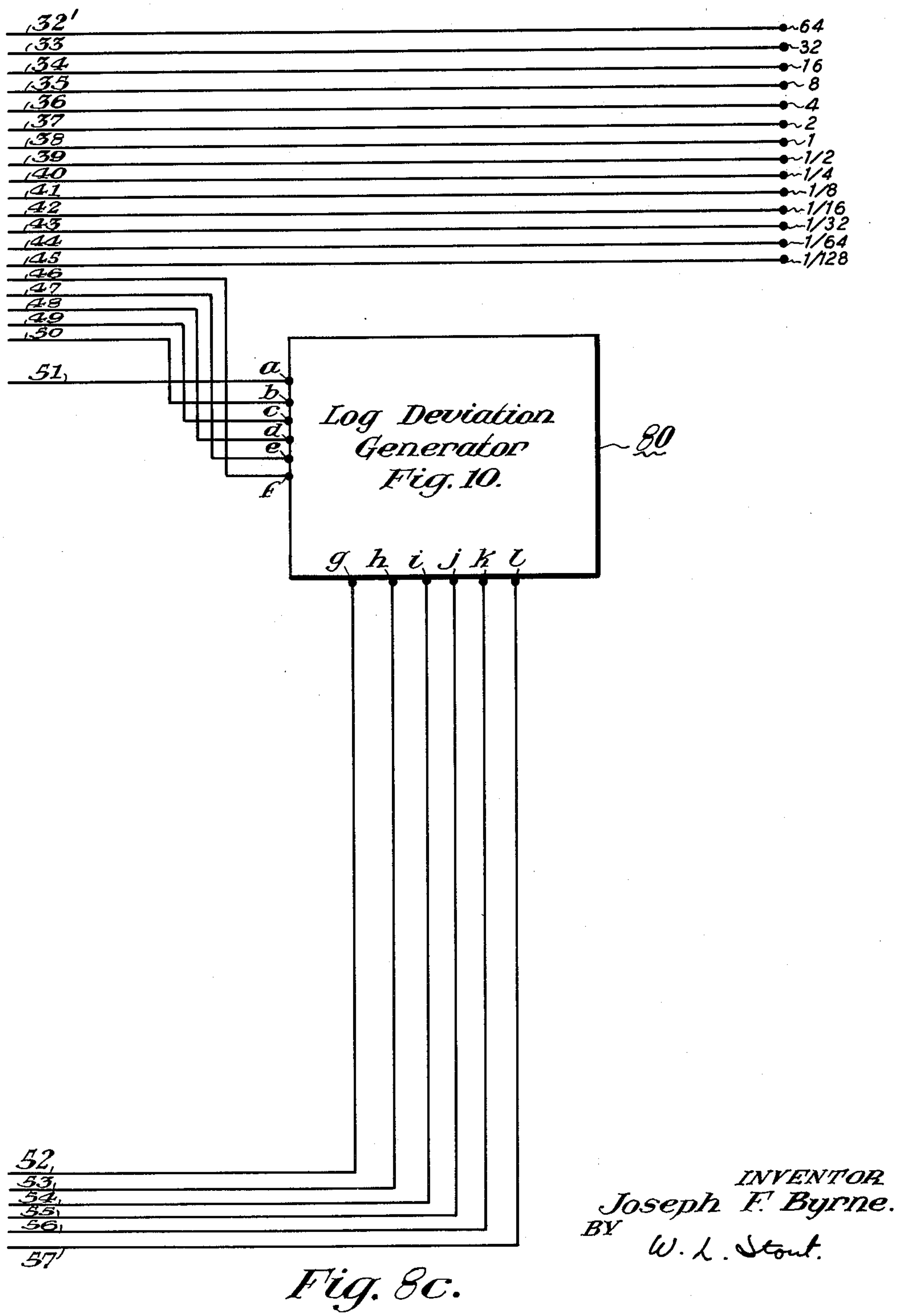
Figure 9A:
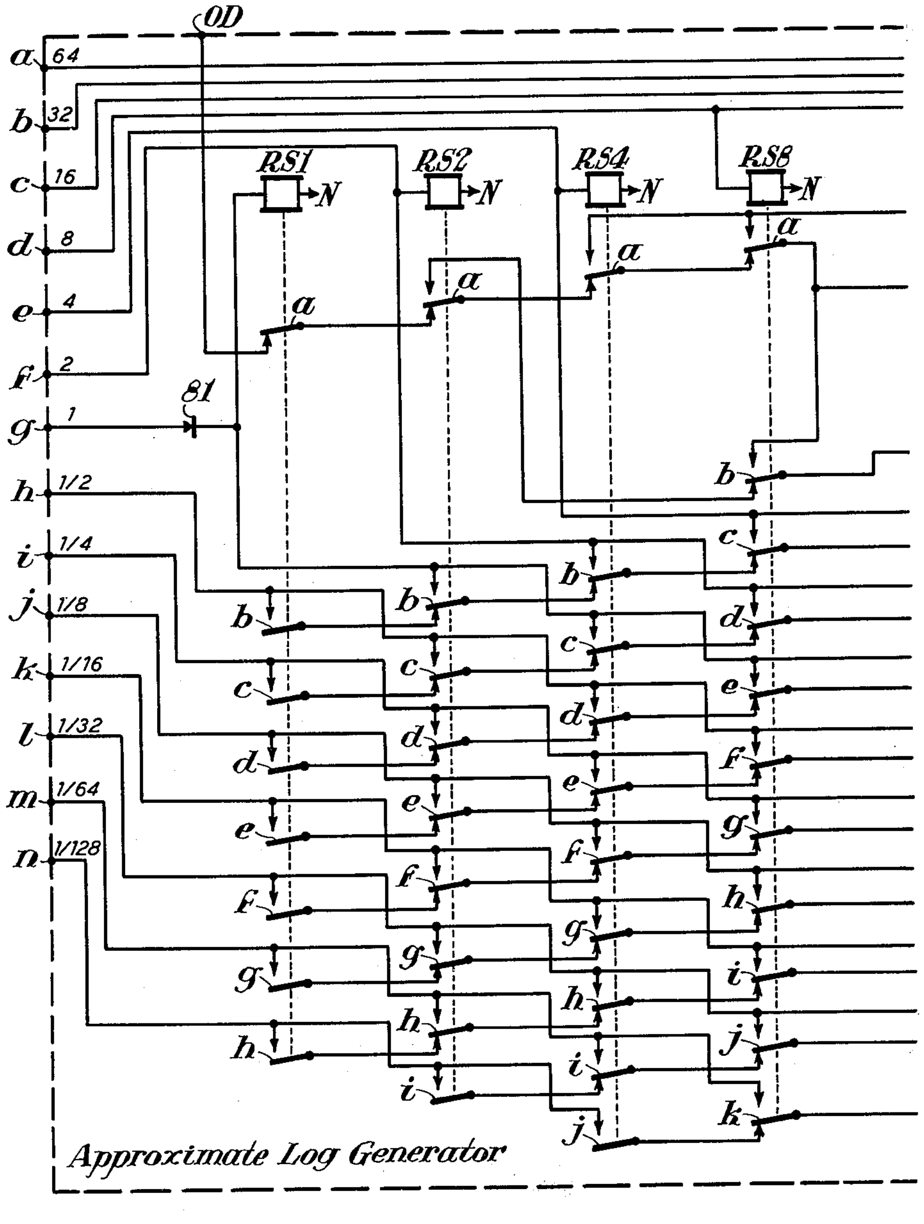
Figure 9B:
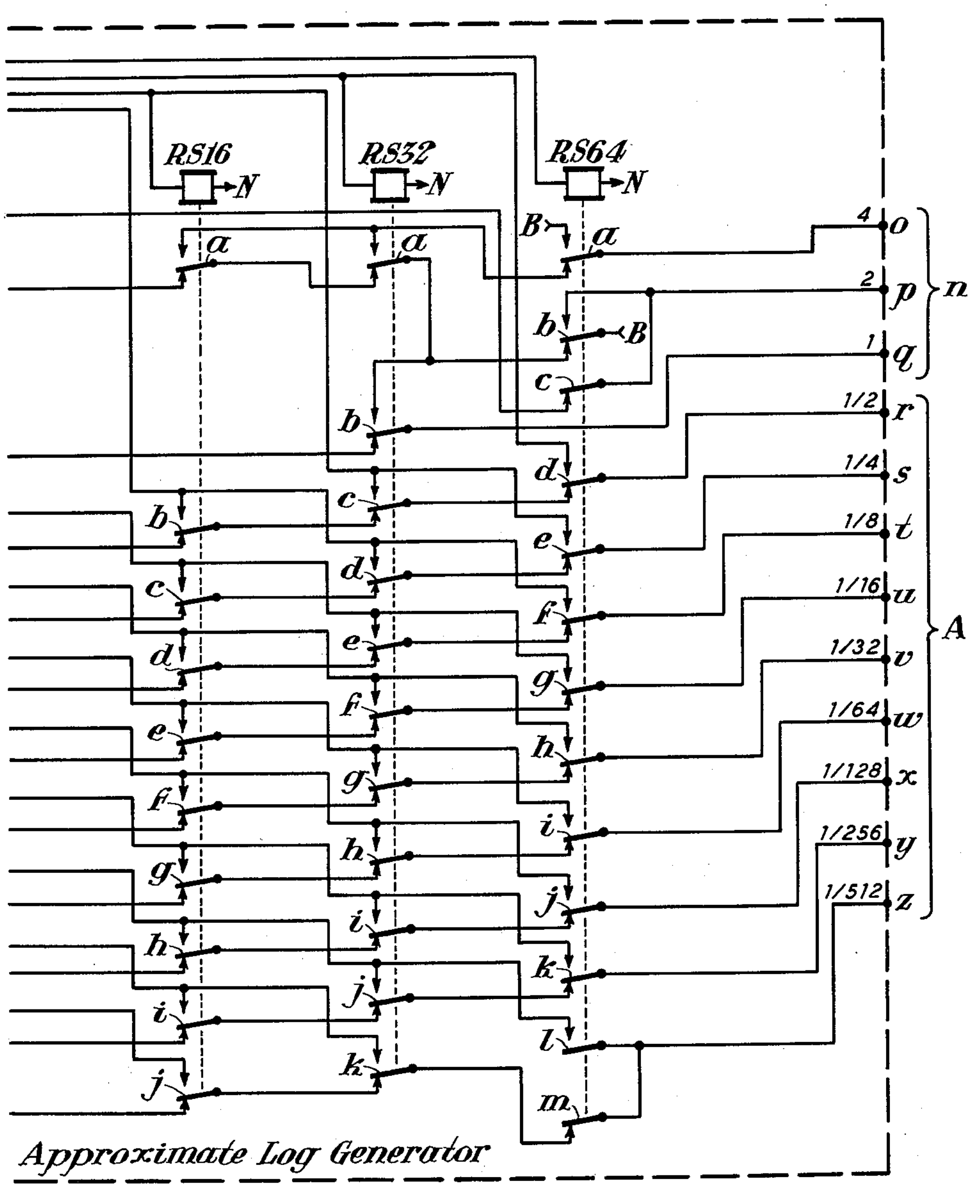
Figure 10:
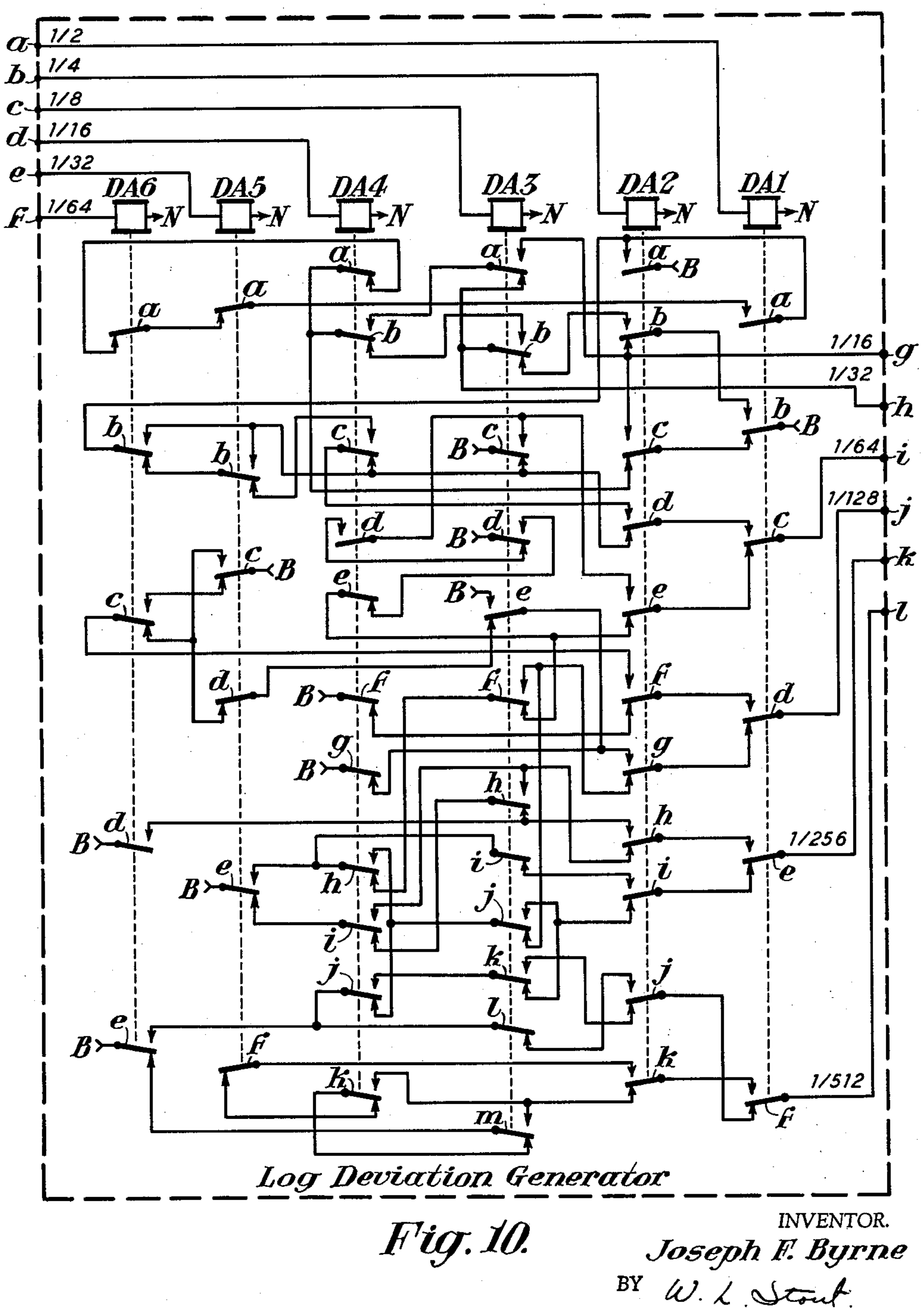
Figure 11A:
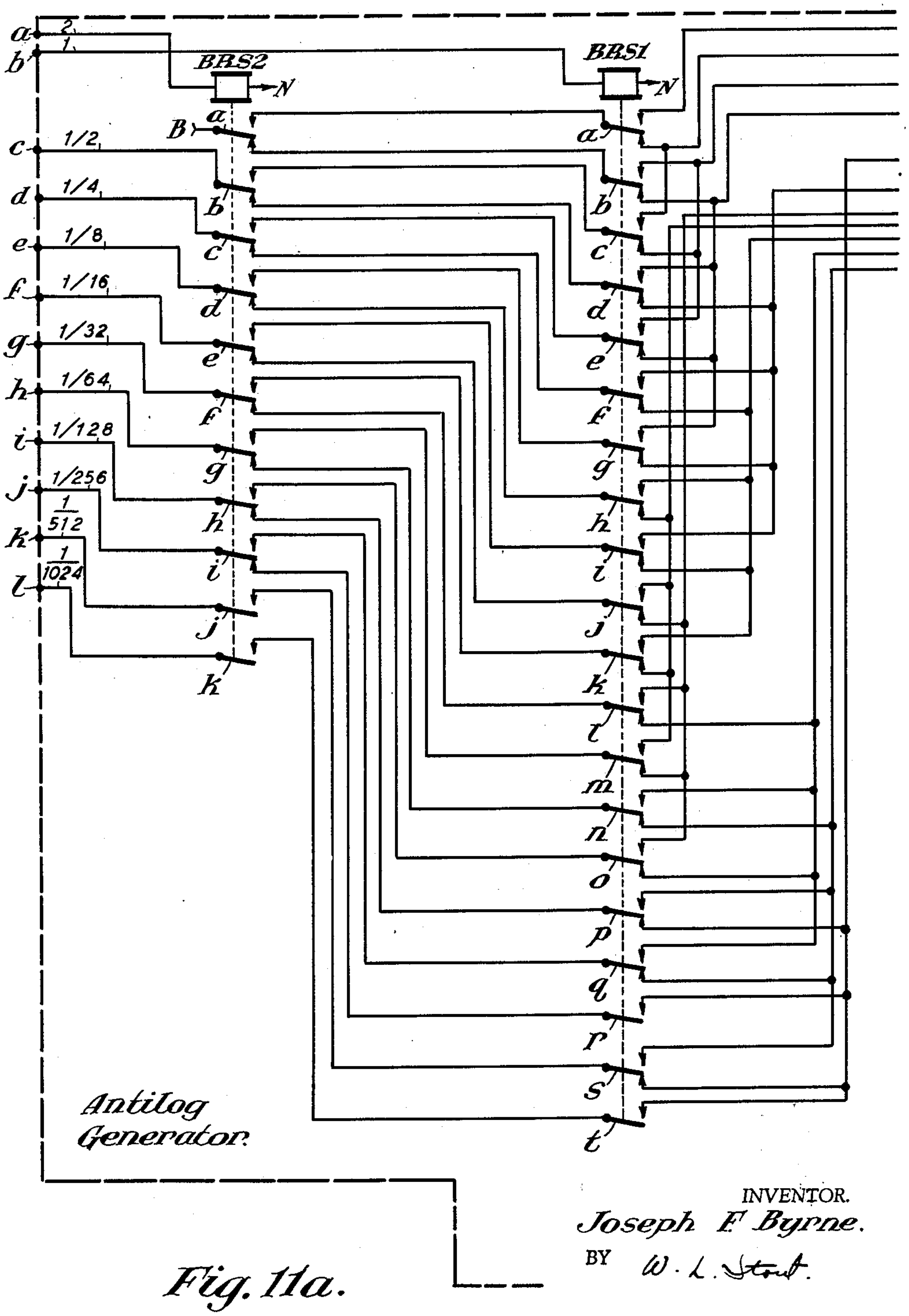
Figure 11B:
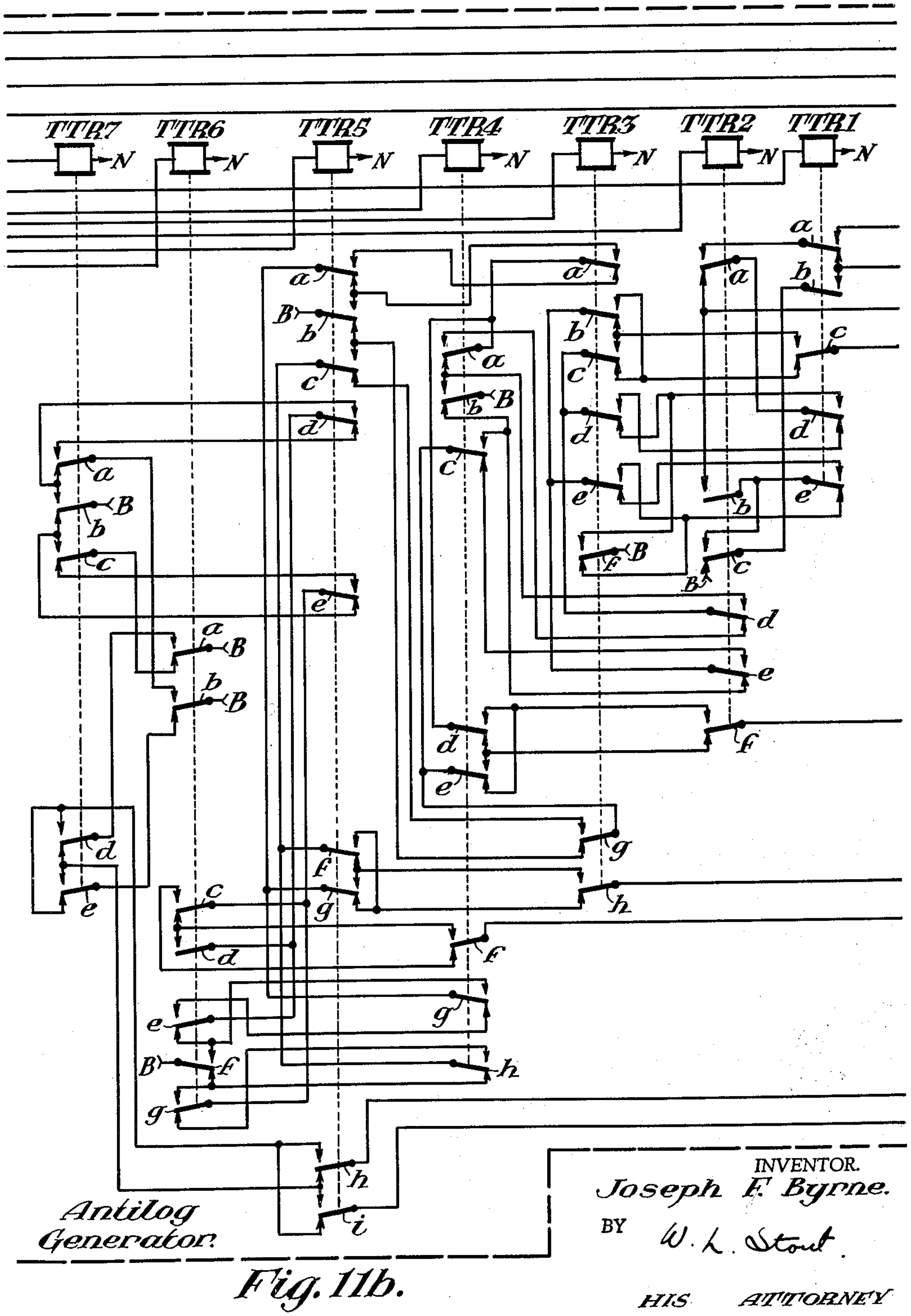
Figure 11C:
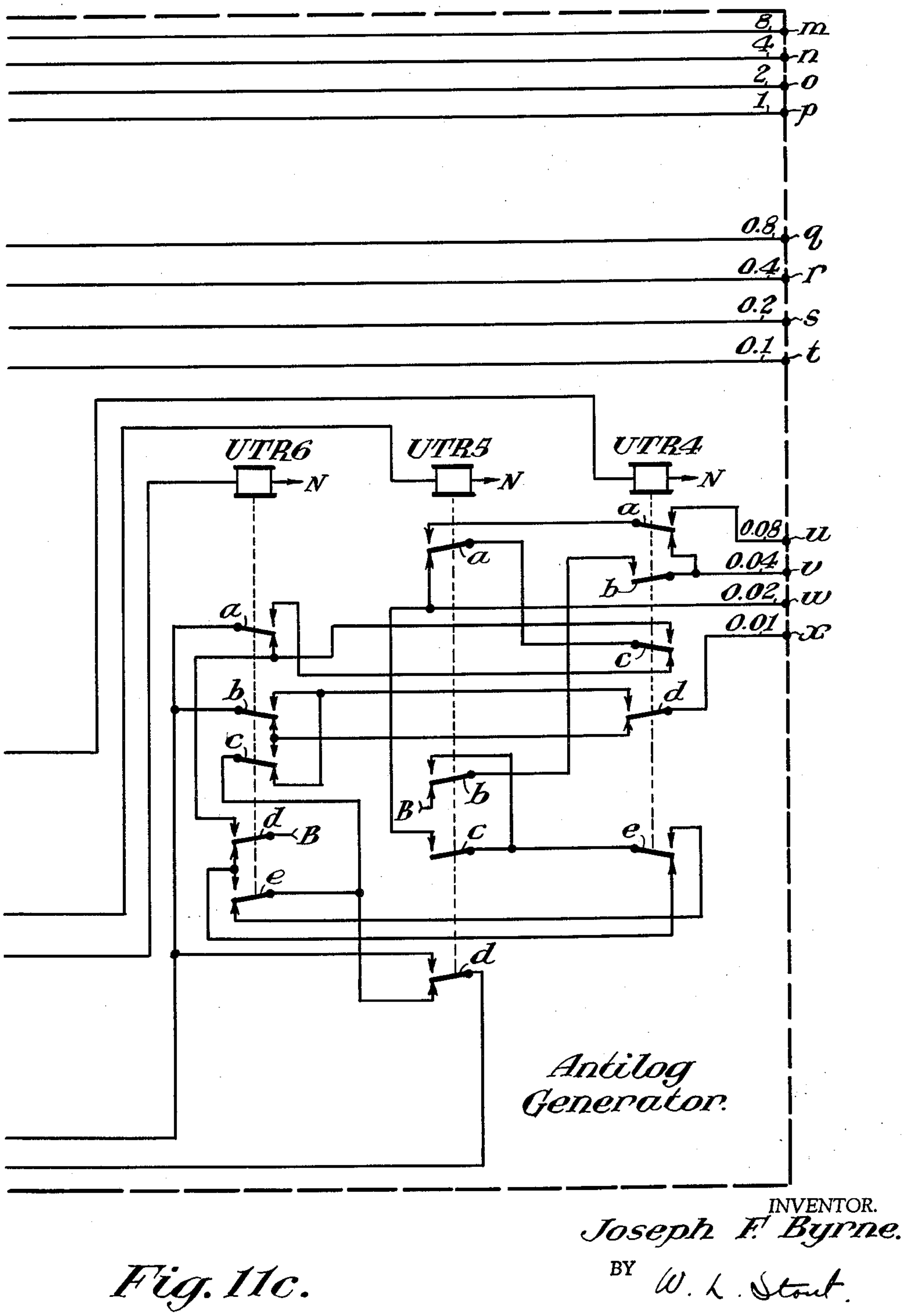
Figure 12A:
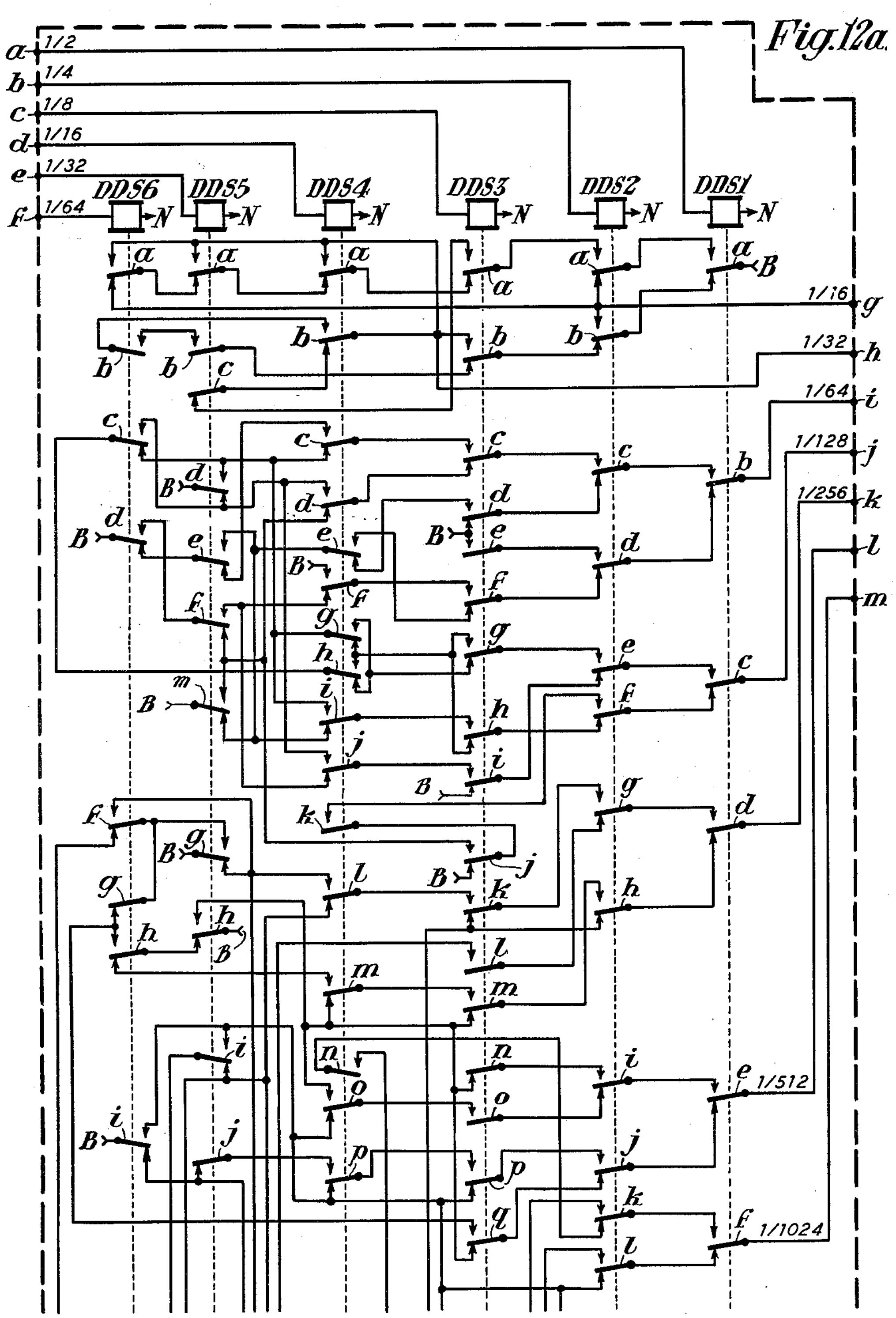
Figure 12B:
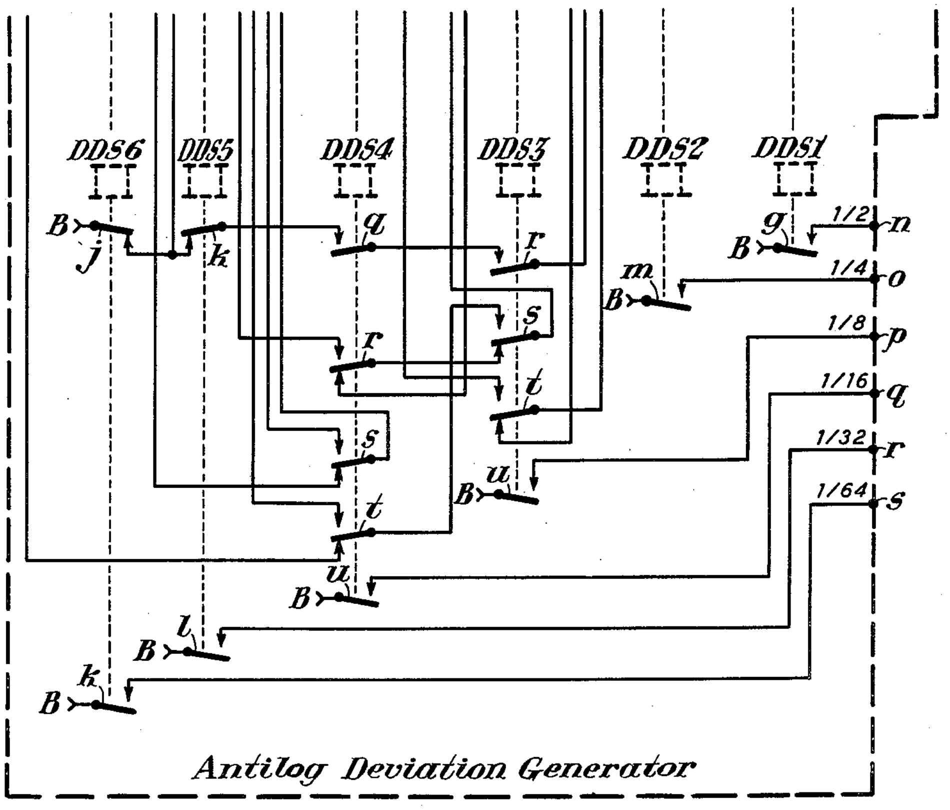
Figure 13A:
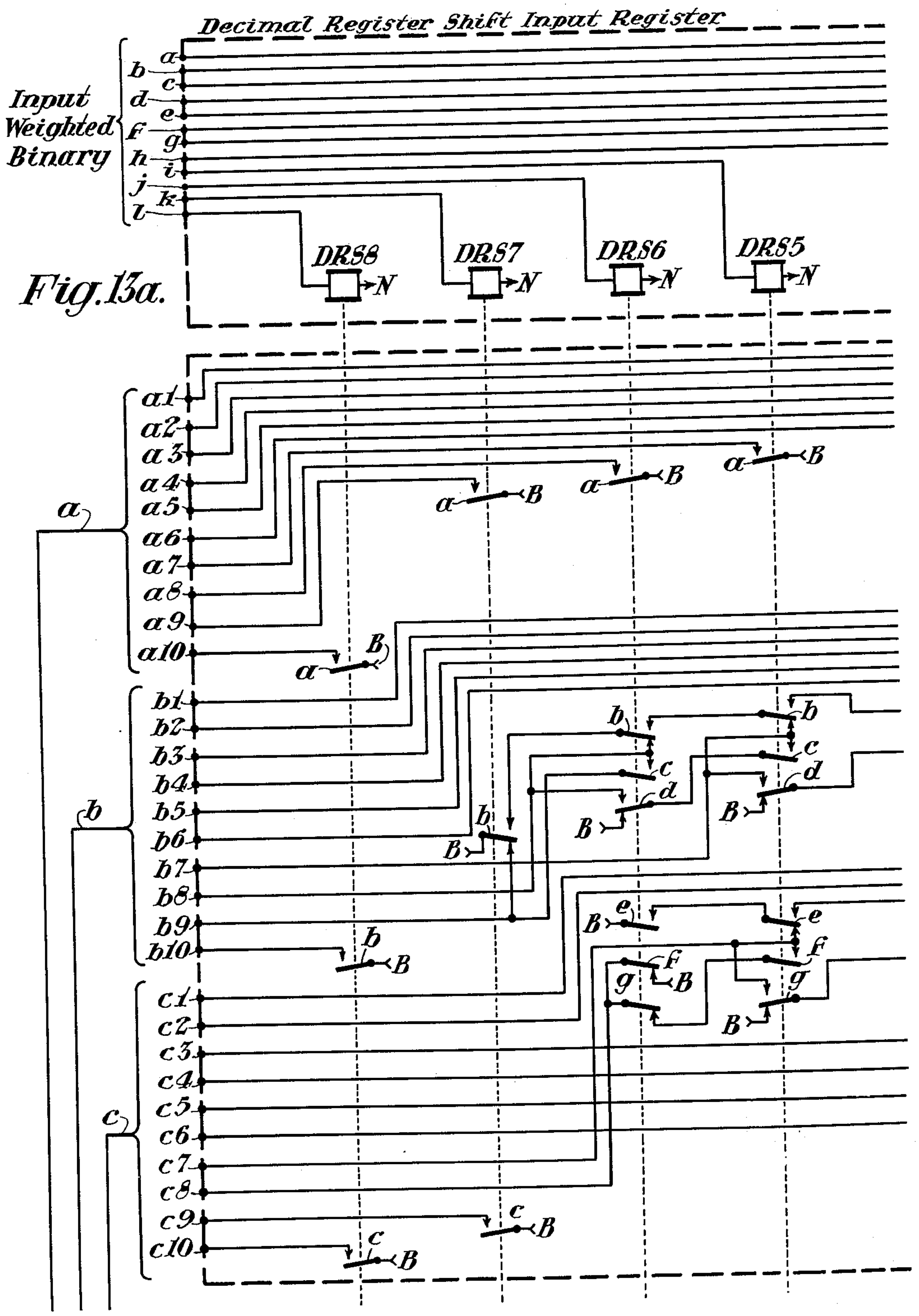
Figure 13B:
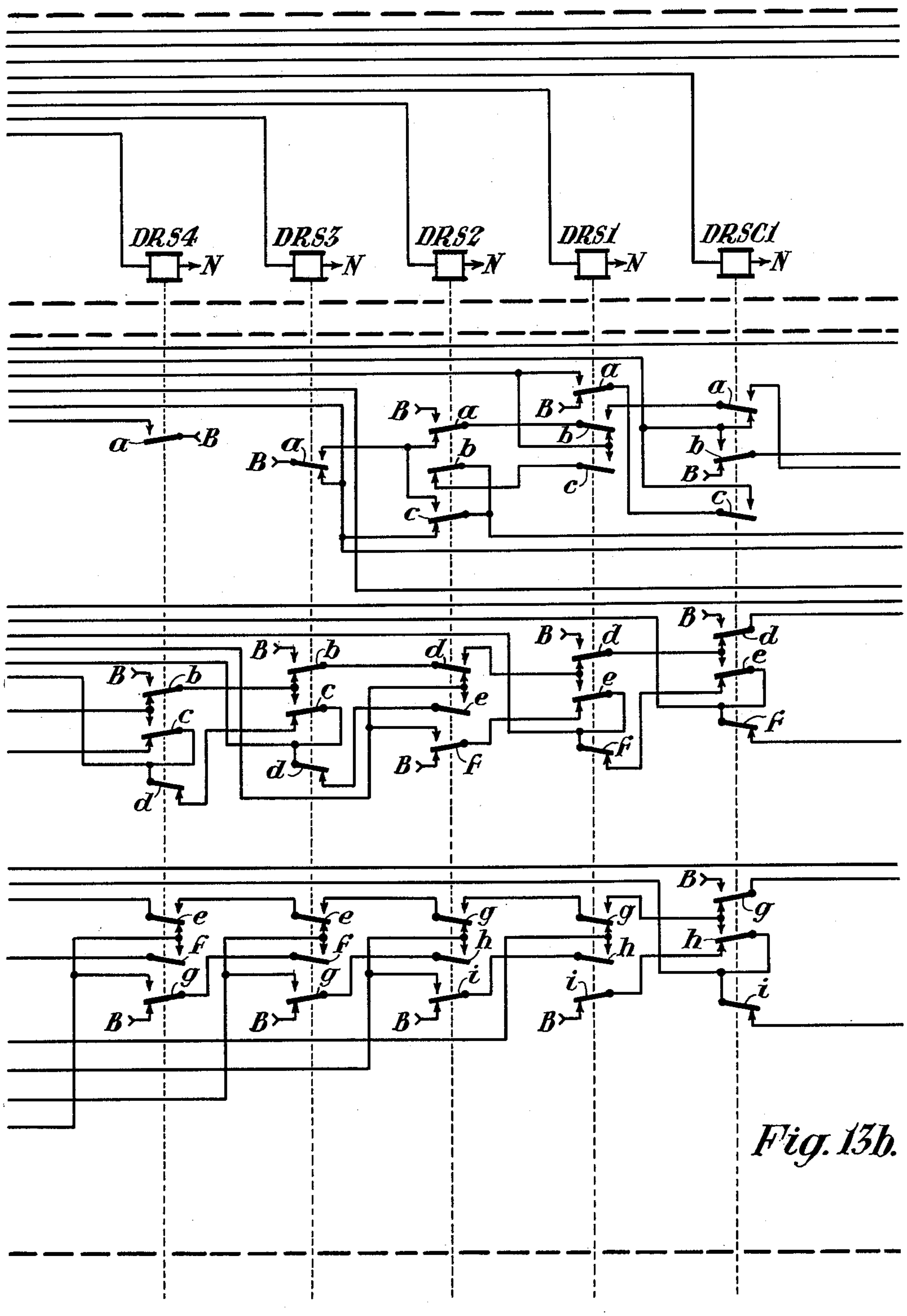
Figure 13C:
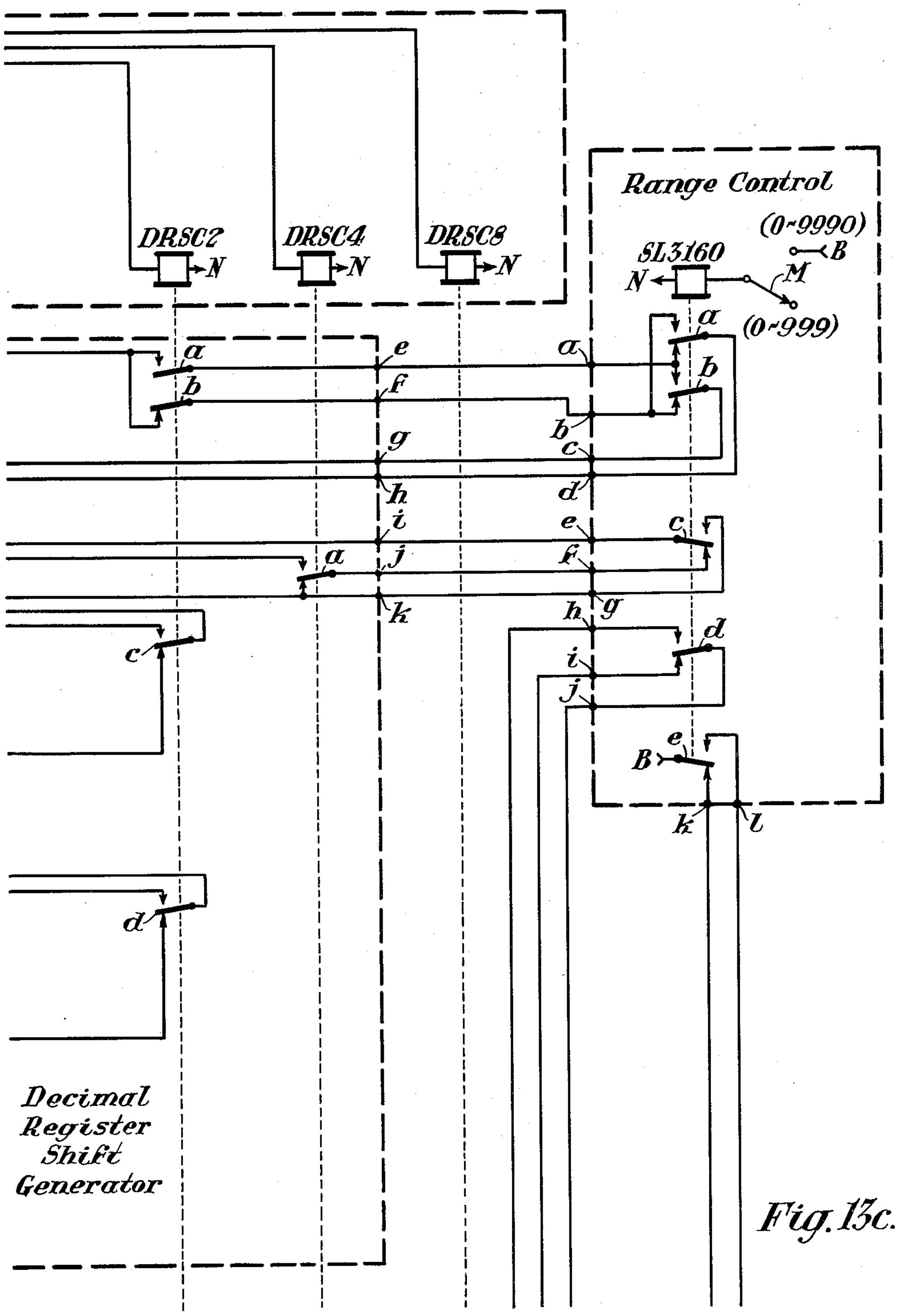
Figure 13D:
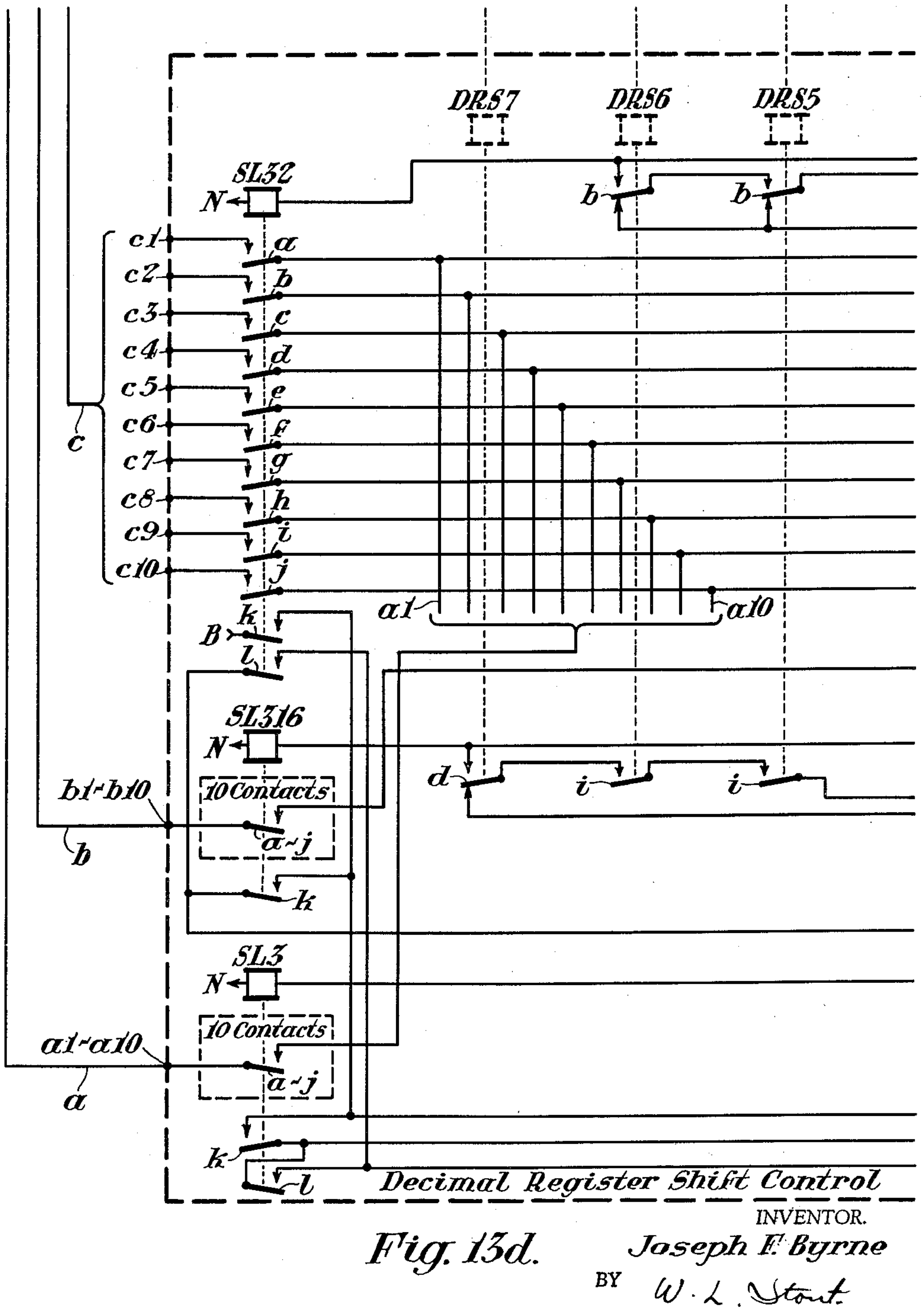
Figure 13E:
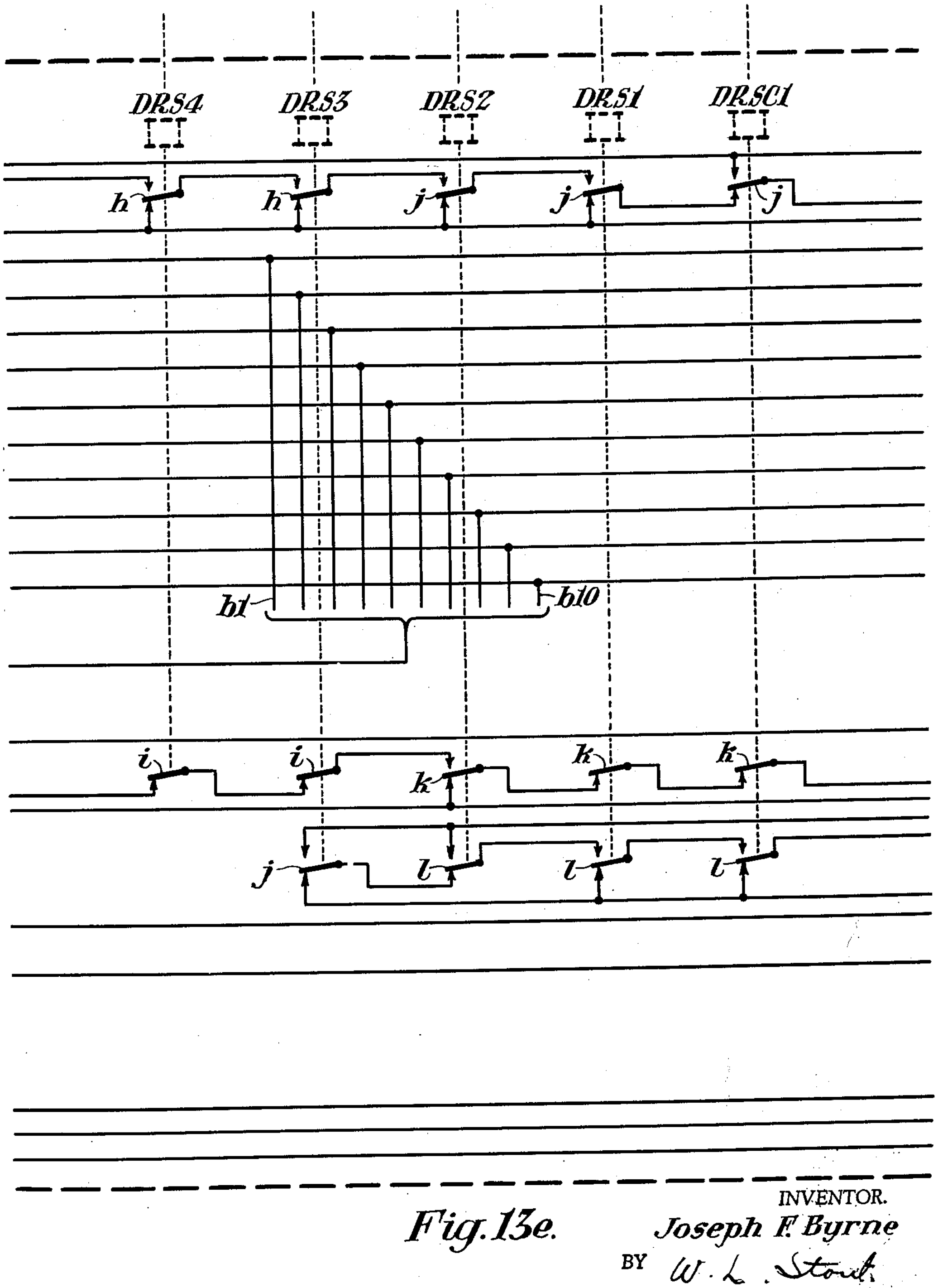
Figure 13F:
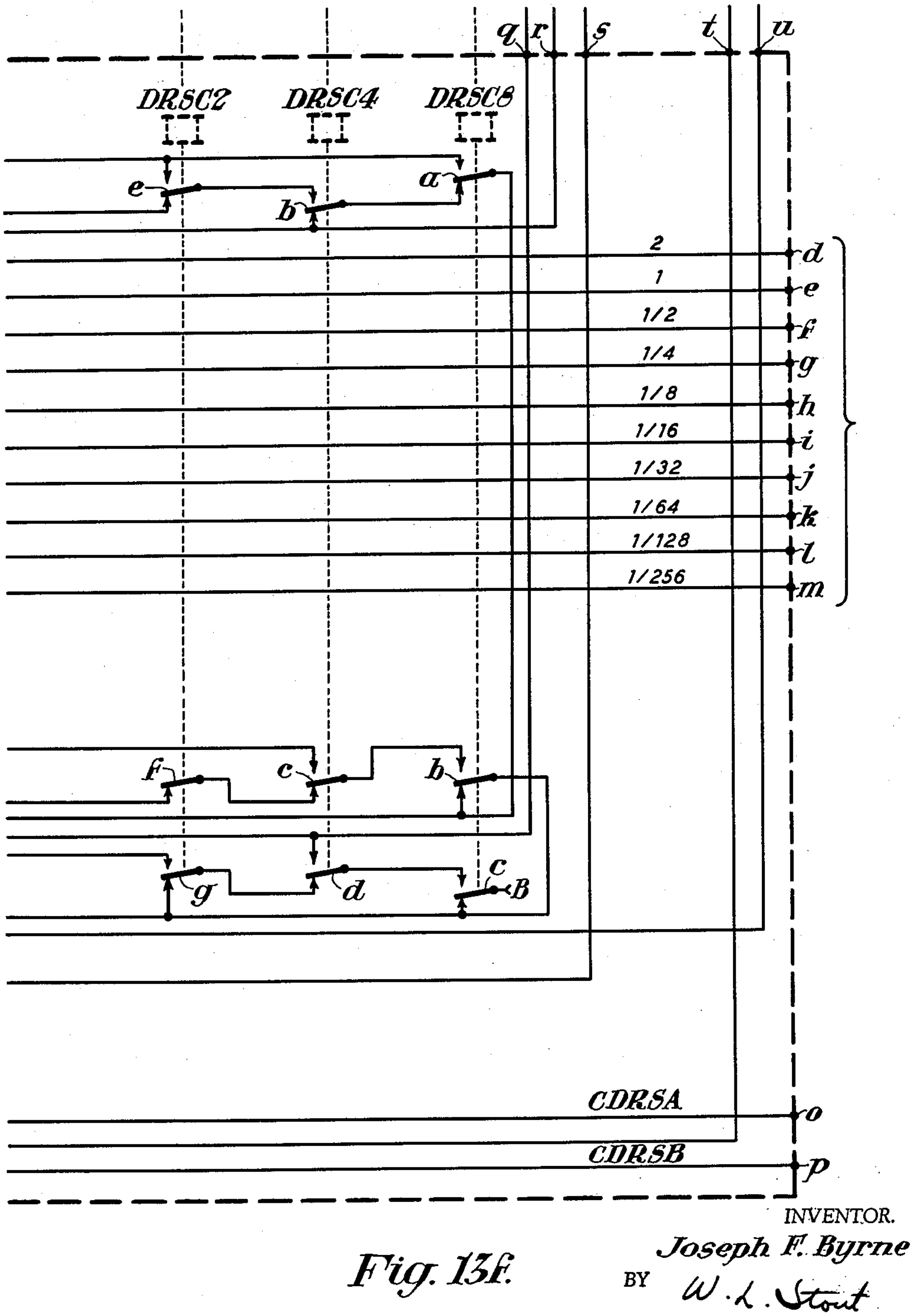
Figure 14A:
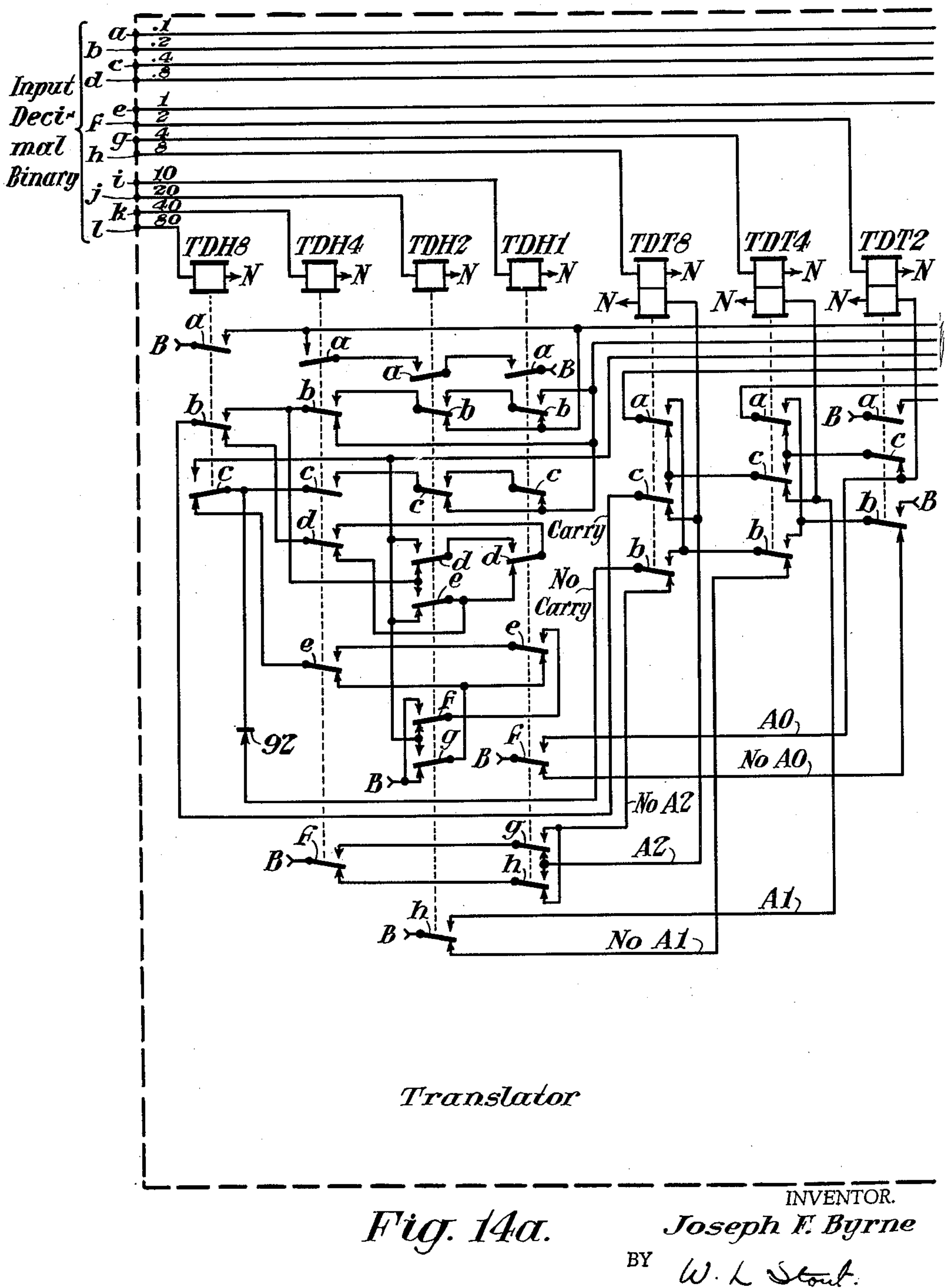
Figure 14B:
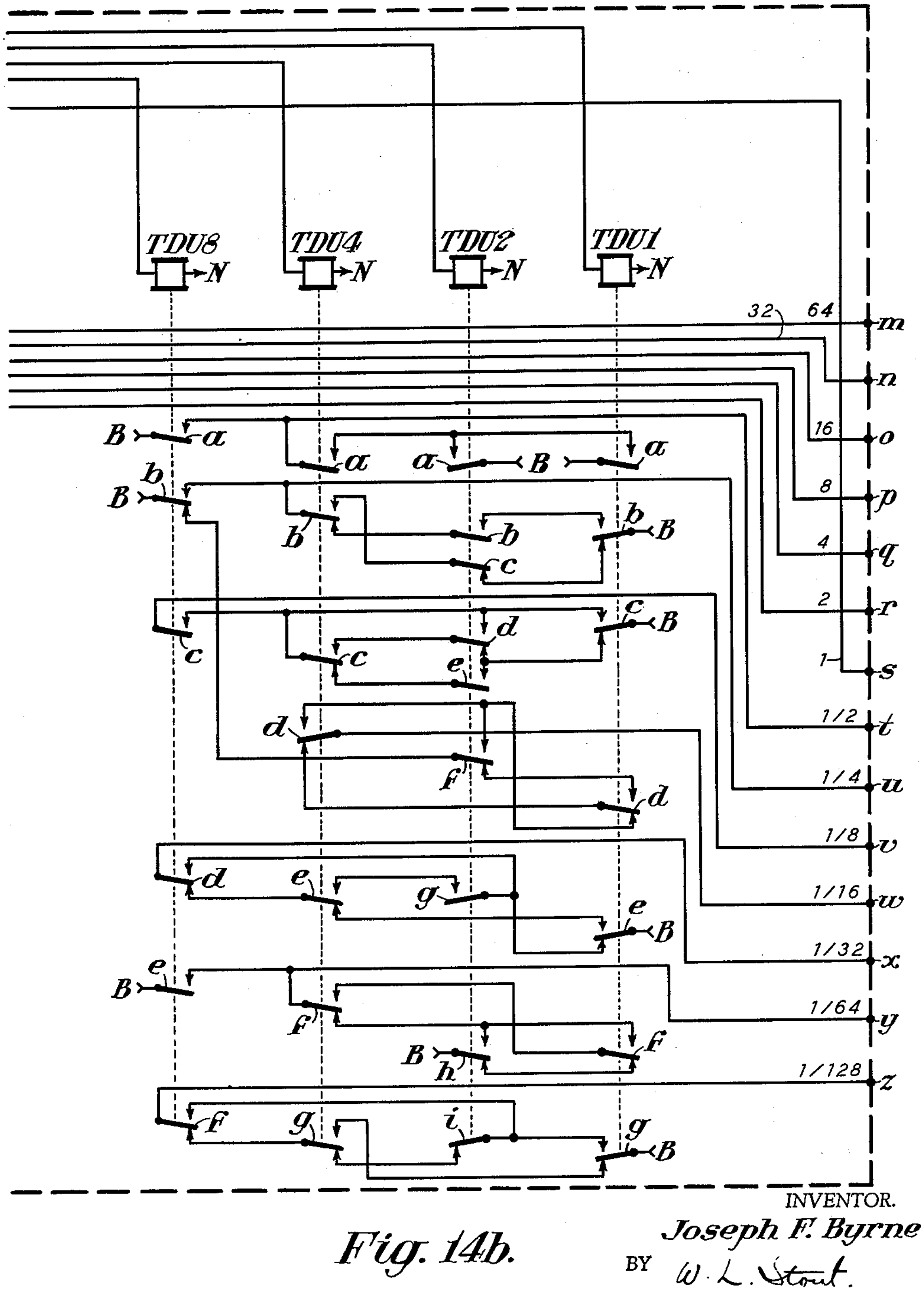
Figure 15A:
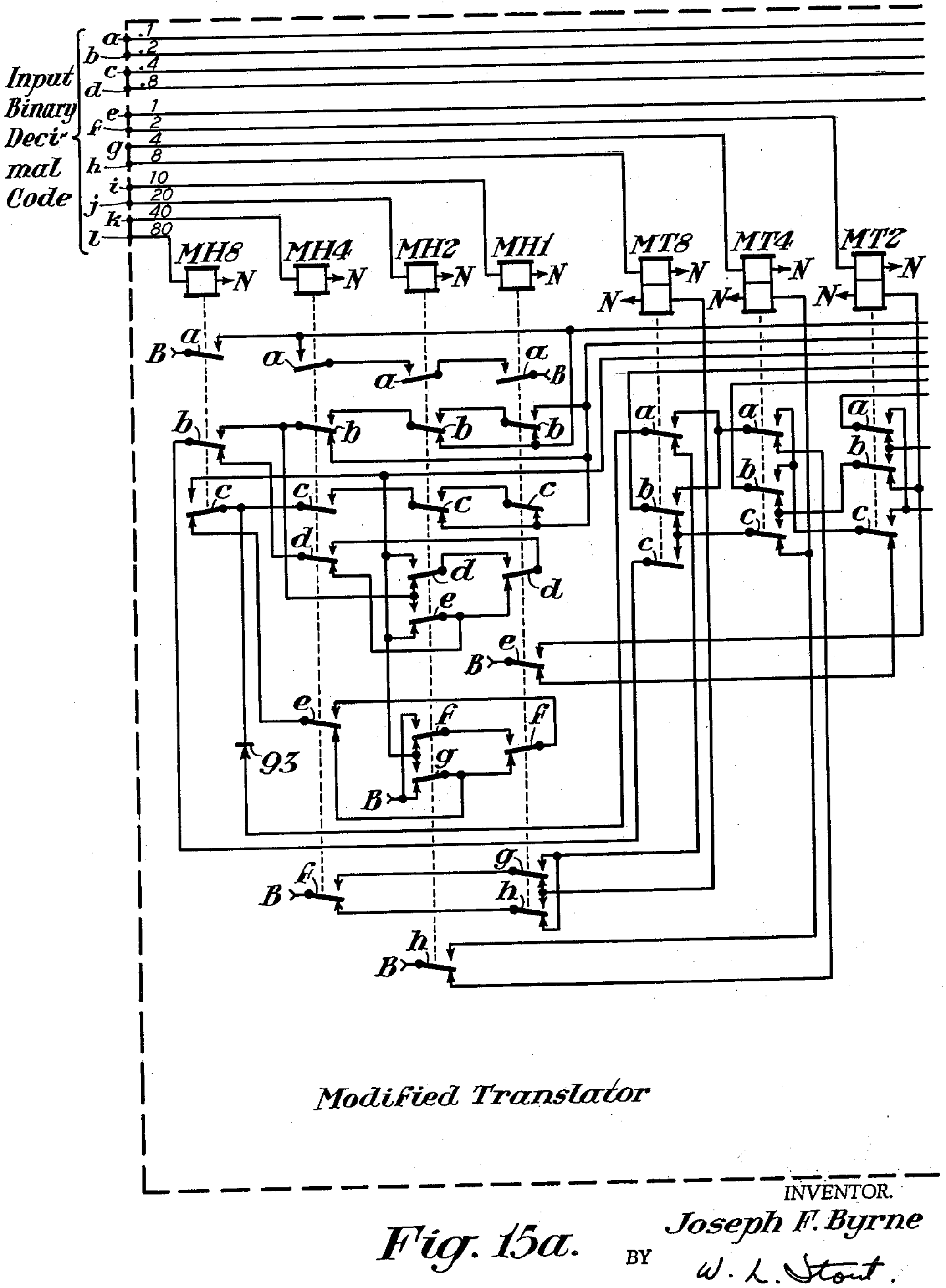
Figure 15B:
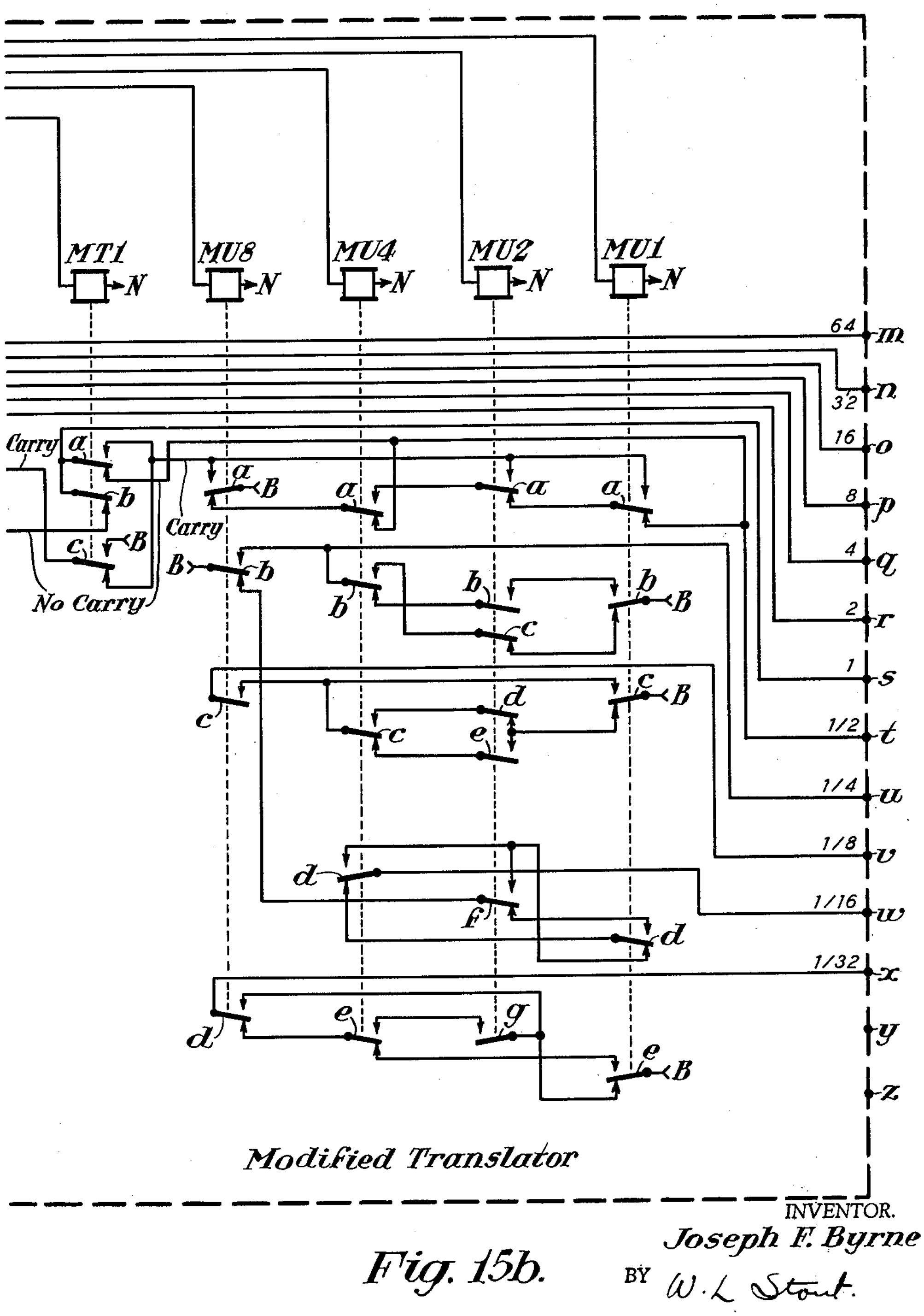
Figure 16:
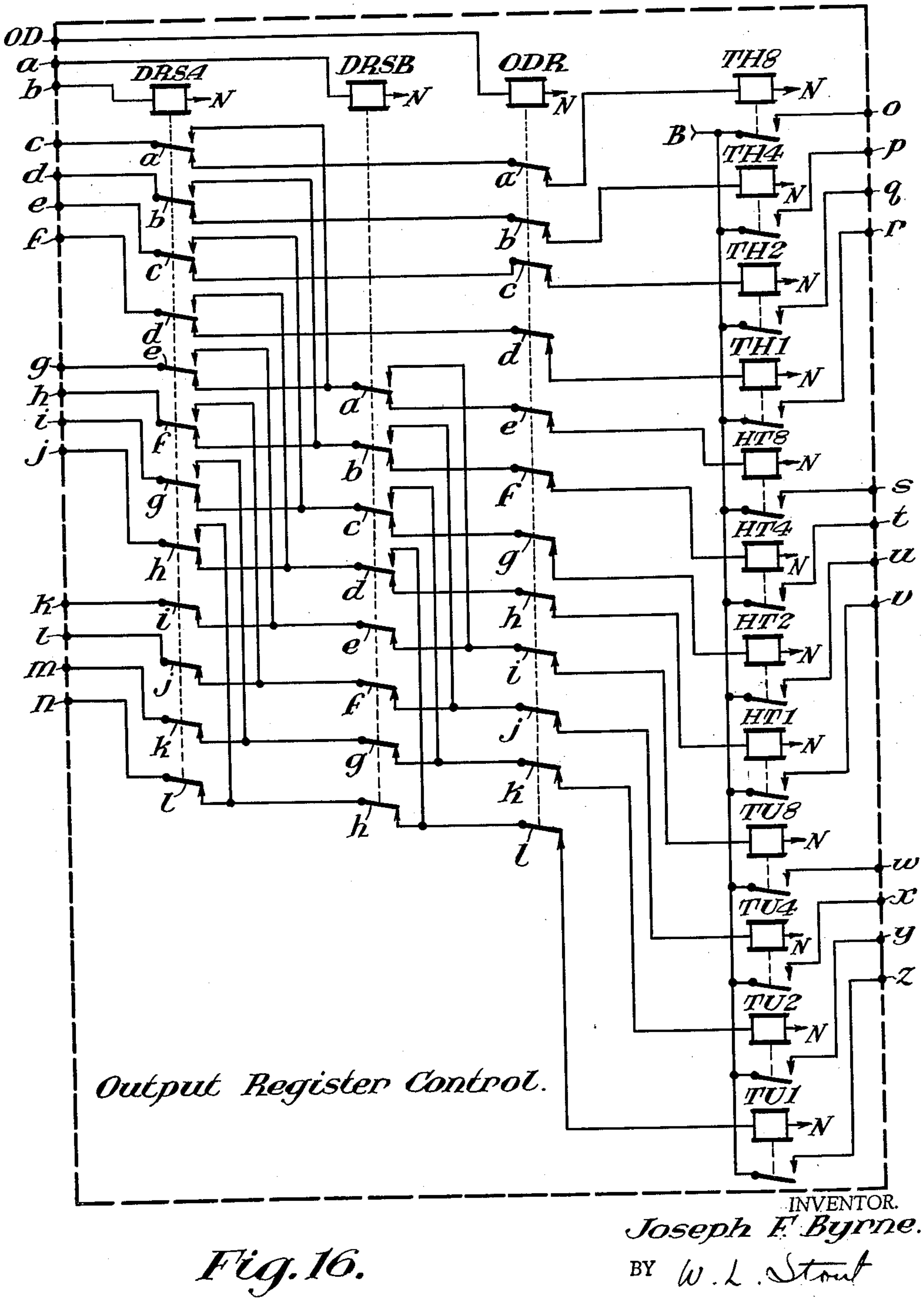
Figure 17:
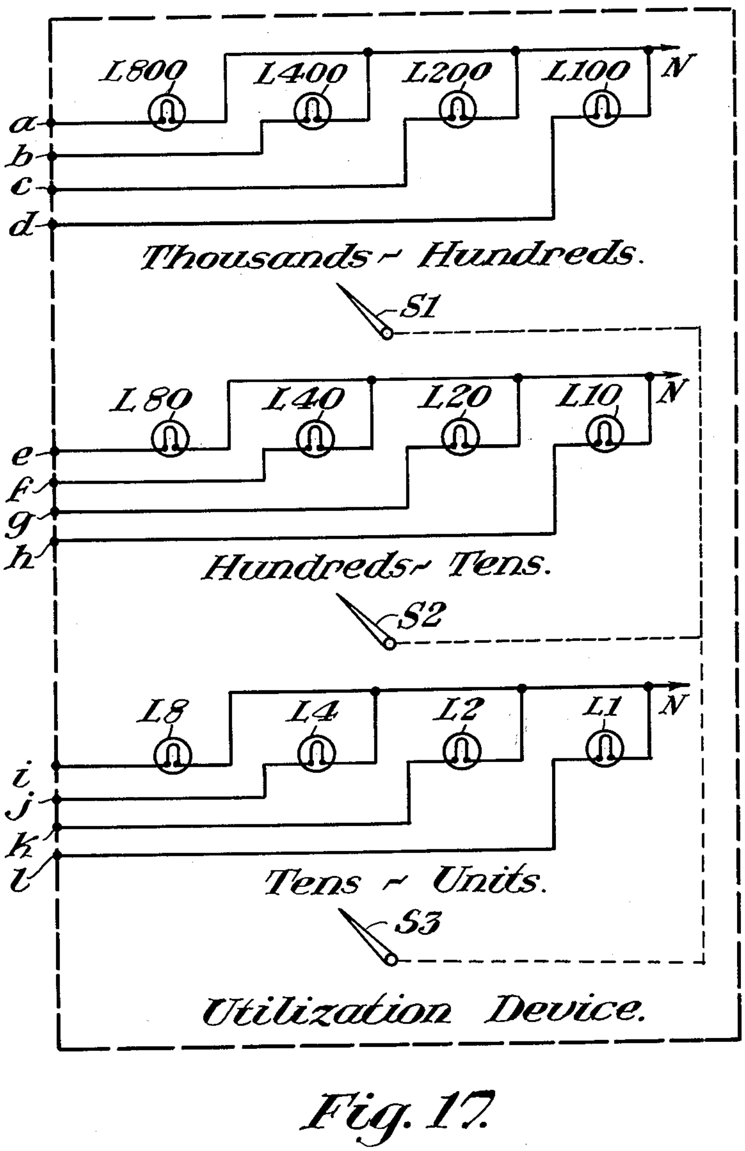
Figure 18:
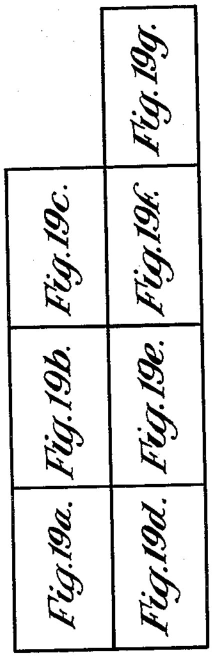

FIGS. 5*a* and 5*b*, when placed horizontally side by side with FIG. 5*a* at the left, form a schematic wiring diagram of an adder;

FIGS. 6*a* and 6*b*, when placed horizontally side by side with FIG. 6*a* at the left form a schematic wiring diagram of a subtracter;

FIG. 7 is a schematic wiring diagram of a simplified logarithm generator;

FIGS. 8*a*, 8*b* and 8*c*, when placed vertically side by side in alphabetical order with FIG. 8*a* at the left, form a schematic wiring diagram of a logarithm generator;

FIGS. 9*a* and 9*b*, when placed vertically side by side with FIG. 9*a* at the left, form a schematic wiring diagram of an approximate logarithm generator;

FIG. 10 is a schematic wiring diagram of a logarithm generator;

FIGS. 11*a*, 11*b* and 11*c*, when placed vertically side by side with FIG. 11*a* at the left, form a schematic wiring diagram of an anti-logarithm generator;

FIGS. 12*a* and 12*b*, when placed vertically one above another with FIG. 12*a* at the top, form a schematic wiring diagram of an anti-logarithm deviation generator;

FIGS. 13*a*, 13*b* and 13*c*, when placed vertically side by side with FIG. 13*a* at the left, form a schematic wiring diagram of a decimal register shift register and an associated decimal register shift generator, FIG. 13*c* also showing a range control unit;

FIGS. 13*d*, 13*e* and 13*f*, when placed verically side by side with FIG. 13*d* at the left, and below FIGS. 13*a*, 13*b* and 13*c*, respectively, form a schematic wiring diagram of a decimal register shift control;

FIGS. 14*a* and 14*b*, when placed vertically side by side with FIG. 14*a* at the left, form a schematic wiring diagram of a translator;

FIGS. 15*a* and 15*b*, when placed vertically side by side with FIG. 15*a* at the left, form a schematic wiring diagram of a modified translator;

FIG. 16 is a schematic wiring diagram of an output register control;

FIG. 17 is a schematic wiring diagram of an exemplary utilization device;

FIG. 18 is a diagram of the arrangement of FIGS. 19*a*–19*g*; and

FIGS. 19*a*, 19*b*, 19*c*, 19*d*, 19*e*, 19*f* and 19*g*, when arranged as shown in FIG. 18, form a block wiring diagram of a flow computer in accordance with one embodiment of my invention.

Before describing my invention in detail, it will be convenient to give the mathematical basis for the generation of logarithms and anti-logarithms in the apparatus of my invention, since this theoretical background is helpful in understanding my invention.

THEORETICAL BASIS FOR BINARY LOGARITHM AND ANTI-LOGARITHM GENERATION

The following conventions are employed:

$\triangleq$ means equal by definition $y_i\gamma\{a, b \ldots n\}$ means any particular $y$ on the left is a member of the set on the right.

Any number N can be expressed, to any desired degree of accuracy, as (1) $$N = a_n 2^n + a_{n-1}2^{n-1} + \ldots + a_1 2^1 + a_0 2^0 + a_{-1}2^{-1} + \ldots + a_{-m+1}2^{1-m} + a_{-m}2^{-m}$$

where $n$ and $m$ are integers, either or both of which may approach infinity, and $a_i\gamma\{0, 1\}$.

The array $a_n a_{n-1} - \ldots a_1 a_0 . a_{-1} \ldots a_{-m}$ will be recognized as N in binary form, where the (.) after $a_0$ is the "binary point" analogous to the decimal point.

If $a_n$ is taken as the highest ordered 1, then (1a) $$N = 2^n + a_{n-1}2^{n-1} + \ldots + a_1 2^1 + a_0 2^0 + a_{-1}2^{-1} + \ldots + a_{1-m}2^{1-m} + a_{-m}2^{2-m}$$

factoring, (1b) $$N = 2^n(1 + a_{n-1}2^{-1} + \ldots + a_1 2^{1-n} + a_0 2^{-n} + a_{-1}2^{-(n+1)} + \ldots + a_{-m}2^{-(m+n)})$$

Let $$a_{n-1}2^{-1} + \ldots + a_1 2^{1-n} + a_0 2^{-n} + a_{-1}2^{-(n+1)} + \ldots + a_{-m}2^{-(n+m)} \triangleq A$$

where $$0 \leq A < 1$$

Then (2) $$N = 2^n(1 + A)$$

at $$A\gamma\{0, 1\}$$

as may be verified by inspection.

In the range $0 < A < 1$, (3) $$1 + A \cong 2^A$$

Figure 1:
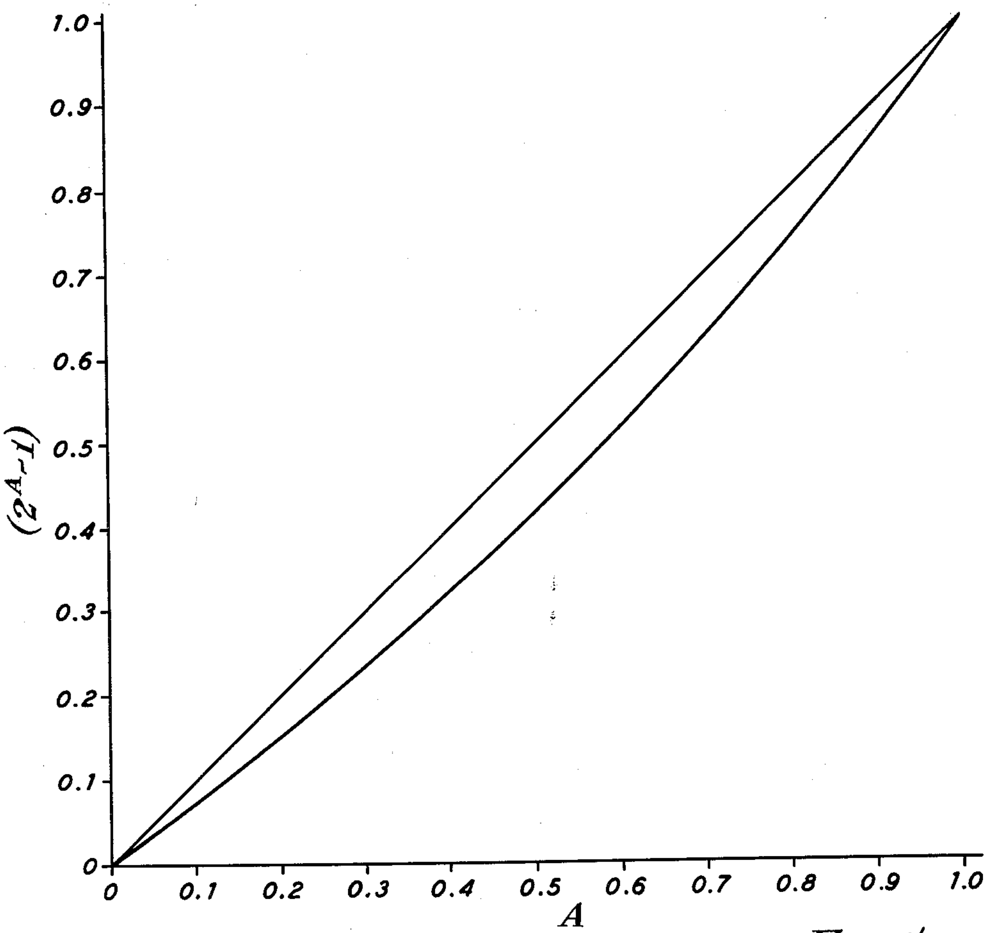
FIG. 1 is a graph of $2^A-1$ vs. A, where A is any number between 0 and 1.

FIG. 1 shows the nature of the approximation. In FIG. 1, the curve is a plot of $2^A - 1$ vs. A, whereas the 45° straight line represents the approximation, so that the difference between the curves at any point gives an indication of the error. Assuming Equation 3 as an approximation, Equation 2 becomes (4) $$N \cong 2^n . 2^A = 2^{n+A}$$

Thus, (5) $$\log_2 N \cong n + A$$

It should be noted that the accuracy of Equation 5 is independent of $n$, and can accordingly be used over the entire range of N subject only to the cyclic error in A.

Where greater accuracy is needed, Equation 3 may be replaced by (6) $$1 + A = 2^{A+B}$$

where B may be thought of as $$B = b_{n-1}2^{-1} + b_{n-2}2^{-2} + \ldots + b_1 2^{1-n} + b_0 2^n + b_{-1}2^{-(n+1)} + \ldots + b_{-m}2^{-(n+m)}$$

in which the $b_i$ are selected from the set {0, 1} to balance Equation 6. From Equations 2 and 6, we have (7) $$N = 2^n . 2^{A+B} = 2^{n+A+B}$$

(8) $$\log_2 N = n + A + B$$

To compute B, note that B is a function of A alone, obtainable from Equation 6 as (9) $$B = \log_2(1 + A) - A$$

For computation purposes, (9a) $$B = \frac{\log_{10}(1 + A)}{\log_{10} 2} - A$$

Figure 2:
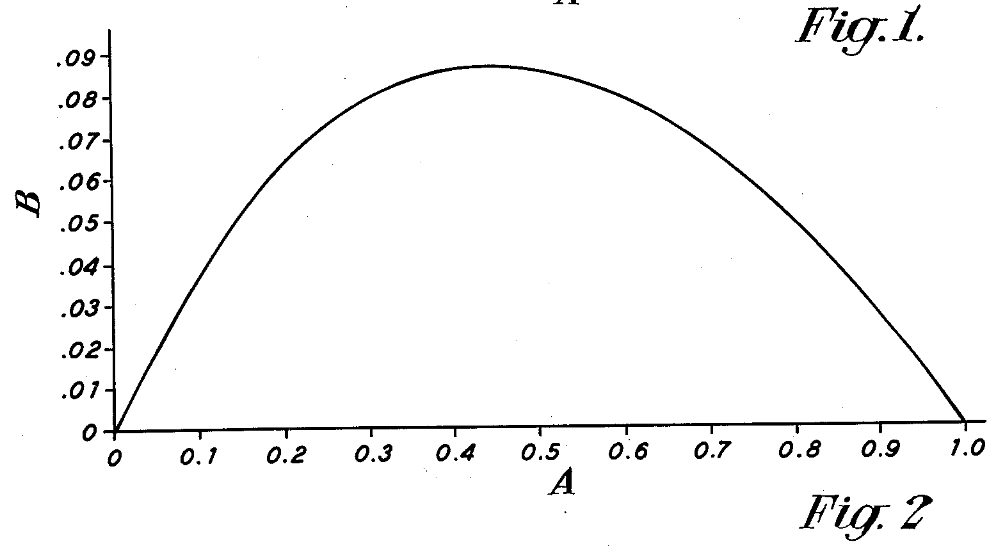
FIG. 2 is a graph of B vs. A, where B is the difference between $\log_2(1+A)$ and A.
Figure 3:
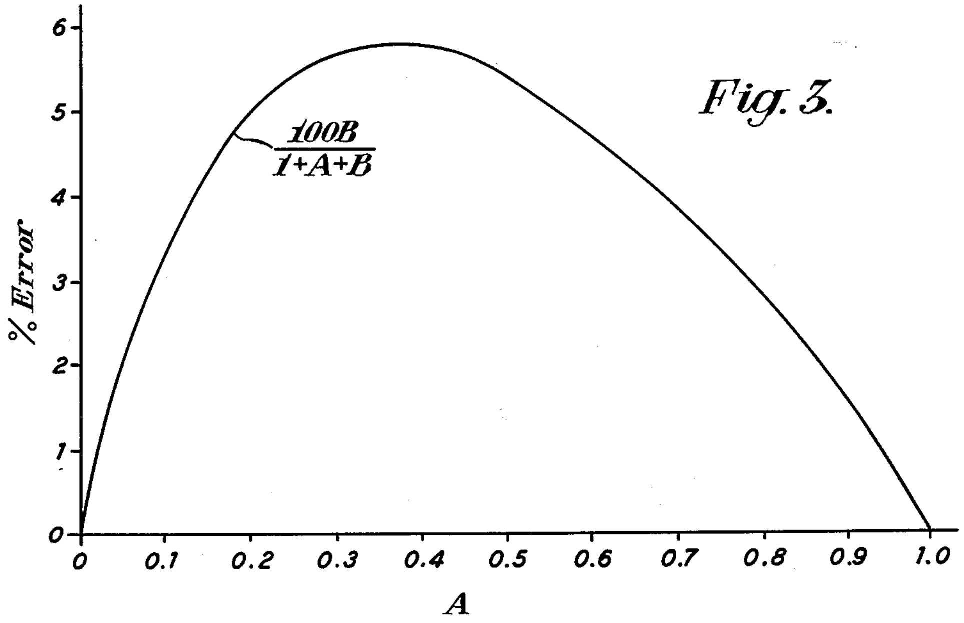
FIG. 3 is a graph of $$\frac{100B}{1+A+B} \text{ vs. A}$$

FIG. 2 is a graph of B vs. A. FIG. 3 is a graph of the error in $\log_2 N$ as a function of A as the result of using Equation 5 instead of Equation 8. It will be seen that the maximum error is well within 6% throughout the range.

As an example of the use of Equation 5, let it be desired to find the logarithm of 37.3. In binary notation, 37.3≅100101.010011 or, in mixed notation, $2^5$ (1+.00101010011) which is, in binary notation, $10^{101}$ (1+.00101010011). Compare Equation 2 here, $$n = 101 = \text{decimal } 5$$

$$A = .00101010011 \cong \text{decimal } .3$$

and, from Equation 5, $$\log_2 100101.010011 = 101.001010$$

To apply Equation 8, B must first be found from Equation 9a. Thus, since $$A = .3,\ \log_{10}2 \cong .301,\ 1 + A = 1.3$$

$$B = \frac{\log_{10} 1.3}{.301} - .3 = \frac{.1139}{.301} - .3$$

$$B = .378 - .3 = .078 \text{ decimal} = .000101 \text{ binary}$$

Then, from Equation 8, $$\log_2 N = 101.001010 + .000101$$

$$\log_2 N = 101.001111$$

To find the anti-logarithm of $\log_2 N = n + A + B$ from Equation 6, (6) $$1 + A = 2^{A+B}$$

(6a) $$A = 2^{A+B} - 1$$

(10) $$B = A + B - A = A + B - 2^{A+B} + 1$$

For a logarithm to the base 2 expressed in binary form, $n$ is given by the binary value of the digits to the left of the binary point, and $A+B$ is given by the binary value of the digits to the right of the binary point.

As shown above by Equation 10, B is a function of $A+B$. This function is shown plotted in FIG. 4. It should be noted that $0 \leq A + B < 1$ as well as $0 \leq A < 1$. When B is determined, $1+A$ can be found from the equation

(11) $$1 + A + B - B = 1 + A$$

Note that $1+A$ could be determined directly from Equation 6 above ($1 + A = 2^{A+B}$), but this is not as economical to circuit, because there are always several known zeros in B and there are, therefore, fewer digits to compute in B than in $1+A$.

N can now be written as $N = 2^n(1 + A)$.

In the computer of my invention, $n$ is used to register the digit sequence $1+A$ to properly place the binary point.

For example, let it be required to find the anti-logarithm of 101.001111. Here, $$n = 101 = \text{decimal } 5$$

$$A + B = .001111 = \text{decimal } .234$$

Figure 4:
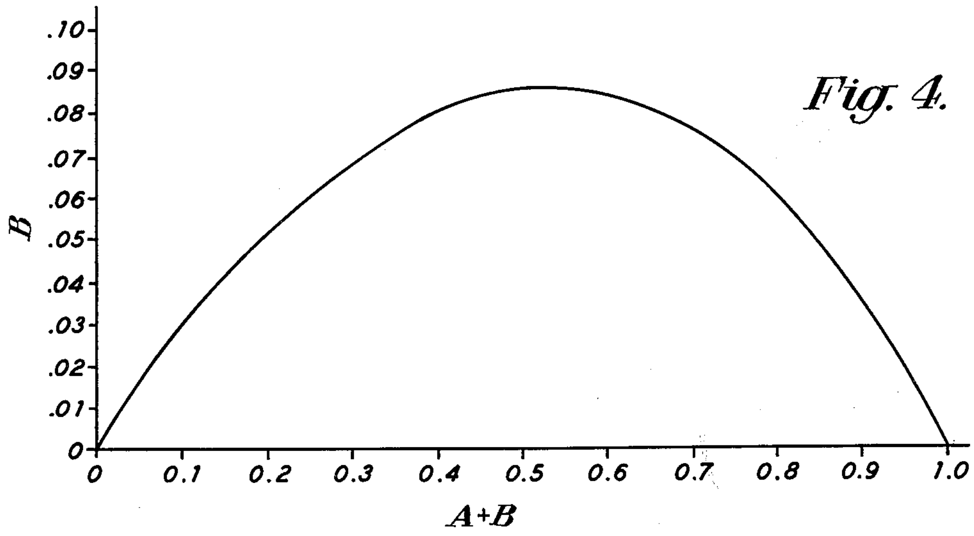
FIG. 4 is a graph of B vs. $A+B$.

From FIG. 4, $B = .055 = .000011$ binary.

Then $$1 + A = 1.001111 - .000011$$

$$1 + A = 1.001100$$

since $n = 5$, $$N = 100110 = \text{decimal } 38$$

We have now obtained, first, the logarithm, and then the anti-logarithm from the logarithm, of 37.3 using the above equations to slide-rule accuracy. The error in the example given is thus $$\frac{(38 - 37.3)100}{37.3} = \frac{70}{37.3} = 1.878\%$$

The accuracy could obviously be improved to any desired degree by using more accurate values of A and B.

Negative logarithms require a somewhat different treatment. If a number N between 0 and 1 is expressed as

(12) $N=a_{-r}2^{-r}+a_{r-1}2^{-(r+1)}+\ldots a_{(-r+s)}2^{-(r+s)}$ where $$a_1\gamma\{0, 1\}$$

$r$ and $s$ are integers $1\leqslant r$, $0\leqq s$, with no upper limit on $r$ or $s$, factoring out $2^{-r}$, (12a) $N=2^{-r}(a_{-r}2^0+a_{-r-1}2^{-1}+\ldots+a_{-(r+s)}2^{-s})$ If $a_{-r}$ is the highest ordered 1, (12b) $N=2^{-r}(1+a_{-r-1}2^{-1}+\ldots+a_{-(r+s)}2^{-s})$ Let

(13) $a_{-r-1}2^{-1}+\ldots+a_{-r-s}2^{-s}\triangleq A$ then (12c) $N=2^{-r}(1+A)0\leqslant A<1$ By the previous reasoning, let $$1+A=2^{A+B}$$
$$N=2^{-r+A+B}$$
$$\log_2=N=-r+A+B$$

As before, $r$ may be determined by circuits controlled by the highest ordered 1. A can be read as the sequence of digits to the right of the highest ordered 1, and B can be determined from Equation 6. To find the anti-logarithm,

(14) $-\log_2 N=(r-1)+1-(A+B)$ where $(r-1)$ will be an integer and $1-(A+B)$ will be a fraction less than 1. Accordingly, the digits to the right of the binary point represent $1-(A+B)$, and the digits to the left of the binary point represent $(r-1)$. B can be found as a function of $1-(A+B)$ from the equation derived from Equation 10 as follows:

(10a) $B=A+B-2^{A+B}+1$

(15) $B=1-[1-(A+B)]-2^{1-[1-(A+B)]}+1$

To circuit this equation with relays, a set of values could be calculated for B for each of a corresponding set of values of $1-(A+B)$ in the manner shown below for the case of positive logarithms. Having B, $1+A$ could be obtained from

(16) $1+A=1-[1-(A+B)+B]$ and this sequence channeled to the proper register over circuits controlled by the digits of $(r-1)$.

However, it is preferred, in practicing my invention, to multiply all numbers by suitable constants to avoid handling negative logarithms, and to take care of the multiplication by suitably registering the output, as will appear below in the description of a particular embodiment of my invention.

THE ADDER

Referring now to FIGS. 5a and 5b, there is disclosed an adder adapted to generate the arithmetic sum of a first number expressed in digital binary form by the energized or deenergized condition of a set of leads A0 to An, as shown in FIG. 5b, and a second number similarly expressed by the energized or deenergized condition of leads B0 to Bn as shown in FIG. 5a. For example, as is well known in the art, the first number could be expressed by the formula $$An2^n+A(n-1)2^{(n-1)}+\ldots A_1 2^1+A_0 2^0$$

and the second number could be expressed by the formula $$Bn2^n+B(n-1)2^{(n-1)}+\ldots B_1 2^1+B_0 2^0$$

where the A's and B's may be either 0 and 1 which could be represented, respectively, by the deenergized or energized condition of the correspondingly designated lead. For example, the number 2 would be represented on the A terminals by the deenergized condition of terminal A0, the energized condition of terminal A1, and the deenergized condition of the rest of the A terminals. It is believed that this mode of representation is sufficiently understood in the art as not to require further elucidation.

It may be remarked in this connection, however, that there is no necessity that the same number of terminals be provided for A and B so long as sufficient terminals are provided to store the largest number which will be encountered on the input in question.

As shown, modules numbered from 0 to $n$ are provided which will correspond in practice to the corresponding terminals of the highest ordered input. It will be apparent to those skilled in the art from the following description that if one of the inputs is of higher order than the other, the coils of the register relays, to be described, corresponding to the unused higher order digits of the lower ordered terminals may be removed. However, in order to simplify the description, it will be hereinafter assumed that both inputs are of the same order.

Each of modules M0 through M$n$ has nine terminals lettered $a$ through $i$. These modules employ a single relay of the conventional type having two oppositely energized coils such that when either winding is energized the armature is attracted and the front contacts of the relay are closed, but when both windings are energized, the flux will cancel and the armature will not be attracted, and if neither winding is energized, the armature will not be attracted so that in either of the last two cases the back contacts of the relay are closed. With these modules, it is required that for one of the inputs, leads must be provided not only to indicate the digits of the inputs but also to indicate the complement or negative truth value of each digit. That is, for each digit a first lead is provided which is energized when the digit is 1 and a second lead is provided which is energized when the digit is 0. To illustrate one mode of deriving this information from inputs including only one set of leads for each number, I have shown an auxiliary unit comprising relays X0 through X$n$ which provide the required information for one of the inputs. As shown in FIG. 5b, terminals A0 through A$n$ are adapted to receive one of the inputs in digital binary form. Each of the terminals A0 through A$n$ is assumed to be energized or deenergized from terminal B of the battery by any suitable conventional apparatus, not shown. Each of terminals A0 through A$n$ is connected to one of the windings of a corresponding relay X0 through X$n$, the opposite terminal of the relay being connected to terminal N of the battery as shown. Each of the relays X0 through X$n$ has a single contact, the heel of which is connected to terminal B of the battery, the front point of which is energized when the corresponding digit is 1 and the back point of which is energized when the corresponding digit is 0. Thus, there is provided a first set of leads A0 through A$n$ which repeat the energized input terminals A0 through A$n$ and a second set of leads no–A0 through no–A$n$ which repeat the complements of the applied input, i.e., the deenergized terminals A0 through A$n$. It will be apparent that if negative truth values for one of the inputs were available from another source, the X relays would be unnecessary. For example, as will appear, the disclosed adder is adapted to provide negative truth values of the output sum, so that where several adders are used in series, only the first need be provided with X relays.

The other input to the adder may be applied to terminals B0 through B$n$ as shown in FIG. 5a.

For each digit of the highest ordered input, I provide an adder module designated by the characters M0 through M$n$. The corresponding digit of the B input is applied to the terminal $a$ of each module, as shown, and the corresponding digit of the A input is applied to terminal $b$ of each module. Terminal $c$ of each module is connected to the corresponding no–A digit. As shown, terminals *a* and *b* of each module are each connected to one of the opposed windings of relays R0 to R*n*, with the opposite terminal of each winding being connected to terminal N of the battery. Accordingly, if any pair of digits are both 0 or both 1, the corresponding relay will be released, and if the inputs are different the corresponding relay will be energized.

As will appear, all of the modules may have identical internal wiring. However, since it may be desirable in some cases to simplify the wiring of the 0 order module M0, a simplified wiring for this module has been shown and will be first described.

Module M0, in addition to the terminals *a*, *b* and *c* previously described, is shown provided with a terminal *d*, which need not be employed if the simplified wiring shown is used, and terminals *e*, *f*, *g*, *h* and *i*, which will now be described. Terminal *e* of module M0 may be permanently connected to terminal B of the battery, as shown. Terminal *f* of module M0 is energized when the lowest ordered digit of the sum is 1. As shown, this terminal is connected to an output terminal S0. Terminal *g* of module M0 is energized when the lowest ordered digit of the sum is 0. This terminal is connected to an output terminal NS0. Terminal *h* of module M0 is energized when there is no carry to the next higher ordered digit pair, and terminal *i* is energized when there is a carry to the next higher ordered digit pair.

The circumstances under which these terminals are energized or deenergized are summarized in the following table:

*Table I*

| Case | $A_0$ | $B_0$ | *b* | *a* | *c* | *f* | *g* | *h* | *i* |
|---|---|---|---|---|---|---|---|---|---|
| 1 | 0 | 0 | 0 | 0 | 1 | 0 | 1 | 1 | 0 |
| 2 | 0 | 1 | 0 | 1 | 1 | 1 | 0 | 1 | 0 |
| 3 | 1 | 0 | 1 | 0 | 0 | 1 | 0 | 1 | 0 |
| 4 | 1 | 1 | 1 | 1 | 0 | 0 | 1 | 0 | 1 |

Terminal *f* of module M0 has an energizing circuit extending from terminal B of the battery to terminal *e* of module M0 and thence over the front point of contact *c* of relay R0. This circuit is accordingly energized when the inputs are different.

Terminal *g* of module M0 has an energizing circuit extending from terminal B of the battery to terminal *e* of module M0 and over the back point of contact *c* of relay R0. This terminal is accordingly energized when the inputs to terminals A and B are the same.

Terminal *h* of module M0 has a first energizing circuit extending from terminal B of the battery over the back point of the contact of relay X0, terminal *c* of module M0 and the back point of contact *b* of relay R0. This circuit serves to energize terminal *h* in case 1 of Table I. Terminal *h* has a second energizing circuit which extends from terminal B of the battery and through terminal *e* of module M0 over the front point of contact *b* of relay R0. This circuit energizes terminal *h* in cases 2 and 3 of Table I when the inputs to terminals *a* and *b* are different.

Terminal *i* of module M0 has an energizing circuit which extends from terminal B of the battery over the front point of the cotnact of relay X0, terminal *b* of module M0, and the back point of contact *a* of relay R0. Terminal *i* is energized over this circuit in case 4 of Table I.

Table II below shows eight possible sums which may occur in the addition of a pair of arbitrary order digits. In Table II, the number in parenthesis next to the upper number of each sum arbitrarily identifies the sum for further reference. An arrow to the right of the sum indicates a carry from a previous digit and an arrow to the left of the sum indicates a carry to the next higher order digit. As will appear, the first four cases shown in Table II corresponding to the 0 order digit pair, in which there is never a carry from a previous digit pair.

*Table II*

| | | | |
|---|---|---|---|
| (1) 0<br>0<br>0 | (2) 0<br>1<br>1 | (3) 1<br>0<br>1 | (4) 1<br>1<br>←0 |
| (5) 0<br>0←<br>1 | (6) 0<br>1←<br>←0 | (7) 1<br>0←<br>←0 | (8) 1<br>1←<br>←1 |

The circuitry of module M1, as shown in FIG. 5*a*, is typical of the remaining modules, and also may be used for module M0 if so desired. Terminals *a*, *b* and *c* of module M1 have been described above. Terminal *d* of module M1 is energized when terminal *i* of the previous module, in this case M0, is energized to indicate a carry from the previous module. Terminal *e* of module M1 is energized when terminal *h* of the previous module is energized to indicate no previous carry. Terminal *f* of module M1 is energized when the corresponding digit of the sum is 1. This terminal is connected to output terminal S1, and the corresponding terminals *f* of the remaining modules M2 . . . M*n* are connected to output terminals S2, S3, . . ., S*n*. Terminal *g* of module M1 is energized when the corresponding digit of the sum is 0. This terminal, and the corresponding terminals of the remaining modules, are connected to negative truth value output terminals NS1 . . . NS*n*, as indicated on the drawing. Terminal *h* of module M1 is energized when it is not necessary to carry one to the next higher order module. The *h* terminal of the highest ordered module M*n* is connected to the output terminal NS($n$+1) as shown. Terminal *i* of module M1 is energized when it is necessary to carry one to the next higher order digit. The *i* terminal of the highest ordered module M*n* is connected to output terminal S($n$+1) as shown. Accordingly, it will appear that, in accordance with Table II above, the terminals of the modules of this embodiment should be energized or deenergized in accordance with Table III below.

*Table III*

| Case | Terminals | | | | | | | | |
|---|---|---|---|---|---|---|---|---|---|
| | *a* | *b* | *c* | *d* | *e* | *f* | *g* | *h* | *i* |
| 1 | 0 | 0 | 1 | 0 | 1 | 0 | 1 | 1 | 0 |
| 2 | 0 | 1 | 0 | 0 | 1 | 1 | 0 | 1 | 0 |
| 3 | 1 | 0 | 1 | 0 | 1 | 1 | 0 | 1 | 0 |
| 4 | 1 | 1 | 0 | 0 | 1 | 0 | 1 | 0 | 1 |
| 5 | 0 | 0 | 1 | 1 | 0 | 1 | 0 | 1 | 0 |
| 6 | 0 | 1 | 0 | 1 | 0 | 0 | 1 | 0 | 1 |
| 7 | 1 | 0 | 1 | 1 | 0 | 0 | 1 | 0 | 1 |
| 8 | 1 | 1 | 0 | 1 | 0 | 1 | 0 | 0 | 1 |

As noted above, terminal *a* of module M1 is energized when digit B1 is 1 and terminal *b* of module M1 is energized when digit A1 is 1. Terminal *c* of module M1 is energized when digit A1 is 0, terminal *d* is energized when there is a previous carry and terminal *e* is energized when there is no previous carry.

Terminal *f* has a first energizing circuit which extends from terminal *e* of module M1 over the front point of contact *c* of relay R1. This circuit energizes terminal *f* in cases 2 and 3 in which there is no previous carry and in which inputs to terminals *a* and *b* are different. Terminal *f* has a second energizing circuit which extends from terminal *d* of module M1 over the back point of contact *b* of relay R1. Terminal *f* is energized over this circuit in cases 5 and 8 of Table III in which inputs to terminals *a* and *b* are the same and there is a previous carry.

Terminal *g* of module M1 has a first energizing circuit which extends from terminal *e* over the back point of contact *c* of relay R1 and serves to energize terminal *g* in cases 1 and 4 in which terminal *e* is energized and the inputs to terminals *a* and *b* are the same. Terminal *g* has a second energizing circuit which extends from terminal $d$ over the front point of contact $b$ of relay R1 and energizes terminal $g$ when there is a previous carry and the inputs to terminals $a$ and $b$ are different.

Terminal $h$ has a first energizing circuit extending from terminal $c$ of module M1 over the back point of contact $d$ of relay R1. This circuit serves to energize terminal $h$ in cases 1 and 5 of Table III in which relay R1 is deenergized and the A digit is 0. Terminal $h$ has a second energizing circuit which extends from terminal $e$ over the front point of contact $d$ of relay R1 and energizes terminal $h$ in cases 2 and 3 of Table III. Terminal $i$ of module M1 has a first energizing circuit which extends from terminal $b$ of module M1 over the back point of contact $a$ of relay R1. This circuit serves to energize terminal $i$ in cases 4 and 8 of Table III. Terminal $i$ has a second energizing circuit which extends from terminal $d$ of module M1 over the front point of contact $a$ of relay R1 and serves to energize terminal $i$ in cases 6 and 7 of Table III.

It will be apparent from Tables II and III that the circuitry above described for module M1 is capable of performing all of the required switching combinations for any-order digit-pair addition. Accordingly, the internal circuitry of the other modules, which is identical, will not be further described.

As an example of the operation of the second embodiment of my invention, consider the sum $$7+7=14$$

This sum is represented in binary form by 111+111. Accordingly, assuming for simplicity that module M1 is directly connected to module M$n$ (which becomes M2), terminals A$n$ and B$n$ become A2 and B2, respectively. In this example, each of the A leads and each of the B leads will be energized. Accordingly, relays X0, X1 and X$n$ will be energized, and leads A0, A1 and A$n$ at the front contacts of these relays will be energized. Under these conditions, both of the windings of each of relays R0, R1 and R$n$ will be energized, and each relay will accordingly be released. Terminal $c$ of each of the modules will be deenergized because each of their energizing circuits is interrupted at an open back contact of the corresponding auxiliary relay.

Considering now module M0, the circuit for terminal $f$ will be interrupted at the open front point of contact $c$ of relay R0 and output terminal S0 will accordingly be deenergized. A circuit for output terminal NS0 will be completed from terminal B of the battery at terminal $e$ of module M0 over the back point of contact $c$ of relay R0, and terminal $g$ of module M0 to output terminal NS0. The circuit for terminal $h$ of module M0 will be interrupted at the front point of contact $b$ of relay R0 and at deenergized terminal $c$ of module M0. Terminal $i$ of module M0 will be energized over a circuit extending from terminal B of the battery over the front point of the contact of relay X0, terminal $b$ of module M0, and back contact $a$ of relay R0.

Referring now to module M1, its terminal $d$ will be energized from terminal $i$ of module M0 and its terminal $e$ will be deenergized since terminal $h$ of module M0 is deenergized. A circuit will now be completed for output terminal S1 which extends from energized terminal $d$ of module M1 over the back point of contact $b$ of relay R1, terminal $f$ of module M1, and thence to output terminal S1. The energizing circuit for terminal $g$ will be interrupted at the open front point of contact $b$ of relay R1 and at deenergized terminal $e$ of module M1. Accordingly, output terminal NS1 will be deenergized. The energizing circuit for terminal $h$ of module M1 will be interrupted at deenergized terminal $c$ of module M1. Terminal $i$ will be energized from energized terminal $b$ of module M1 over the back point of contact $a$ of relay R1.

In module M$n$ (or M2 in the present example), terminal $d$ will be energized from energized terminal $i$ of module M1 and terminal $e$ will be deenergized because terminal $h$ of module M1 is deenergized. A circuit for output terminal S$n$ will be completed from energized terminal $d$ of module M$n$ over the back point of contact $b$ of relay R$n$, terminal $f$ of module M$n$, and thence to terminal S$n$. The energizing circuit for terminal $g$ of module M$n$ will be interrupted at the open front point of contact $b$ of relay R$n$ and at deenergized terminal $e$ of module M$n$. Out terminal NS$n$ will accordingly be deenergized. The energizing circuit for terminal $h$ of module M$n$ will be interrupted at the open front point of contact $d$ of relay R$n$ and deenergized terminal $c$ of module M$n$. Terminal NS($n$+1) will accordingly remain deenergized. An energizing circuit for terminal S($n$+1) will be completed from energized terminal $b$ of module M$n$ over the back point of contact $a$ of relay R$n$, terminal $i$ of module M$n$, and thence to terminal S$n$+1. Accordingly, terminals NS0, S1, S$n$ and S$n$+1 will be energized to indicate the sum 1110 or 14. Other combinations of inputs can be seen to generate the corresponding correct outputs by similarly tracing the corresponding circuits and by reference to Table III. The manner in which the output terminals are utilized to control an external circuit will appear below in the description of the flow computer of my invention.

It will be apparent that the required addition modules can be made identical, with great resulting economies in design and manufacture. For example, the described modules are adapted to be enclosed in a container which may be provided with plug terminals corresponding to the illustrated terminals $a$ through $i$ of the modules. Such modules make it possible to make up an adder having any required capacity without design effort other than the physical layout of the elements.

THE SUBTRACTER

FIGS. 6$a$ and 6$b$ show a subtracter particularly adapted for use with the other components of my invention. This unit comprises modules, similar to those employed in the adder previously described, each module comprising a double coil relay of the type which will close its front contacts when either coil is energized and to close its back contacts when neither coil is energized or when both coils are energized. It should be noted that in describing this embodiment as well as in describing other embodiments of my invention, "module" should be thought of as implying the structure set off by dotted lines, as the dotted lines themselves, and arbitrary terminals located thereon, are merely a device adapted for expository convenience.

The subtracter of my invention is adapted to be employed only with numbers of known relative magnitude. In other words, it must be known that one of the numbers is equal to or larger than the other number. The larger number is applied in weighted binary code to a set of terminals A0 through A$n$ at the upper left in FIG. 6$a$, and the smaller of the two numbers is applied to a set of terminals B0 through B$n$ at the upper right of FIG. 6$b$. For example, if it were desired to subtract 4, or binary 100, from 6, or binary 110, 6 would be entered on leads A by energizing leads A1 and A2 and leaving lead A0 deenergized, and 4 would be entered on lead B by energizing terminal B2 and leaving the remaining terminals deenergized.

The output difference, which may be symbolized as A—B, appears on a set of output terminals D0 through D$n$, as shown in FIG. 6$b$. As shown in FIGS. 6$a$ and 6$b$, each of terminals D0 through D$n$ is connected to the terminal $e$ of a corresponding ordered subtraction module 0M through $n$M. Each of the corresponding digits of the A input are applied to input terminal $a$ of the corresponding ordered module, and each of the digits B is applied to terminal $b$ of the corresponding ordered module. It should be remarked to this point that the placement of the binary point is immaterial to the operation of the subtracter, so long as the input digits are properly registered with each A digit of a given order applied to the same module as the corresponding ordered B digit.

The structure and operation of the modules for providing the proper difference signal at terminal *e* in response to inputs applied to terminals *a* and *b* will now be described. First, the general module, typified by module 1M, will be described, since if so desired this module could be used for all ordered digits. Special modifications for the 0M, *n*M, and ($n-1$) M modules, which merit certain economies where desired, will then be described.

The general process of subtraction of one digit of any order from another of the same order is summarized below in Table IV. Each of the differences is given an arbitrary number from 1 to 8, for reference convenience. An arrow to the right of the difference indicates a previous borrow, and an arrow to the left of the difference indicates a borrow from the next higher digit.

*Table IV*

| | (1) | (2) | (3) | (4) |
|---|---|---|---|---|
| | 0 | 0 | 1 | 1 |
| | 0 | 1 | 0 | 1 |
| | 0 | ←1 | 1 | 0 |

| | (5) | (6) | (7) | (8) |
|---|---|---|---|---|
| | 0 | 0 | 1 | 1 |
| | 0← | 1← | 0← | 1← |
| | ←1 | ←0 | 0 | ←1 |

Table V summarizes the operation of the general module for each of the possible cases 1 through 8 above.

*Table V*

| Case | R1 | *a* | *b* | *c* | *d* | *e* | *f* | *g* |
|---|---|---|---|---|---|---|---|---|
| 1 | Down | 0 | 0 | 1 | 0 | 0 | 0 | 1 |
| 2 | Up | 0 | 1 | 1 | 0 | 1 | 1 | 0 |
| 3 | Up | 1 | 0 | 1 | 0 | 1 | 0 | 1 |
| 4 | Down | 1 | 1 | 1 | 0 | 0 | 0 | 1 |
| 5 | Down | 0 | 0 | 0 | 1 | 1 | 1 | 0 |
| 6 | Up | 0 | 1 | 0 | 1 | 0 | 1 | 0 |
| 7 | Up | 1 | 0 | 0 | 1 | 0 | 0 | 1 |
| 8 | Down | 1 | 1 | 0 | 1 | 1 | 1 | 0 |

Referring now to FIG. 6*a*, module 1M is an example of the general module. This module comprises a relay R1 having a first coil connected to input terminal *a* and a second coil connected to input terminal *b*. Terminal *c* is energized from the previous module when there is no previous borrow, and terminal *d* is energized from the previous module when there is a previous borrow.

Terminal *e* is energized when the corresponding difference digit is 1. For this purpose, terminal *e* has a first energizing circuit, which extends from no-previous-borrow terminal *c* over the front point of contact *a* of relay R1, and which energizes terminal *e* in cases 2 and 3 of Table V above. Terminal *e* has a second energizing circuit, which extends from previous-borrow terminal *d* over the back point of contact *a* of relay R1 and energizes terminal *e* in cases 5 and 8 of Table V above. Terminal *e* is deenergized in the remaining possible combination of inputs in the manner shown in Table V.

Terminal *f* is energized when it is necessary to borrow one from the next higher order module. Terminal *f* has a first energizing circuit extending from input terminal *b* over the front point of contact *c* of relay R1. This energizes terminal *f* in cases 2 and 6 of Table V. Terminal *f* has a second energizing circuit extending from input terminal *d* over the back point of contact *a* of relay R1 and the back point of contact *c* of relay R1 to energize terminal *f* in cases 5 and 8 of Table V.

Terminal *g* is energized when there is no borrow from the next module. Terminal *g* has a first energizing circuit extending from input terminal *c* over the back point of contact *b* of relay R1 to energize terminal *g* in cases 1 and 4 of Table V. Terminal *g* has a second energizing circuit extending from input terminal *a* over the front point of contact *b* of relay R1 to energize terminal *g* in cases 3 and 7 of Table V.

It will be apparent from the above description that the circuit arrangement for module 1M is capable of carrying out subtraction in each of the possible cases shown in Table V. This circuit could be used for all modules if so desired, and it may be desirable to do this for reasons of production and economy where it is desired to produce a large number of units, particularly where relatively large numbers of digits are to be employed. However, where production considerations do not justify standardization of all of the units, certain economies can be realized in the first, last and next to last modules, as will now be described.

The 0 order module 0M never has a previous borrow. Accordingly, the terminals *c* and *d* of the general module may be replaced by a single battery connection, here shown as a connection from terminal B of the battery to the heel of contact *c* of relay R0. Since there is never a previous borrow, the operation of this module need only take care of cases 1 through 4 of Tables IV and V above. The necessary operation is summarized in Table VI below.

*Table VI*

| Case | R0 | *a* | *b* | *e* | *f* | *g* |
|---|---|---|---|---|---|---|
| 1 | Down | 0 | 0 | 0 | 0 | 1 |
| 2 | Up | 0 | 1 | 1 | 1 | 0 |
| 3 | Up | 1 | 0 | 1 | 0 | 1 |
| 4 | Down | 1 | 1 | 0 | 0 | 1 |

As shown in Table VI, difference terminal *e* need only be energized when relay R0 is up. Accordingly, a single circuit is provided which extends from terminal B of the battery over the front point of contact *c* of relay R0.

As shown in Table VI, borrow terminal *f* is energized only in case 2. For this purpose, it has a single circuit extending from terminal *b* of module 0M over front contact *b* of relay R0. Terminal *g* is energized in cases 1, 3 and 4 of Table VI. To take care of cases 1 and 4, terminal *g* has a circuit extending from terminal B of the battery over back contact *c* of relay R0. For case 3, terminal *g* has a circuit extending from terminal *a* over the front point of contact *a* of relay R0.

The *n*th module *n*M is drastically simplified by the fact that the numbers applied to the B terminals are always less than the numbers applied to the A terminals. Accordingly, module *n*M will never encounter cases 2, 5, 6 and 8. The remaining cases are summarized in Table VII below.

*Table VII*

| Case | R*n* | *a* | *b* | *c* | *e* |
|---|---|---|---|---|---|
| 1 | Down | 0 | 0 | 1 | 0 |
| 3 | Up | 1 | 0 | 1 | 1 |
| 4 | Down | 1 | 1 | 1 | 0 |
| 7 | Up | 1 | 0 | 0 | 0 |

Since module *n*M is the highest ordered module, no *f* and *g* terminals are needed. As can be seen from Table VII above, the only case in which difference terminal *e* is energized is that in which no-previous-borrow terminal *c* is energized, terminal *a* is energized, and relay R*n* is picked up. This case is taken care of by a single circuit extending from terminal *c* over front contact *a* of relay R*n* to terminal *e*. In this connection, it should be noted that relay R*n* will never be picked up with input terminal *b* energized, because the B input is always the smaller number.

In view of the simplification of the *n*th module described above, module ($n-1$)M may be simplified by the omission of terminal *f* and its associated circuits in a manner believed to be sufficiently obvious from a comparison of the circuits of modules ($n-1$)M and 1M.

The operation of the apparatus in general is summarized in the above tables. However, in order to make the overall operation clear, an example will be given. For this purpose, consider the subtraction of 5 from 13. 13 is binary 1101. This number is entered on terminals A*i* by energizing leads A0, A2 and A3 (the latter two may be considered to be A$n-1$ and A*n*, respectively), and leaving terminal A1 deenergized. 5 is binary 101, and may be entered on terminals B*i* by energizing terminals B0 and B2 (which may be considered to be B($n-1$)) and leaving terminal B1 deenergized.

Turning now to module 0M in FIG. 6*b*, with terminals A0 and B0 both energized, terminals *a* and *b* will be energized and relay R0 will be released. Terminal *e* will be deenergized, since its energizing circuit is interrupted at the open front point of contact *c* of relay R0. Accordingly, output terminal D0 will be deenergized. The circuit for borrow terminal *f* will be interrupted at the open front point of contact *b* of relay R0. Terminal *f* will thus be deenergized. No-borrow terminal *g* will be energized from terminal B of the battery over the back point of contact *c* of relay R0.

Referring now to FIG. 6*a*, terminal *c* of module 1M will be deenergized from terminal *g* of module 0M. Terminal *d* of module 1M will be deenergized because terminal *f* of module 0M is deenergized. Since both terminals A1 and B1 are deenergized, relay R1 will be deenergized. This combination of inputs will be recognized as case 1 of Table V above. Accordingly, as shown in Table V, terminals *e* and *f* will be deenergized and terminal *g* will be energized. Since terminal *e* is deenergized, output terminal D1 will be deenergized.

Module ($n-1$)M will be next module, and may be assumed to be connected directly to module 1M. Terminal *c* will now be energized from terminal *g* of module 1M, and terminal *d* will be deenergized, since terminal *f* of module 1M is deenergized. Since both terminals A2 and B2 are energized, terminals *a* and *b* of module ($n-1$)M will be energized and relay R($n-7$) will be released. This will be recognized case 4 of Table V above, except that, as modified, module ($n-1$)M has no output terminal *f*. However, in accordance with Table V, output terminal *e* will be deenergized, since it is connected over back contact *a* of relay R($n-1$) to deenergized terminal *d*, and terminal *g* will be energized, since it is connected over back contact *b* of relay R($n-1$) to energized terminal *c*. With terminal *e* deenergized, output terminal D($n-1$) (or D2) will be deenergized.

Referring now to module *n*M, or module 3M in the example given, input terminal *c* will be energized from no-borrow terminal *g* of module ($n-1$)M. Since terminal A*n* or A3 is energized, and there is no input to the corresponding terminal B*n*, terminal *a* of module *n*M will be energized and terminal *b* will be deenergized. Relay R*n* will accordingly be energized and output terminal *e* will be energized from energized terminal *c* over front contact *a* of relay R*n*. Output terminal D*n* or D3 will be energized from terminal *e* of module *n*M, and an output of 1000, or decimal 8, will be indicated.

The operation of the subtracter of my invention in combination with external input and output circuitry will be made apparent below in the description of the flow computer of my invention.

THE SIMPLIFIED LOG GENERATOR

FIG. 7 shows a simplified circuit for generating logarithms to the base 2 of a number from 1 to 8. This circuit is particularly adapted for use with the flow computer to be described below. In the flow computer, the total flow is proportional to the number of pipes in parallel through which fluid is flowing. For most applications, the number of parallel runs of pipes will not exceed eight, and the simplified generator to be described accordingly effects substantial economies in the computer.

As shown in FIG. 7, the simplified log generator comprises a plurality of input terminals *a*, *b*, *c* and *d*, a plurality of output terminals *e*, *f*, *g*, *h*, *i*, *j*, *k* and *l*, three relays R1, R2 and R4, and associated circuitry, to be described.

The number whose logarithm is to be generated is applied to leads *a*, *b*, *c*, and *d* in weighted binary code, by energizing a combination of these terminals in accordance with the binary value of the number. As indicated in the drawing, these leads have the relative weights 8, 4, 2 and 1, corresponding respectively to the powers 3, 2, 1 and 0 of 2. Terminal *d* is directly connected to relay R1, the other terminal of the relay being connected to terminal N of the battery. Terminals *c* and *b* are similarly connected to relays R2 and R4, respectively, as shown. Accordingly, when any of these terminals is externally energized from terminal B of the battery, the corresponding relay will be picked up.

Output terminals *e* through *l* have the relative weights 2, 1, ½, ¼, 1/16, 1/32, 1/64 and 1/128, respectively, as shown. The reason why no ⅛ terminal is provided will appear.

Table VIII below summarizes the possible input conditions on terminals *a* through *d* with the corresponding output conditions on terminals *e* through *l*. As shown, the ⅛ position is always 0, and this is accordingly not provided with an output terminal. The binary numbers corresponding to the combinations of energized terminals *e* through *l* in Table VIII represent the binary logarithms to the base 2 of the binary numbers on the corresponding terminals *a*, *b*, *c* and *d*. For example, the binary logarithm of 0010 or decimal 2, is decimal 1, or 01.0000000 as shown in Table VIII.

Each of the output terminals is provided with a circuit to cause it to be energized in the proper case in Table VIII and to be deenergized at other times. For example, terminal *e* is energized for $N=4$, 5, 6, 7 or 8. Since no number larger than 8 will be encountered, it will appear from Table VIII that terminal *e* may be energized at any time when terminal *b* is energized. Accordingly, terminal *e* has a circuit extending from terminal B of the battery over the front point of contact *b* of relay R4 as shown. The only other time when terminal *e* should be energized is when the input on terminal *a* is 1. Accordingly, a second circuit for terminal *e* extends from terminal *a* over the back point of contact *b* of relay R4.

*Table VIII*

| N | *a* | *b* | *e* | *d* | *c* | *f* | | *g* | *h* | ⅛ | *i* | *j* | *k* | *l* |
|---|---|---|---|---|---|---|---|---|---|---|---|---|---|---|
| 0 | 0 | 0 | 0 | 0 | 0 | 0 | . | 0 | 0 | 0 | 0 | 0 | 0 | 0 |
| 1 | 0 | 0 | 0 | 1 | 0 | 0 | . | 0 | 0 | 0 | 0 | 0 | 0 | 0 |
| 2 | 0 | 0 | 1 | 0 | 0 | 1 | . | 0 | 0 | 0 | 0 | 0 | 0 | 0 |
| 3 | 0 | 0 | 1 | 1 | 0 | 1 | . | 1 | 0 | 0 | 1 | 0 | 1 | 1 |
| 4 | 0 | 1 | 0 | 0 | 1 | 0 | . | 0 | 0 | 0 | 0 | 0 | 0 | 0 |
| 5 | 0 | 1 | 0 | 1 | 1 | 0 | . | 0 | 1 | 0 | 1 | 0 | 0 | 1 |
| 6 | 0 | 1 | 1 | 0 | 1 | 0 | . | 1 | 0 | 0 | 1 | 0 | 1 | 1 |
| 7 | 0 | 1 | 1 | 1 | 1 | 0 | . | 1 | 1 | 0 | 0 | 1 | 1 | 1 |
| 8 | 1 | 0 | 0 | 0 | 1 | 1 | . | 0 | 0 | 0 | 0 | 0 | 0 | 0 |

Terminal *f*, as shown in Table VIII, is energized for all permissible inputs in which terminal *b* is deenergized and terminal *c* is energized. Accordingly, terminal *f* has a circuit extending from terminal B of the battery over back contact *a* of relay R4 and the front point of contact *a* of relay R2. Terminal *f* is also energized when terminal *a* is energized. Accordingly, terminal *f* has a second circuit extending from terminal *a* over the back point of contact *a* of relay R2. In a similar manner, circuits are provided for each of the other terminals to energize these terminals in each case in Table VIII where energization is required. Since the circuits are shown in detail in FIG. 7, and the manner in which they are to be derived from the conditions summarized in Table VIII has been illustrated, it is believed unnecessary to describe all of the circuits for the remaining terminals.

The operation of this embodiment of my invention can best be understood by the consideration of a suitable example. For this purpose, assume that it is desired to generate the logarithm of 6, or binary 0110. Referring to Table VIII, it will be apparent that terminals *e* through *l* should be energized in the pattern 10101011. In the example given, the input 0110 is applied by applying terminal B of the battery, from any external source, not shown, to terminals *b* and *c*, leaving terminals *a* and *d* deenergized. Accordingly, relays R2 and R4 will be energized and relay R1 will be deenergized. Terminal *e* will now be energized over its previously traced circuit from terminal B of the battery over the front point of contact *b* of relay R4. The circuit for terminal *f* will be interrupted at the open back contact *a* of relay R4. A circuit for terminal *g* will extend from terminal B of the battery over front contact *d* of relay R4 and front contact *b* of relay R2. Terminal *h* will be deenergized at the open front contact *a* of relay R1. Terminal *i* will be energized over a circuit extending from terminal B of the battery over front contact *c* of relay R2, front contact *e* of relay R4, back contact *b* of relay R1, and thence to terminal *i*. Terminal *j* will be deenergized, its circuits being interrupted at the open front contact *c* of relay R1. Terminal *k* will be energized over a circuit extending from terminal B of the battery over front contact *c* of relay R2, front contact *e* of relay R4, and the front point of contact *e* of relay R2. Terminal *l* will be energized over a circuit extending from terminal B of the battery over front contact *c* of relay R2, the front point of contact *e* of relay R4, and thence to terminal *l*. It will thus appear that the correct logarithm 10.1001011 is available at the output, recalling that the 1/8 position is not represented by a terminal because it is always 0.

The manner in which this apparatus operates with external circuits will be made apparent in the description of the flow computer of my invention below.

THE GENERAL LOGARITHM GENERATOR

FIGS. 8*a*, 8*b* and 8*c* show one form of a logarithm generator adapted to be employed, either as a computer component, or alone as a logarithm computer or generator. As shown, this embodiment is adapted to generate the logarithm to the base 2 of any number from 1 to (128—1/128), but the manner of extending it to larger numbers will be apparent as the description proceeds.

A binary number whose logarithm is to be generated is applied to input leads 32′ through 45, inclusive, having a plurality of input terminals as shown in the upper right-hand corner of FIG. 8*c* to which terminal B of the battery can be applied in a binary code pattern depending on the number. As indicated, these leads have relative weights 64, 32, 16, 8, 4, 2, 1, 1/2, 1/4, 1/8, 1/16, 1/32, 1/64, and 1/128. (Corresponding reference numerals which may coincide with any of these relative weights have been primed.) The logarithm generator further comprises seven register shift relays RS1, RS2, RS4, RS8, RS16, RS32 and RS64 as shown in FIGS. 8*a* and 8*b*.

In FIG. 8*a* there is shown an adder 79, which may correspond in detail to the adder described in connection with FIGS. 5*a* and 5*b*. In FIG. 8*c* is shown a log deviation generator, which may correspond in detail to the log deviation generator shown in FIG. 10 and to be described below.

As pointed out above in the discussion of the mathematical basis of my invention, the term A, which corresponds to the approximate mantissa of the logarithm of a binary number, may be generated by copying the digit sequence following the highest order 1 in the number. From the digits of the approximate mantissa A, the deviation correction factor can be determined. The characteristic *n* of the logarithm can be found by counting the order of the highest ordered 1 in the input. The logarithm of the number is then found by forming the sum $n+A+B$. The circuits for carrying out these processes will now be described.

The binary digits of the output number which are 1 or larger are applied to register shift relays in the manner shown. That is, lead 32′, carrying the binary digit 64, is connected to relay RS64. Similarly, leads 33, 34, 35, 36, 37 and 38 are respectively connected to the successively lower ordered register shift relays RS32, RS16, RS8, RS4, RS2 and RS1. Accordingly, each of these relays is energized or deenergized accordingly as its corresponding digit input terminal is energized or deenergized, respectively.

Adder 79, shown in FIG. 8*a*, is adapted to add the number $n+A$ to the number B. As will appear, the number B will never have a 1 in a higher ordered position than the 1/16 position. Accordingly, counting upward from the 1/128 position and including two positions of lower order than 1/128 (see FIG. 10), adder 79 is provided with six terminals B0 through B5 which may readily be identified with the corresponding circuitry in FIGS. 5*a* and 5*b*.

The characteristic *n* of the logarithm of a number between decimal 1.00 and 127 will lie between 0 and 7. Accordingly, the characteristic *n* will require three integral digit positions, namely, the positions having the weights 4, 2 and 1. Accordingly, counting upward from the A0 digit which is assumed to be the 1/512 digit, to agree with the lowest order input from the log deviation generator 80, it will be seen that terminals A0 through A11 are required for the adder. Thus, terminals A9, A10 and A11 correspond to the digits 1, 2 and 4, respectively, of the characteristic *n*, and the remaining A*i* terminals represent the approximate mantissa A.

The adder is provided with output terminals S0 through S12 as shown. For this adder, the negative truth values of the outputs are not required, and their output terminals are not shown.

The circuits for supplying the characteristic *n* to terminals A9, A10 and A11 will now be described. Table IX below shows the characteristic *n* corresponding to various values of a number N in which there is a digit of 1 or larger. The binary values of characteristic *n* may be identified, reading from left to right, with terminals A11, A10 and A9 of adder 79.

As shown, terminal A11 should be energized when and only when any of relays RS64, RS32 and RS16 are energized. For this purpose, terminal A11 is provided with a first circuit which extends from terminal B of the battery over the front point of contact *a* of relay RS64. Terminal A11 is provided with a second circuit which extends from terminal B of the battery over the back point of contact *b* of relay RS64, the front point of contact *a* of relay RS32, and the back point of contact *a* of relay RS64. Terminal A11 has a third energizing circuit which extends from terminal B of the battery over the back point of contact *b* of relay RS64, the back point of contact *a* of relay RS32, the front point of contact *a* of relay RS16, and the back point of contact *a* of relay RS64.

As shown in Table IX, terminal A10 is energized in cases 1, 4 and 5. The first case is treated by a circuit for terminal A10 which extends from terminal B of the battery over the front point of contact *b* of relay RS64. Case 4 is treated by a circuit for terminal A10 which extends from terminal B of the battery over the back point of contact *b* of relay RS64, the back point of contact *a* of relay RS32, the back point of contact *a* of relay RS16, the front point of contact *a* of relay RS8, and the back point of contact *c* of relay RS64. Case 5 is treated by a circuit for relay A10 which extends from terminal B of the battery over the back point of contact *b* of relay RS64, the back point of contact *a* of relay RS32, the back point of contact *a* of relay RS16, the back point of contact *a* of relay RS8, lead 59, the front point of contact *a* of relay RS4, lead 58, and over the back point of contact *c* of relay RS64 to terminal A10.

*Table IX*

| Case | N | | | | | | | *n* | | |
|---|---|---|---|---|---|---|---|---|---|---|
| | RS64 | RS32 | RS16 | RS8 | RS4 | RS2 | RS1 | A11 | A10 | A9 |
| 1 | 1 | ---- | ---- | ---- | ---- | ---- | ---- | 1 | 1 | 0 |
| 2 | 0 | 1 | ---- | ---- | ---- | ---- | ---- | 1 | 0 | 1 |
| 3 | 0 | 0 | 1 | ---- | ---- | ---- | ---- | 1 | 0 | 0 |
| 4 | 0 | 0 | 0 | 1 | ---- | ---- | ---- | 0 | 1 | 1 |
| 5 | 0 | 0 | 0 | 0 | 1 | ---- | ---- | 0 | 1 | 0 |
| 6 | 0 | 0 | 0 | 0 | 0 | 1 | ---- | 0 | 0 | 1 |
| 7 | 0 | 0 | 0 | 0 | 0 | 0 | 1 | 0 | 0 | 0 |

As shown in Table IX above, terminal A9 is required to be energized in cases 2, 4 and 6. Case 2 is treated by a circuit extending from terminal B of the battery over the back point of contact *b* of relay RS64, the front point of contact *b* of relay RS32, and thence to terminal A9. Case 4 is treated by a circuit extending from terminal B of the battery over the back point of contact *b* of relay RS64, the back point of contact *a* of relay RS32, the back point of contact *a* of relay RS16, the front point of contact *b* of relay RS8, and over the back point of contact *b* of relay RS32 to terminal A9. Case 6 is treated by a circuit which extends from terminal B of the battery over back contact *b* of relay RS64, back contact *a* of relay RS32, the back point of contact *a* of relay RS16, the back point of contact *a* of relay RS8, lead 59, the back point of contact *a* of relay RS4, the front point of contact *a* of relay RS2, lead 60, the back point of contact *b* of relay RS8, the back point of contact *b* of relay RS32, and thence to terminal A9. It will thus be apparent that the proper characteristic *n* is applied to terminals A11, A10 and A9 of adder 79 under the various conditions summarized in Table IX above.

The term A in the logarithm is derived by registering all of the digits of the input number to the right of the highest ordered 1 as though the binary point were just to the left of this digit sequence. This function is accomplished in the logarithm generator of my invention by register-shifting the input in accordance with the highest ordered 1. In particular, if the highest ordered digit is 64 and relay RS64 is energized, lead 33 bears the first of the A digits and this digit is applied to terminal A8 of adder 79 over front contact *d* of relay RS64. Similarly, it will be seen from FIGS. 8*a*, 8*b* and 8*c* that the remaining lower ordered digits on leads 34 through 41 are applied to terminals A7 through A0, respectively, of the adder 79. In this case, lead 41 having weight ⅛ in the input becomes $1/512$ in the output, and the remaining digits of the input are discarded because they do not affect the output to the order of accuracy retained in the illustrated embodiment.

In a similar manner, it will be seen that similar circuits are provided for down-shifting the digits one register for each unit decrease in the highest ordered digit. That is, with relay RS32 up and relay RS64 down, the highest retained digit is that on lead 34, which is applied to terminal A8 over the front point of contact *c* of relay RS32 and the back point of contact *d* of relay RS64. In this case, the last retained digit is the digit of weight $1/16$ appearing on lead 42, which is applied to terminal A0 of adder 79 over back contact *l* of relay RS64, the front point of contact *k* of relay RS32, and thence over lead 72 to input lead 42. Without tracing the intermediate shifting in detail, since it is believed that it will be readily apparent from FIGS. 8*a*, 8*b* and 8*c*, it will be seen that this process is continued until, in the case in which only relay RS1 is energized, the highest ordered retained digit is that on lead 39 having weight ½, and the lowest ordered retained digit is that on lead 45, which in this case is applied to terminal A2, terminals A0 and A1 remaining unoperated. Accordingly, it is apparent that in this last condition the logarithm is less accurate than in other conditions. The reason for this is that normally the accuracy of the inputs in the lowest range is less than in higher ranges. However, additional contacts and input leads could be provided, similar to those shown for other terminals, for retaining the last digit in the RS1 and RS2 register shift positions if so desired.

By the above described apparatus, the log generator of my invention applies the characteristic *n* and the approximate mantissa A as one input to adder 79. The manner of deriving the deviation factor B from the approximate mantissa will now be described.

As shown in FIG. 8*a*, the leads to the six adder terminals A8 through A3, representing the six highest ordered digits of the approximate mantissa A, are tapped off by leads 51, 50, 49, 48, 47 and 46, respectively. As shown in FIG. 8*c*, leads 51, 50, 49, 48, 47 and 46 are connected to input terminals *a*, *b*, *c*, *d*, *e* and *f*, respectively, of a log deviation generator 80. The details of this log deviation generator are shown in FIG. 10 and will be described below. It is sufficient for present purposes to note that in response to an input applied to terminals *a* through *f*, the log deviation generator supplies on output terminals *g* through *l* certain of the digits of the deviation B corresponding to the applied input A. As will appear, the first three digits of B starting with binary ½ and including binaries ¼ and ⅛, are always 0. Accordingly, the output leads are only provided for the positions from the $1/16$ position corresponding to terminal *g* to the $1/512$ position corresponding to terminal *l*. Only the first six digits of A are used, because the deviation calculated from these six digits is within the accuracy of the input.

As shown, the output on terminals *g* through *l* of log deviation generator 80 is applied over leads 52 through 57, inclusive, respectively, to input terminals B5, B4, B3, B2, B1 and B0 of adder 79. The adder functions in the manner described in connection with FIGS. 5*a* and 5*b* to generate an output sum on its terminals S0 through S12 corresponding to the logarithm of the input number applied to leads 32′ through 45.

As an example of this embodiment of my invention, let it be desired to generate the logarithm to the base 2 of the number 75.25, or binary 1001011.0100000. It is assumed that this number is applied to the input leads, FIG. 8*c*, by energizing leads 32′, 35, 37, 38 and 40, with the remainder of the leads remaining deenergized.

With lead 32′ energized, relay RS64 will be energized and terminal A11 of adder 79 will be energized over the front point of contact *a* of relay RS64. Terminal A10 of adder 79 will be energized over the front point of contact *b* of relay RS64. With relay RS64 energized, terminal A9 will be deenergized, as can be seen by tracing back from terminal A9 over its various possible circuits. The proper characteristic of 6 or 110 thus appears on leads A11, A10 and A9.

With relay RS64 energized, leads 33 through 41 are connected to adder terminals A8 through A0. Therefore, the appropriate approximate mantissa A of .001011010 appears on input terminals A8 through A0 of adder 79. The first six digits, or 001011, of the approximate mantissa A are applied to terminals *a*, *b*, *c*, *d*, *e* and *f* of log deviation generator 80 as previously described. As will appear, the appropriate term B in this case is .000011110. The first three digits of B are always 0, and can be ignored. The last six digits, or 011110, will appear on terminals *g* through *l* of log deviation generator 80 in a manner to be described. As described above, terminals *g* through *l* of generator 80 are connected to terminals B5 through B0, respectively, of adder 79. Thus, at the left-hand side of adder 79 appears the input 110.001011010, and at the right-hand side appears the input 011110. The corresponding sum, 110.001111000, or decimal 6.234+, will appear at the output and corresponds to the binary logarithm to the base 2 of the input. In decimal terms, the logarithm of 75.25 to the base 2 equals 6.23, approximately, as can be verified readily on a slide rule.

THE APPROXIMATE LOGARITHM GENERATOR

FIGS. 9*a* and 9*b* show the details of a module for generating the characteristic *n* and the approximate mantissa A of the logarithm to the base 2 of a number N expressed in weighted binary code. This unit is essentially the same as the corresponding portion of the complete logarithm generator shown in FIGS. 8*a*, 8*b* and 8*c*. It is here shown and described principally to emphasize its utility as a component of a system in which, either approximate logarithms of the form $n+A$ are used, or the individual corrections B for the various logarithms involved are not individually summed with the corresponding values of A, an example of the latter of which will be given below in the description of the flow computer of my invention.

As shown in FIG. 9*a*, the approximate log generator is illustrated as having fourteen input terminals *a* through *n*. This set of input terminals is capable of handling binary numbers from 1 to a number equal to 128–1/128. As will later appear, it is quite practical, by register shifting, to use this input range for all computation purposes within the accuracy (approximately ¾ of 1%) for which it is designed; if more accuracy is necessary, as will appear, it is only necessary to add more input capacity for the lower ordered positions below 1/128.

As shown in FIG. 9*b*, the approximate log generator is provided with a first set of output terminals *o*, *p* and *q*, for generating the characteristic *n*, and a second set of output terminals *r* through *z*, for generating the approximate mantissa A.

Referring now to FIG. 9*a*, another output terminal 0D is provided for purposes which will appear. This terminal is energized when the input is a fraction, or 0, to provide 0 detection for an external computer. This 0 detection is necessary in the apparatus shown since it is not designed to handle negative logarithms, and since the relationship on which log generation is based is discontinuous at $N=0$.

The log generator is provided with seven register shift relays RS1, RS2, RS4, RS8, RS16, RS32 and RS64, which have been previously described in connection with the complete log generator. These relays are controlled from terminals *g*, *f*, *e*, *d*, *c*, *b*, and *a*, respectively, in a manner obvious from the drawings and previously described. In addition to the previous description, it should be noted that in this embodiment, the input circuit for relay RS1 is provided with a rectifier 81 to prevent feedback to external input circuits under certain conditions.

The 0 detection circuit for terminal 0D in FIG. 9*a* extends from terminal B of the battery in FIG. 9*b* over the back point of contact *b* of relay RS64, the back point of contact *a* of relay RS32, the back point of contact *a* of relay RS16, to FIG. 9*a*, and over the back point of contact *a* of relay RS8, the back point of contact *a* of relay RS4, the back point of contact *a* of relay RS2, and back contact *a* of relay RS1 to terminal 0D. Terminal 0D is thus energized as previously described when an input less than 1 is applied to the approximate log generator.

The circuits for characteristic terminals *o*, *p* and *q* have been described in connection with FIGS. 8*a*, 8*b* and 8*c*, and this description will not be repeated except to note that these terminals are energized or deenergized in accordance with Table IX above; for example, with relay RS64 energized the corresponding characteristic of 6 or 110 would appear on terminals *o*, *p* and *q*, terminals *o* and *p* being energized and terminal *q* being deenergized, in the manner summarized in Table IX.

As previously described above in connection with FIGS. 8*a*, 8*b* and 8*c*, output terminals *r* through *z* repeat the digits of the input to the right of the highest ordered digit. For example, if the input on terminals *a* through *n* were 0010110.1101011, the highest ordered 1 would be on terminal *c* and the approximate mantissa A would appear on terminals *d* through *n* as .01101101011. Since only nine output terminals are provided, the first nine of these digits, or 011011010, would be retained and would appear on terminals *r* through *z*, and the lowest ordered digits on terminals *m* and *n* would be discarded. For convenience, the lowest ordered digits of the output are discarded when numbers less than 4 are encountered at the input. This is because additional contacts would not be justified in engineering applications where the input was near the bottom of the range, because the inherent accuracy of the input would be quite limited in this range. However, it will be apparent that additional contacts could be provided to retain all nine of the output digits for the entire range if so desired.

As should now be clear, digits on input terminals past the highest ordered 1 are shifted into registry with the output terminals over contacts of the register shift relays. In particular, highest ordered output terminal *r* is connected to input terminal *b* over the front point of contact *d* of relay RS64, is connected to input terminal *c* over back contact *d* of relay RS64 and the front point of contact *c* of relay RS32, is connected to input terminal *d* over the back point of contact *d* of relay RS64, the back point of contact *c* of relay RS32, and the front point of contact *b* of relay RS16, and so on. The lowest ordered terminal which can be so connected to output terminal *r* is input terminal *h*, the circuit extending in this case from input terminal *h* over front contact *b* of relay RS1 and thence over successive back contacts of relays RS2, RS4, RS8, RS16, RS32 and RS64 to terminal *r*. In a similar manner, terminal *s* can be connected to any of input terminals *c* through *i* depending on the position of the register shift relays; that is, depending on the highest ordered register shift relay which is operated. Output terminal *t* can be connected to input terminals *d* through *j*, output terminal *u* can be connected to terminals *e* through *k*, output terminal *v* can be connected to terminals *f* through *l*, output terminal *w* can be connected to input terminals *g* through *m*, and output terminal *x* can be connected to input terminals *h* through *n*. At output terminal *y*, the range is made more limited for reasons of practical accuracy, and the range of terminal *y* is from terminal *i* through input terminal *n*, while the range of terminal *z* is from input terminal *j* to input terminal *n*.

It is believed that a single example of the operation of this apparatus will serve to illustrate the switching operations performed. For example, assume that the input is 0001100.1001101. In this example, terminals *d*, *e*, *h*, *k*, *l* and *n* are energized and the remaining terminals are deenergized.

With terminal *d* the highest ordered energized terminal, relay RS8 will be the highest ordered energized register shift relay. Since terminal *e* is also energized, relay RS4 will also be energized. In Table IX above, it is seen that the characteristic of the input is 3 or 011.

Tracing the circuit back from output terminal *o*, over the back point of contact *a* of relay RS64, it will be seen that this circuit is interrupted at the open front points of contacts *a* of relays RS32 and RS16. Terminal *o* is accordingly deenergized. An energizing circuit for terminal *p* extends from terminal B of the battery over the back point of contact *b* of relay RS64, the back point of contact *a* of relay RS32, the back point of contact *a* of relay RS16, the front point of contact *a* of relay RS8, and over the back point of contact *c* of relay RS64 to terminal *p*. An energizing circuit for terminal *q* extends from terminal B of the battery over the back point of contact *b* of relay RS64, the back point of contact *a* of relay RS32, the back point of contact *a* of relay RS16, the front point of contact *b* of relay RS8, and over the back point of contact *b* of relay RS32 to terminal *q*. The proper characteristic, 011, accordingly appears on output terminals *o*, *p* and *q*.

With relay RS8 energized, a circuit for terminal *r* extends from input terminal *e* over the front point of contact *c* of relay RS8, the back point of contact *b* of relay RS16, the back point of contact *c* of relay RS32, and the back point of contact *d* of relay RS64. Since terminal *e* is energized, terminal *r* is now energized. By similar circuits, input terminals *f* through *m* are connected to output terminals *s* through *z*, respectively. For example, the circuit for terminal *z* extends from terminal *m* over the front point of contact *k* of relay RS8, the back point of contact *j* of relay RS16, the back point of contact *k* of relay RS32, and the back point of contact *m* of relay RS64. Terminals *s* through *z* will accordingly be energized in the pattern 00100110 corresponding to the input. The input on terminal *n* will be discarded.

It should be noted that the operation of lower ordered register shift relays has no effect on the circuits. This is because any circiut from an input terminal over a front contact of a lower ordered relay is broken at an open back contact of the next energized higher ordered relay. For example, in the previously traced circuit from terminal *m*, before the front point of contact *k* of relay RS8 is reached, a circuit is prepared over the front point of contact *i* of relay RS4. However, this circuit is interrupted at the open back point of contact *j* of relay RS8.

It will be apparent that I have described an approximate log generator capable of generating the logarithm to the base 2 of any number to within 6% accuracy. The input range could obviously be extended by increasing the number of inputs and providing corresponding register shift relays; the number of register shifting contacts would be larger, but they would be connected in the manner illustrated in FIGS. 9*a* and 9*b*. However, it is preferred in practicing my invention to limit the range of inputs on the upper side by employing suitable register shifts, as will be apparent as the descripton proceeds.

THE LOG DEVIATION GENERATOR

FIG. 10 shows a preferred embodiment of a log deviation generator in accordance with one embodiment of my invention. This unit is adapted to generate the deviation correction B from the first six binary digits of the approximate mantissa A of a given number. Methods have been given above for calculating these deviation factors to any desired degree of accuracy. For practical purposes, however, I prefer to use graphical methods based on curves such as those of FIGS. 1 through 4, and I have thus derived the series of values of B shown in Table X below with their corresponding values of the first six digits of A. It is to be understood that the binary point occurs just to the left of the first digit in each column of the table.

*Table X*

| A | | | | | | B | | | | | | | | |
|---|---|---|---|---|---|---|---|---|---|---|---|---|---|---|
| *a* | *b* | *c* | *d* | *e* | *f* | – | – | – | *g* | *h* | *i* | *j* | *k* | *l* |
| 0 | 0 | 0 | 0 | 0 | 1 | 0 | 0 | 0 | 0 | 0 | 0 | 1 | 0 | 0 |
| 0 | 0 | 0 | 0 | 1 | 0 | 0 | 0 | 0 | 0 | 0 | 1 | 0 | 0 | 0 |
| 0 | 0 | 0 | 0 | 1 | 1 | 0 | 0 | 0 | 0 | 0 | 1 | 1 | 0 | 0 |
| 0 | 0 | 0 | 1 | 0 | 0 | 0 | 0 | 0 | 0 | 1 | 0 | 0 | 0 | 0 |
| 0 | 0 | 0 | 1 | 0 | 1 | 0 | 0 | 0 | 0 | 1 | 0 | 0 | 1 | 0 |
| 0 | 0 | 0 | 1 | 1 | 0 | 0 | 0 | 0 | 0 | 1 | 0 | 1 | 0 | 0 |
| 0 | 0 | 0 | 1 | 1 | 1 | 0 | 0 | 0 | 0 | 1 | 0 | 1 | 1 | 0 |
| 0 | 0 | 1 | 0 | 0 | 0 | 0 | 0 | 0 | 0 | 1 | 1 | 0 | 0 | 0 |
| 0 | 0 | 1 | 0 | 0 | 1 | 0 | 0 | 0 | 0 | 1 | 1 | 0 | 1 | 0 |
| 0 | 0 | 1 | 0 | 1 | 0 | 0 | 0 | 0 | 0 | 1 | 1 | 1 | 0 | 0 |
| 0 | 0 | 1 | 0 | 1 | 1 | 0 | 0 | 0 | 0 | 1 | 1 | 1 | 1 | 0 |
| 0 | 0 | 1 | 1 | 0 | 0 | 0 | 0 | 0 | 1 | 0 | 0 | 0 | 0 | 0 |
| 0 | 0 | 1 | 1 | 0 | 1 | 0 | 0 | 0 | 1 | 0 | 0 | 0 | 0 | 1 |
| 0 | 0 | 1 | 1 | 1 | 0 | 0 | 0 | 0 | 1 | 0 | 0 | 0 | 1 | 0 |
| 0 | 0 | 1 | 1 | 1 | 1 | 0 | 0 | 0 | 1 | 0 | 0 | 0 | 1 | 1 |
| 0 | 1 | 0 | 0 | 0 | 0 | 0 | 0 | 0 | 1 | 0 | 0 | 1 | 0 | 0 |
| 0 | 1 | 0 | 0 | 0 | 1 | 0 | 0 | 0 | 1 | 0 | 0 | 1 | 0 | 1 |
| 0 | 1 | 0 | 0 | 1 | 0 | 0 | 0 | 0 | 1 | 0 | 0 | 1 | 1 | 0 |
| 0 | 1 | 0 | 0 | 1 | 1 | 0 | 0 | 0 | 1 | 0 | 0 | 1 | 1 | 1 |
| 0 | 1 | 0 | 1 | 0 | 0 | 0 | 0 | 0 | 1 | 0 | 1 | 0 | 0 | 0 |
| 0 | 1 | 0 | 1 | 0 | 1 | 0 | 0 | 0 | 1 | 0 | 1 | 0 | 0 | 1 |
| 0 | 1 | 0 | 1 | 1 | 0 | 0 | 0 | 0 | 1 | 0 | 1 | 0 | 1 | 0 |
| 0 | 1 | 0 | 1 | 1 | 1 | 0 | 0 | 0 | 1 | 0 | 1 | 0 | 1 | 1 |
| 0 | 1 | 1 | 0 | 0 | 0 | 0 | 0 | 0 | 1 | 0 | 1 | 1 | 0 | 0 |
| 0 | 1 | 1 | 0 | 0 | 1 | 0 | 0 | 0 | 1 | 0 | 1 | 1 | 0 | 0 |
| 0 | 1 | 1 | 0 | 1 | 0 | 0 | 0 | 0 | 1 | 0 | 1 | 1 | 0 | 0 |
| 0 | 1 | 1 | 0 | 1 | 1 | 0 | 0 | 0 | 1 | 0 | 1 | 1 | 0 | 0 |
| 0 | 1 | 1 | 1 | 0 | 0 | 0 | 0 | 0 | 1 | 0 | 1 | 1 | 0 | 0 |
| 0 | 1 | 1 | 1 | 0 | 1 | 0 | 0 | 0 | 1 | 0 | 1 | 1 | 0 | 0 |
| 0 | 1 | 1 | 1 | 1 | 0 | 0 | 0 | 0 | 1 | 0 | 1 | 1 | 0 | 0 |
| 0 | 1 | 1 | 1 | 1 | 1 | 0 | 0 | 0 | 1 | 0 | 1 | 1 | 0 | 0 |
| 1 | 0 | 0 | 0 | 0 | 0 | 0 | 0 | 0 | 1 | 0 | 1 | 1 | 0 | 0 |
| 1 | 0 | 0 | 0 | 0 | 1 | 0 | 0 | 0 | 1 | 0 | 1 | 1 | 0 | 0 |
| 1 | 0 | 0 | 0 | 1 | 0 | 0 | 0 | 0 | 1 | 0 | 1 | 1 | 0 | 0 |
| 1 | 0 | 0 | 0 | 1 | 1 | 0 | 0 | 0 | 1 | 0 | 1 | 1 | 0 | 0 |
| 1 | 0 | 0 | 1 | 0 | 0 | 0 | 0 | 0 | 1 | 0 | 1 | 0 | 1 | 1 |
| 1 | 0 | 0 | 1 | 0 | 1 | 0 | 0 | 0 | 1 | 0 | 1 | 0 | 1 | 0 |
| 1 | 0 | 0 | 1 | 1 | 0 | 0 | 0 | 0 | 1 | 0 | 1 | 0 | 0 | 1 |
| 1 | 0 | 0 | 1 | 1 | 1 | 0 | 0 | 0 | 1 | 0 | 1 | 0 | 0 | 0 |
| 1 | 0 | 1 | 0 | 0 | 0 | 0 | 0 | 0 | 1 | 0 | 0 | 1 | 1 | 1 |
| 1 | 0 | 1 | 0 | 0 | 1 | 0 | 0 | 0 | 1 | 0 | 0 | 1 | 1 | 0 |
| 1 | 0 | 1 | 0 | 1 | 0 | 0 | 0 | 0 | 1 | 0 | 0 | 1 | 0 | 1 |
| 1 | 0 | 1 | 0 | 1 | 1 | 0 | 0 | 0 | 1 | 0 | 0 | 1 | 0 | 0 |
| 1 | 0 | 1 | 1 | 0 | 0 | 0 | 0 | 0 | 1 | 0 | 0 | 0 | 1 | 1 |
| 1 | 0 | 1 | 1 | 0 | 1 | 0 | 0 | 0 | 1 | 0 | 0 | 0 | 1 | 0 |
| 1 | 0 | 1 | 1 | 1 | 0 | 0 | 0 | 0 | 1 | 0 | 0 | 0 | 0 | 1 |
| 1 | 0 | 1 | 1 | 1 | 1 | 0 | 0 | 0 | 1 | 0 | 0 | 0 | 0 | 0 |
| 1 | 1 | 0 | 0 | 0 | 0 | 0 | 0 | 0 | 0 | 1 | 1 | 1 | 1 | 1 |
| 1 | 1 | 0 | 0 | 0 | 1 | 0 | 0 | 0 | 0 | 1 | 1 | 1 | 1 | 0 |
| 1 | 1 | 0 | 0 | 1 | 0 | 0 | 0 | 0 | 0 | 1 | 1 | 1 | 0 | 0 |
| 1 | 1 | 0 | 0 | 1 | 1 | 0 | 0 | 0 | 0 | 1 | 1 | 0 | 1 | 0 |
| 1 | 1 | 0 | 1 | 0 | 0 | 0 | 0 | 0 | 0 | 1 | 1 | 0 | 0 | 0 |
| 1 | 1 | 0 | 1 | 0 | 1 | 0 | 0 | 0 | 0 | 1 | 0 | 1 | 1 | 0 |
| 1 | 1 | 0 | 1 | 1 | 0 | 0 | 0 | 0 | 0 | 1 | 0 | 1 | 0 | 0 |
| 1 | 1 | 0 | 1 | 1 | 1 | 0 | 0 | 0 | 0 | 1 | 0 | 0 | 1 | 0 |
| 1 | 1 | 1 | 0 | 0 | 0 | 0 | 0 | 0 | 0 | 1 | 0 | 0 | 0 | 0 |
| 1 | 1 | 1 | 0 | 0 | 1 | 0 | 0 | 0 | 0 | 0 | 1 | 1 | 1 | 0 |
| 1 | 1 | 1 | 0 | 1 | 0 | 0 | 0 | 0 | 0 | 0 | 1 | 1 | 0 | 0 |
| 1 | 1 | 1 | 0 | 1 | 1 | 0 | 0 | 0 | 0 | 0 | 1 | 0 | 1 | 0 |
| 1 | 1 | 1 | 1 | 0 | 0 | 0 | 0 | 0 | 0 | 0 | 1 | 0 | 0 | 0 |
| 1 | 1 | 1 | 1 | 0 | 1 | 0 | 0 | 0 | 0 | 0 | 0 | 1 | 1 | 0 |
| 1 | 1 | 1 | 1 | 1 | 0 | 0 | 0 | 0 | 0 | 0 | 0 | 1 | 0 | 0 |
| 1 | 1 | 1 | 1 | 1 | 1 | 0 | 0 | 0 | 0 | 0 | 0 | 0 | 1 | 0 |

*Table X*—Continued

From the table, and as would be expected from the mathematical discussion, it will be apparent that the deviation is always considerably smaller than the corresponding value of A. This makes it possible and practical to get a degree of accuracy consistent with the input by using only the first six digits of the mantissa to generate B. Another simplification arises from the fact that the first three digits of the factor B are always 0. Accordingly, only six output terminals need be provided for nine-digit accuracy in B.

Table X above also serves as an operation diagram for the log deviation generator. As indicated by the terminal designations above the column, the indicated inputs will be found in each case to generate the appropriate outputs. It is believed that it would be unnecessarily tedious to attempt to recite the details of each circuit completed for each entry in the table. Instead, since the detailed circuits are shown in FIG. 10, a method of arriving at the individual circuits will be indicated, and an example of the operation of the apparatus for a typical input will then be given.

The A and B columns of Table X above can be regarded as contact matrices, and the circuit operation of the log deviation generator can be regarded as a matrix transformation process. For example, the highest ordered digit in the output which is ever 1 appears on terminal *g*. From the table, it will appear that this terminal is energized from input 001100 to input 101111. This range of inputs can be regarded as a circuit matrix which can be simplified by matrix algebra techniques to provide the required output circuit for terminal *g* in terms of contacts of the input repeater relays DA1 through DA6, which are connected to repeat the input information as shown in FIG. 10. In order to show how these circuits may be derived from the matrices of Table X, a description of a theoretical method for designing such circuits will be given with illustrations from the circuits required for FIG. 10.

DERIVATION OF CIRCUITS FROM TRANSFORMATION MATRICES

Table X represents a transformation between matrix A and matrix B. That is, each digit in an A sequence corresponds to an input terminal or DA relay condition; thus, if the digit is 0, the corresponding terminal is deenergized and the corresponding DA relay is deenergized. If the digit is 1, the corresponding terminal and DA relay are energized. A sequence can be represented by a series of contacts of the DA relays, each in its front or back point engaging condition depending on whether the corresponding digit is 0 or 1. In order to derive circuits for the individual output terminals from the matrices, the matrix of inputs giving 1 in the desired output digit position is first written. Thus, for output terminal *g*, inspection of Table X shows that $g$ is energized for all inputs between 001100 and 101111. The $g$ matrix is thus all the parallel circuits represented by these sequences. These circuits can be considerably simplified by the following considerations:

First, for expository convenience, a given input sequence can be represented by its corresponding DA relay sequence, letting DAX represent an energized relay and $\overline{\text{DAX}}$ rpresent a deenergized relay. The highest permissible sequence, from the $g$ matrix above, is thus 101111 or DA1 $\overline{\text{DA2}}$ DA3 DA4 DA5 DA6. Therefore, 11– – – –, or DA1 DA2, is to be excluded. The lowest value in the matrix is 001100, or $\overline{\text{DA1}}$ $\overline{\text{DA2}}$ DA3 DA4 $\overline{\text{DA5}}$ $\overline{\text{DA6}}$. Thus, values of 000– – – or $\overline{\text{DA1}}$ $\overline{\text{DA2}}$ $\overline{\text{DA3}}$ are excluded. All of the following values are permitted:

($a$) $\overline{\text{DA1}}$ $\overline{\text{DA2}}$ DA3 DA4 – – – – – – – – – – –
($b$) $\overline{\text{DA1}}$ DA2 – – – – – – – – – – – – – – – – – – – –
($c$) DA1 $\overline{\text{DA2}}$ – – – – – – – – – – – – – – – – – – – – where the blanks mean that it does not matter whether the corresponding relays are energized or deenergized. In terms of actual circuits, referring now to FIG. 10, condition ($a$) above is met by a circuit extending from terminal B of the battery over the back point of contact $b$ of relay DA1, the back point of contact $c$ of relay DA2, the front point of contact $b$ of relay DA4, and the front point of contact $a$ of relay DA3 to terminal $g$. Condition $b$ above is met by a circuit extending from terminal B of the battery over the back point of contact $b$ of relay DA1 and the front point of contact $c$ of relay DA2 to terminal $g$. Condition $c$ above is met by a circuit extending from terminal B of the battery over the front point of contact $b$ of relay DA1 and the back point of contact $b$ of relay DA2 to terminal $g$.

The circuits for the remaining terminals may be derived by the same process. It will be apparent that it is not necessary to write the matrices out in full where the extremes are known, if the matrix is "saturated," or covers all possible values, between the extremes. Further, it is not necessary to use the relay designations; the matrix sequences can be used just as well if it is recalled that 001011, for example, means $\overline{\text{DA1}}$ $\overline{\text{DA2}}$ DA3 $\overline{\text{DA4}}$ DA5 DA6. Thus, to derive the $h$ terminal circuits, from Table X it is seen that the contact matrix can be represented by two matrices:

$$I=\left|\begin{array}{c}000100\\ \vdots\\ 001011\end{array}\right| \quad \text{and} \quad II=\left|\begin{array}{c}110000\\ \vdots\\ 111000\end{array}\right|$$

These matrices can be rewritten as $$I=00\left|\begin{array}{c}0100\\0101\\0110\\0111\\1000\\1001\\1010\\1011\end{array}\right| \quad \text{and} \quad II=11\left|\begin{array}{c}0000\\0001\\0010\\0011\\0100\\0101\\0110\\0111\\1000\end{array}\right|$$

since the first two digits in each matrix are common to all of the members, and the corresponding circuits could all include the same pair of contacts in series. The matrices can further be subdivided as follows:

$$I=00\left|\begin{array}{cc}01 & \left|\begin{array}{c}00\\01\\10\\11\end{array}\right|\\ 10 & \left|\begin{array}{c}00\\01\\10\\11\end{array}\right|\end{array}\right| \quad \text{and} \quad II=11\left|\begin{array}{cc}0 & \left|\begin{array}{c}000\\001\\010\\011\\100\\101\\110\\111\end{array}\right|\\ 1000 & \end{array}\right|$$

Now, where a sequence is followed by a saturated group, the saturated group can be omitted because it does not matter what its value happens to be.

Thus, $$I=00\left|\begin{array}{c}01--\\10--\end{array}\right| \quad \text{and} \quad II=11\left|\begin{array}{c}0---\\1000\end{array}\right|$$

At this point, the required circuits can easily be written as $$I=\begin{cases}\overline{DA1}\ \overline{DA2}\ \overline{DA3}\ DA4 \text{ ----- -----}\\ \overline{DA1}\ \overline{DA2}\ DA3\ \overline{DA4} \text{ ----- -----}\end{cases}$$

$$II=\begin{cases}\overline{DA1}\ DA2\ \overline{DA3} \text{ ----- ----- -----}\\ DA1\ DA2\ DA3\ \overline{DA4}\ \overline{DA5}\ \overline{DA6}\end{cases}$$

These circuits are readily simplified by inspection to

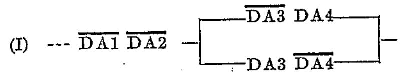

and

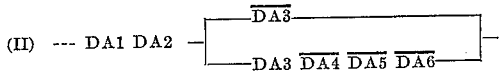

It will be apparent that the order of the elements in any given "and" sequence is immaterial; for example, $$DA3\ \overline{DA4}\ \overline{DA5}\ \overline{DA6}=\overline{DA5}\ \overline{DA4}\ \overline{DA6}\ DA3$$

Circuit (I) above can be traced in FIG. 10 as follows: From terminal B of the battery over the back point of contact $b$ of relay DA1 to the back point of contact $c$ of relay DA2, and thence over a first path including the back point of contact $b$ of relay DA4 and the front point of contact $b$ of relay DA3 to terminal $h$, and over a second path including the front point of contact $b$ of relay DA4 and the back point of contact $a$ of relay DA3 to terminal $h$. Circuit II above can be traced from terminal B of the battery over a first path including the front point of contact $b$ of relay DA1, the front point of contact $b$ of relay DA2, and over the back point of contact $b$ of relay DA3 to terminal $h$, and over a second path from terminal B of the battery including front contact $a$ of relay DA2, front contact $a$ of relay DA1, back contact $a$ of relay DA5, back contact $a$ of relay DA6, back contact $a$ of relay DA4, the back point of contact $b$ of relay DA4, and over the front point of contact $b$ of relay DA3 to terminal $h$. The additional contacts found in some of the above circuits which appear to be redundant are the result of combining circuits for several terminals where it was practical to do so; however, it is believed unnecessary to describe these refinements other than to remark that if, for example, two circuits include a common input circuit such as DA1 $\overline{\text{DA2}}$, obviously both circuits can use the same contacts of DA1 and DA2.

The method of arriving at particular circuits from the contact matrices is believed to be sufficiently apparent from the above description so that it is unnecessary to derive the remaining terminal circuits, which are shown in detail in FIG. 10. However, a further simplification in the derivation is possible in certain cases, and will be illustrated by the derivation of the circuit for terminal $l$ of the log deviation generator.

In many instances, all or a portion of a column in a matrix will be observed to be identical with corresponding row positions in a column of the transformation matrix. For example, it can be seen from Table X that the $l$ terminal column follows the $f$ input terminal from input 001100 to input 011000, is the opposite of the $f$ input terminals from input 100011 to input 110001, and is 0 for other inputs. This situation can be seen to lead immediately to two circuits, one closed over all combinaatoms from 001100 to 011000 and including a front contact of relay DA6, and the other closed over all combinations from 100011 to 110001 and including a back contact of relay DA6. While the previous methods would also lead to an equivalent circuit, this permits the reduction to be made with less effort. The two circuits can be symbolically represented as

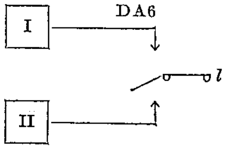

where matrices are $$I=\left|\begin{array}{c}001100\\ \vdots\\ 011000\end{array}\right| \text{ and } II=\left|\begin{array}{c}100011\\ \vdots\\ 110001\end{array}\right|$$

expanding, $$I=0\left|\begin{array}{l}011\text{--}\\ 100\text{--}\\ 101\text{--}\\ 11000\end{array}\right| \text{ and } II=1\left|\begin{array}{l}00011\\ 001\text{--}\\ 01\text{---}\\ 10000\\ 10001\end{array}\right|$$

reducing, $$I=0\left|\begin{array}{l}011\text{--}\\ 10\text{---}\\ 11000\end{array}\right| \text{ and } II=1\left|\begin{array}{l}00011\\ 001\text{--}\\ 01\text{---}\\ 1000\text{-}\end{array}\right|$$

rearranging, $$I=\left|\begin{array}{l}0011\text{--}\\ \quad +\\ 01\left|\begin{array}{l}0\text{---}\\ 1000\end{array}\right|\end{array}\right| \text{ and } II=1\left|\begin{array}{l}00\left|\begin{array}{l}011\\ 1\text{--}\end{array}\right|\\ 01\text{---}\\ 10000\end{array}\right|$$

Next, recalling that the circuit I includes a front contact of DA6, all of the terms of I that include a 0 in the last (sixth or terminal *f* position) may be discarded. By the same reasoning, all of the II terms ending in 1 may be discarded. Thus, $$I=0\left|\begin{array}{l}011\text{--}\\ 10\text{---}\end{array}\right| \text{ and } II=1\left|\begin{array}{l}001\text{--}\\ 01\text{---}\\ 10000\end{array}\right|$$

which are readily circuited as

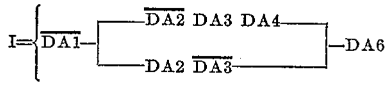

and

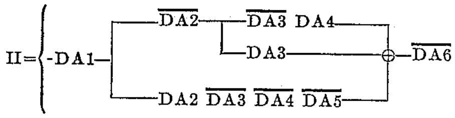

The above circuits will readily be recognized in the lower part of FIG. 10, noting that contact *e* of relay DA6 is the common DA6 contact and contact *f* of relay DA1 has its front point at the beginning of circuit II above and its back point at the beginning of circuit I above.

The special properties noted in the matrices of the particular circuits derived above are typical of those encountered in practice, and recognition of such special properties greatly reduces the time required to design a particular circuit. However, the method is by no means restricted to these special cases. If a given matrix has no special properties, the resulting circuits may be quite complex, but they can still be derived from the matrix by the reduction methods shown above, and no other known method will lead to a more economical solution.

As an example of the operation of the log deviation generator, assume that it is desired to generate the value of B corresponding to a value of A of 100001, which is assumed to be applied to input terminals *a* through *f* by energizing terminals *a* and *f* from terminal B of the battery and leaving the remaining terminals deenergized.

Relays DA1 and DA6 will now be energized from their corresponding terminals and the remaining relays will be deenergized. An energizing circuit for terminal *g* will now extend from terminal B of the battery over the front point of contact *b* of relay DA1 and the back point of contact *b* of relay DA2. Terminal *g* will accordingly be energized.

All of the circuits for terminal *h* will be interrupted. This can be seen by tracing back from terminal *h* over the back point of contact *b* of relay DA3 to the open front point of contact *b* of relay DA2, and from terminal *h* over the back point of contact *a* of relay DA3 to the open front point of contact *b* of relay DA4.

Terminal *i* will be energized over a circuit extending from terminal B of the battery over the back point of contact *c* of relay DA3, the back point of contact *d* of relay DA2 and the front point of contact *c* of relay DA1.

Terminal *j* will be energized over a circuit extending from terminal B of the battery over the back point of contact *f* of relay DA4, the back point of contact *f* of relay DA2, and the front point of contact *d* of relay DA1.

All of the circuits for terminal *k* will be interrupted. This can be seen by tracing back from terminal *k* over the front point of contact *e* of relay DA1 and the back point of contact *h* of relay DA2 to the open front point of contact *h* of relay DA3 and the open front point of contact *i* of relay DA4.

All of the circuits for terminal *l* will be interrupted. This can be seen by tracing back from terminal *l* over the front point of contact *f* of relay DA1 and the back point of contact *k* of relay DA2 to the open front point of contact *m* of relay DA3 and the open front point of contact *k* of relay DA4.

It will thus be apparent that the terminals *g* through *l* are energized in the pattern 101100, corresponding to the last six digits of the correct value of B as seen from Table X.

The manner in which the log deviation generator of FIG. 10 cooperates with external circuits will be apparent from the description below of the flow computer of my invention.

ANTI-LOGARITHM GENERATOR

FIGS. 11*a*, 11*b* and 11*c* show the detailed circuits of an anti-log generator in accordance with a preferred embodiment of my invention. This generator is adapted to generate, in decimal binary code, anti-logarithms from 1.00 to 9.99 of a weighted binary input logarithm having a characteristic from 0 to 3 and a ten-digit mantissa. As will be apparent as the description proceeds, these ranges could readily be extended and the output could be expressed in any other desired code. However, by the use of register shifting, in a manner to be described, the disclosed anti-log generator may be used for any desired computation.

The anti-log generator to be described is particularly adapted to operate on binary logarithms to the base 2 which are in the form $1+A$. The approximate logarithm generator shown in FIGS. 9*a* and 9*b* generates this type of approximate logarithm directly, but if the logarithms are corrected by the use of the factor B, this factor should be subtracted before the input is applied to the structure of FIGS. 11*a* through 11*c*.

As shown in FIG. 11*a*, the anti-log generator has twelve input terminals *a* through *l*. As shown in FIG. 11*c*, the anti-log generator has twelve output terminals *m* through *x* divided into three groups of four. As indicated on the drawing, the first of these groups comprising terminals *m* through *p* provides the units decimal digit of the anti-log, terminals $q$ through $t$ provide the tenths digit, and terminals $u$ through $x$ provide the hundredths digit.

Referring now to FIG. 11$a$, two register shift relays BRS2 and BRS1 are shown connected to be energized over terminals $a$ and $b$, respectively. Terminal $a$ represents the two's digit of the characteristic $n$ of the logarithm, and terminal $b$ represents the one's digit of the characteristic.

*Table XI*

| BRS2 | BRS1 | $m$ | $n$ | $o$ | $p$ | TTR1 | TTR2 | TTR3 | TTR4 | TTR5 | TTR6 | TTR7 |
|---|---|---|---|---|---|---|---|---|---|---|---|---|
| 0 | 0 | 0 | 0 | 0 | 1 | c | d | e | f | g | h | i |
| 0 | 1 | 0 | 0 | 1 | c | d | e | f | g | h | i | j |
| 1 | 0 | 0 | 1 | c | d | e | f | g | h | i | j | k |
| 1 | 1 | 1 | c | d | e | f | g | h | i | j | k | l |

Referring now to FIG. 11$b$, seven translation relays TTR1 through TTR7 are shown. These relays are adapted to be energized in a manner to be described in accordance with the binary value of the portion of the anti-log which is to be translated into the tenths and hundredths digits of the output.

Referring now to FIG. 11$c$, three units translation relays UTR4, UTR5 and UTR6 are shown. These relays are adapted to be energized over contacts of the TTR relays in a manner to be described, and cooperate with the TTR relays to provide the hundredths digit output.

From the mathematical description previously given, it will be apparent that the logarithm in the form of $n+A$ must be converted to the form $1+A$, and the binary point located in accordance with the characteristic $n$. Relays BRS2 and BRS1 perform the function of locating the binary point and properly registering terminals $c$ through $l$ of the mantissa A.

One characteristic of the transformation from weighted binary code to decimal binary code is that the units digit requires no translation, and in this case requires only proper registration. Also, since the anti-log in the form $1+A$ always has a 1 in the position indicated by the characteristic $n$ of the logarithm, the apparatus can supply this 1 automatically and place it in accordance with the characteristic $n$ appearing on terminals $a$ and $b$. For example, if the characteristic is 0 and both relays BRS1 and BRS2 are deenergized, 1 should appear on output terminal $p$ and the remaining terminals $m$, $n$ and $o$ of the units digit should remain deenergized. This function is accomplished by a circuit extending from terminal B of the battery over the back point of contact $a$ of relay BRS2 and the back point of contact $b$ of relay BRS1 to terminal $p$ in FIG. 11$c$. Each time the characteristic is increased by 1, this automatically supplied 1 moves up one output terminal. This operation is summarized in Table XI above.

The digits following the 1, if any, in the units digit are taken successively from terminals $c$, $d$ and $e$ of the input. This operation is also summarized in Table XI above. The remaining digits are supplied to the TTR relays in the manner shown in Table XI.

It will be apparent from Table XI above, and the theory previously given, that if a weighted binary anti-logarithm were desired, this could be supplied by reading terminals $m$, $n$, $o$ and $p$ and the input leads for relays TTR1 through TTR7, in that order. Accordingly, the apparatus just described is alone capable of generating the anti-logarithm from the logarithm.

However, it is desired in many instances particularly where indicator readout is desired, to provide an output in decimal binary code. For this purpose, the TTR and UTR relays are provided. These relays together comprise a means for translating weighted binary code to decimal binary code. In view of the matrix analysis methods described in detail in the description of the log deviation generator of FIG. 10, it is not believed necessary to describe in detail the manner of deriving each of the circuits required for this translation. In any event, these circuits are shown in detail in FIGS. 11$b$ and 11$c$ and can readily be traced for any particular combination of inputs. Moreover, the circuits can be derived or extended by use of the matrix methods described above, in connection with the appropriate transformation matrices. Table XII below gives the transformation matrices for transforming the inputs supplied to the TTR relays in weighted binary code into UTR relay positions and outputs on terminals $q$ through $x$.

*Table XII*

| TTR relays | | | | | | | UTR relays | | | Terminals | | | | | | | |
|---|---|---|---|---|---|---|---|---|---|---|---|---|---|---|---|---|---|
| 1 | 2 | 3 | 4 | 5 | 6 | 7 | 4 | 5 | 6 | q | r | s | t | u | v | w | x |
| 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 | 0 | 1 |
| 0 | 0 | 0 | 0 | 0 | 1 | 0 | 0 | 0 | 1 | 0 | 0 | 0 | 0 | 0 | 0 | 1 | 0 |
| 0 | 0 | 0 | 0 | 0 | 1 | 1 | 0 | 1 | 0 | 0 | 0 | 0 | 0 | 0 | 0 | 1 | 1 |
| 0 | 0 | 0 | 0 | 1 | 0 | 0 | 0 | 1 | 0 | 0 | 0 | 0 | 0 | 0 | 0 | 1 | 1 |
| 0 | 0 | 0 | 0 | 1 | 0 | 1 | 0 | 1 | 1 | 0 | 0 | 0 | 0 | 0 | 1 | 0 | 0 |
| 0 | 0 | 0 | 0 | 1 | 1 | 0 | 1 | 0 | 0 | 0 | 0 | 0 | 0 | 0 | 1 | 0 | 1 |
| 0 | 0 | 0 | 0 | 1 | 1 | 1 | 1 | 0 | 0 | 0 | 0 | 0 | 0 | 0 | 1 | 1 | 0 |
| 0 | 0 | 0 | 1 | 0 | 0 | 0 | 1 | 0 | 1 | 0 | 0 | 0 | 0 | 0 | 1 | 1 | 0 |
| 0 | 0 | 0 | 1 | 0 | 0 | 1 | 1 | 0 | 1 | 0 | 0 | 0 | 0 | 0 | 1 | 1 | 1 |
| 0 | 0 | 0 | 1 | 0 | 1 | 0 | 1 | 1 | 0 | 0 | 0 | 0 | 0 | 1 | 0 | 0 | 0 |
| 0 | 0 | 0 | 1 | 0 | 1 | 1 | 1 | 1 | 1 | 0 | 0 | 0 | 0 | 1 | 0 | 0 | 1 |
| 0 | 0 | 0 | 1 | 1 | 0 | 0 | 1 | 1 | 1 | 0 | 0 | 0 | 0 | 1 | 0 | 0 | 1 |
| 0 | 0 | 0 | 1 | 1 | 0 | 1 | 0 | 0 | 0 | 0 | 0 | 0 | 1 | 0 | 0 | 0 | 0 |
| 0 | 0 | 0 | 1 | 1 | 1 | 0 | 0 | 0 | 1 | 0 | 0 | 0 | 1 | 0 | 0 | 0 | 1 |
| 0 | 0 | 0 | 1 | 1 | 1 | 1 | 0 | 0 | 1 | 0 | 0 | 0 | 1 | 0 | 0 | 1 | 0 |
| 0 | 0 | 1 | 0 | 0 | 0 | 0 | 0 | 1 | 0 | 0 | 0 | 0 | 1 | 0 | 0 | 1 | 1 |
| 0 | 0 | 1 | 0 | 0 | 0 | 1 | 0 | 1 | 0 | 0 | 0 | 0 | 1 | 0 | 0 | 1 | 1 |
| 0 | 0 | 1 | 0 | 0 | 1 | 0 | 0 | 1 | 1 | 0 | 0 | 0 | 1 | 0 | 1 | 0 | 0 |
| 0 | 0 | 1 | 0 | 0 | 1 | 1 | 1 | 0 | 0 | 0 | 0 | 0 | 1 | 0 | 1 | 0 | 1 |
| 0 | 0 | 1 | 0 | 1 | 0 | 0 | 1 | 0 | 0 | 0 | 0 | 0 | 1 | 0 | 1 | 1 | 0 |
| 0 | 0 | 1 | 0 | 1 | 0 | 1 | 1 | 0 | 1 | 0 | 0 | 0 | 1 | 0 | 1 | 1 | 0 |
| 0 | 0 | 1 | 0 | 1 | 1 | 0 | 1 | 1 | 0 | 0 | 0 | 0 | 1 | 1 | 0 | 0 | 0 |
| 0 | 0 | 1 | 0 | 1 | 1 | 1 | 1 | 1 | 0 | 0 | 0 | 0 | 1 | 1 | 0 | 0 | 0 |
| 0 | 0 | 1 | 1 | 0 | 0 | 0 | 1 | 1 | 1 | 0 | 0 | 0 | 1 | 1 | 0 | 0 | 1 |
| 0 | 0 | 1 | 1 | 0 | 0 | 1 | 1 | 1 | 1 | 0 | 0 | 0 | 1 | 1 | 0 | 0 | 1 |
| 0 | 0 | 1 | 1 | 0 | 1 | 0 | 0 | 0 | 0 | 0 | 0 | 1 | 0 | 0 | 0 | 0 | 1 |
| 0 | 0 | 1 | 1 | 0 | 1 | 1 | 0 | 0 | 1 | 0 | 0 | 1 | 0 | 0 | 0 | 0 | 1 |
| 0 | 0 | 1 | 1 | 1 | 0 | 0 | 0 | 0 | 1 | 0 | 0 | 1 | 0 | 0 | 0 | 1 | 0 |
| 0 | 0 | 1 | 1 | 1 | 0 | 1 | 0 | 1 | 0 | 0 | 0 | 1 | 0 | 0 | 0 | 1 | 1 |
| 0 | 0 | 1 | 1 | 1 | 1 | 0 | 0 | 1 | 1 | 0 | 0 | 1 | 0 | 0 | 1 | 0 | 0 |
| 0 | 0 | 1 | 1 | 1 | 1 | 1 | 0 | 1 | 1 | 0 | 0 | 1 | 0 | 0 | 1 | 0 | 0 |
| 0 | 1 | 0 | 0 | 0 | 0 | 0 | 1 | 0 | 0 | 0 | 0 | 1 | 0 | 0 | 1 | 0 | 1 |
| 0 | 1 | 0 | 0 | 0 | 0 | 1 | 1 | 0 | 0 | 0 | 0 | 1 | 0 | 0 | 1 | 1 | 0 |
| 0 | 1 | 0 | 0 | 0 | 1 | 0 | 1 | 0 | 1 | 0 | 0 | 1 | 0 | 0 | 1 | 1 | 1 |
| 0 | 1 | 0 | 0 | 0 | 1 | 1 | 1 | 1 | 0 | 0 | 0 | 1 | 0 | 1 | 0 | 0 | 0 |
| 0 | 1 | 0 | 0 | 1 | 0 | 0 | 1 | 1 | 0 | 0 | 0 | 1 | 0 | 1 | 0 | 0 | 0 |
| 0 | 1 | 0 | 0 | 1 | 0 | 1 | 1 | 1 | 1 | 0 | 0 | 1 | 0 | 1 | 0 | 0 | 1 |
| 0 | 1 | 0 | 0 | 1 | 1 | 0 | 0 | 0 | 0 | 0 | 0 | 1 | 1 | 0 | 0 | 0 | 0 |
| 0 | 1 | 0 | 0 | 1 | 1 | 1 | 0 | 0 | 0 | 0 | 0 | 1 | 1 | 0 | 0 | 0 | 1 |
| 0 | 1 | 0 | 1 | 0 | 0 | 0 | 0 | 0 | 1 | 0 | 0 | 1 | 1 | 0 | 0 | 0 | 1 |
| 0 | 1 | 0 | 1 | 0 | 0 | 1 | 0 | 0 | 1 | 0 | 0 | 1 | 1 | 0 | 0 | 1 | 0 |
| 0 | 1 | 0 | 1 | 0 | 1 | 0 | 0 | 1 | 0 | 0 | 0 | 1 | 1 | 0 | 0 | 1 | 1 |
| 0 | 1 | 0 | 1 | 0 | 1 | 1 | 0 | 1 | 1 | 0 | 0 | 1 | 1 | 0 | 1 | 0 | 0 |
| 0 | 1 | 0 | 1 | 1 | 0 | 0 | 0 | 1 | 1 | 0 | 0 | 1 | 1 | 0 | 1 | 0 | 0 |
| 0 | 1 | 0 | 1 | 1 | 0 | 1 | 1 | 0 | 0 | 0 | 0 | 1 | 1 | 0 | 1 | 0 | 1 |
| 0 | 1 | 0 | 1 | 1 | 1 | 0 | 1 | 0 | 1 | 0 | 0 | 1 | 1 | 0 | 1 | 1 | 0 |
| 0 | 1 | 0 | 1 | 1 | 1 | 1 | 1 | 0 | 1 | 0 | 0 | 1 | 1 | 0 | 1 | 1 | 1 |
| 0 | 1 | 1 | 0 | 0 | 0 | 0 | 1 | 1 | 0 | 0 | 0 | 1 | 1 | 1 | 0 | 0 | 0 |
| 0 | 1 | 1 | 0 | 0 | 0 | 1 | 1 | 1 | 0 | 0 | 0 | 1 | 1 | 1 | 0 | 0 | 0 |
| 0 | 1 | 1 | 0 | 0 | 1 | 0 | 1 | 1 | 1 | 0 | 0 | 1 | 1 | 1 | 0 | 0 | 1 |
| 0 | 1 | 1 | 0 | 0 | 1 | 1 | 0 | 0 | 0 | 0 | 1 | 0 | 0 | 0 | 0 | 0 | 0 |
| 0 | 1 | 1 | 0 | 1 | 0 | 0 | 0 | 0 | 0 | 0 | 1 | 0 | 0 | 0 | 0 | 0 | 1 |
| 0 | 1 | 1 | 0 | 1 | 0 | 1 | 0 | 0 | 1 | 0 | 1 | 0 | 0 | 0 | 0 | 0 | 1 |
| 0 | 1 | 1 | 0 | 1 | 1 | 0 | 0 | 1 | 0 | 0 | 1 | 0 | 0 | 0 | 0 | 1 | 1 |
| 0 | 1 | 1 | 0 | 1 | 1 | 1 | 0 | 1 | 0 | 0 | 1 | 0 | 0 | 0 | 0 | 1 | 1 |
| 0 | 1 | 1 | 1 | 0 | 0 | 0 | 0 | 1 | 1 | 0 | 1 | 0 | 0 | 0 | 1 | 0 | 0 |
| 0 | 1 | 1 | 1 | 0 | 0 | 1 | 0 | 1 | 1 | 0 | 1 | 0 | 0 | 0 | 1 | 0 | 0 |
| 0 | 1 | 1 | 1 | 0 | 1 | 0 | 1 | 0 | 0 | 0 | 1 | 0 | 0 | 0 | 1 | 1 | 0 |
| 0 | 1 | 1 | 1 | 0 | 1 | 1 | 1 | 0 | 1 | 0 | 1 | 0 | 0 | 0 | 1 | 1 | 0 |
| 0 | 1 | 1 | 1 | 1 | 0 | 0 | 1 | 0 | 1 | 0 | 1 | 0 | 0 | 0 | 1 | 1 | 1 |
| 0 | 1 | 1 | 1 | 1 | 0 | 1 | 1 | 1 | 0 | 0 | 1 | 0 | 0 | 1 | 0 | 0 | 0 |
| 0 | 1 | 1 | 1 | 1 | 1 | 0 | 1 | 1 | 1 | 0 | 1 | 0 | 0 | 1 | 0 | 0 | 1 |
| 0 | 1 | 1 | 1 | 1 | 1 | 1 | 1 | 1 | 1 | 0 | 1 | 0 | 0 | 1 | 0 | 0 | 1 |
| 1 | 0 | 0 | 0 | 0 | 0 | 0 | 0 | 0 | 0 | 0 | 1 | 0 | 1 | 0 | 0 | 0 | 0 |
| 1 | 0 | 0 | 0 | 0 | 0 | 1 | 0 | 0 | 0 | 0 | 1 | 0 | 1 | 0 | 0 | 0 | 1 |
| 1 | 0 | 0 | 0 | 0 | 1 | 0 | 0 | 0 | 1 | 0 | 1 | 0 | 1 | 0 | 0 | 1 | 0 |
| 1 | 0 | 0 | 0 | 0 | 1 | 1 | 0 | 1 | 0 | 0 | 1 | 0 | 1 | 0 | 0 | 1 | 1 |
| 1 | 0 | 0 | 0 | 1 | 0 | 0 | 0 | 1 | 0 | 0 | 1 | 0 | 1 | 0 | 0 | 1 | 1 |
| 1 | 0 | 0 | 0 | 1 | 0 | 1 | 0 | 1 | 1 | 0 | 1 | 0 | 1 | 0 | 1 | 0 | 0 |
| 1 | 0 | 0 | 0 | 1 | 1 | 0 | 1 | 0 | 0 | 0 | 1 | 0 | 1 | 0 | 1 | 0 | 0 |
| 1 | 0 | 0 | 0 | 1 | 1 | 1 | 1 | 0 | 0 | 0 | 1 | 0 | 1 | 0 | 1 | 1 | 0 |
| 1 | 0 | 0 | 1 | 0 | 0 | 0 | 1 | 0 | 1 | 0 | 1 | 0 | 1 | 0 | 1 | 1 | 0 |

*Table XII*—Continued

| TTR relays | | | | | | | UTR relays | | | Terminals | | | | | | | |
|---|---|---|---|---|---|---|---|---|---|---|---|---|---|---|---|---|---|
| 1 | 2 | 3 | 4 | 5 | 6 | 7 | 4 | 5 | 6 | q | r | s | t | u | v | w | x |
| 1 | 0 | 0 | 1 | 0 | 0 | 1 | 1 | 0 | 1 | 0 | 1 | 0 | 1 | 0 | 1 | 1 | 1 |
| 1 | 0 | 0 | 1 | 0 | 1 | 0 | 1 | 1 | 0 | 0 | 1 | 0 | 1 | 1 | 0 | 0 | 0 |
| 1 | 0 | 0 | 1 | 0 | 1 | 1 | 1 | 1 | 1 | 0 | 1 | 0 | 1 | 1 | 0 | 0 | 1 |
| 1 | 0 | 0 | 1 | 1 | 0 | 0 | 1 | 1 | 1 | 0 | 1 | 0 | 1 | 1 | 0 | 0 | 1 |
| 1 | 0 | 0 | 1 | 1 | 0 | 1 | 0 | 0 | 0 | 0 | 1 | 1 | 0 | 0 | 0 | 0 | 0 |
| 1 | 0 | 0 | 1 | 1 | 1 | 0 | 0 | 0 | 1 | 0 | 1 | 1 | 0 | 0 | 0 | 0 | 1 |
| 1 | 0 | 0 | 1 | 1 | 1 | 1 | 0 | 0 | 1 | 0 | 1 | 1 | 0 | 0 | 0 | 1 | 0 |
| 1 | 0 | 1 | 0 | 0 | 0 | 0 | 0 | 1 | 0 | 0 | 1 | 1 | 0 | 0 | 0 | 1 | 1 |
| 1 | 0 | 1 | 0 | 0 | 0 | 1 | 0 | 1 | 0 | 0 | 1 | 1 | 0 | 0 | 0 | 1 | 1 |
| 1 | 0 | 1 | 0 | 0 | 1 | 0 | 0 | 1 | 1 | 0 | 1 | 1 | 0 | 0 | 1 | 0 | 0 |
| 1 | 0 | 1 | 0 | 0 | 1 | 1 | 1 | 0 | 0 | 0 | 1 | 1 | 0 | 0 | 1 | 0 | 1 |
| 1 | 0 | 1 | 0 | 1 | 0 | 0 | 1 | 0 | 0 | 0 | 1 | 1 | 0 | 0 | 1 | 1 | 0 |
| 1 | 0 | 1 | 0 | 1 | 0 | 1 | 1 | 0 | 1 | 0 | 1 | 1 | 0 | 0 | 1 | 1 | 0 |
| 1 | 0 | 1 | 0 | 1 | 1 | 0 | 1 | 1 | 0 | 0 | 1 | 1 | 0 | 1 | 0 | 0 | 0 |
| 1 | 0 | 1 | 0 | 1 | 1 | 1 | 1 | 1 | 0 | 0 | 1 | 1 | 0 | 1 | 0 | 0 | 0 |
| 1 | 0 | 1 | 1 | 0 | 0 | 0 | 1 | 1 | 1 | 0 | 1 | 1 | 0 | 1 | 0 | 0 | 1 |
| 1 | 0 | 1 | 1 | 0 | 0 | 1 | 1 | 1 | 1 | 0 | 1 | 1 | 0 | 1 | 0 | 0 | 1 |
| 1 | 0 | 1 | 1 | 0 | 1 | 0 | 0 | 0 | 0 | 0 | 1 | 1 | 1 | 0 | 0 | 0 | 1 |
| 1 | 0 | 1 | 1 | 0 | 1 | 1 | 0 | 0 | 1 | 0 | 1 | 1 | 1 | 0 | 0 | 0 | 1 |
| 1 | 0 | 1 | 1 | 1 | 0 | 0 | 0 | 0 | 1 | 0 | 1 | 1 | 1 | 0 | 0 | 1 | 0 |
| 1 | 0 | 1 | 1 | 1 | 0 | 1 | 0 | 1 | 0 | 0 | 1 | 1 | 1 | 0 | 0 | 1 | 1 |
| 1 | 0 | 1 | 1 | 1 | 1 | 0 | 0 | 1 | 1 | 0 | 1 | 1 | 1 | 0 | 1 | 0 | 0 |
| 1 | 0 | 1 | 1 | 1 | 1 | 1 | 0 | 1 | 1 | 0 | 1 | 1 | 1 | 0 | 1 | 0 | 0 |
| 1 | 1 | 0 | 0 | 0 | 0 | 0 | 1 | 0 | 0 | 0 | 1 | 1 | 1 | 0 | 1 | 0 | 1 |
| 1 | 1 | 0 | 0 | 0 | 0 | 1 | 1 | 0 | 0 | C | 1 | 1 | 1 | 0 | 1 | 1 | 0 |
| 1 | 1 | 0 | 0 | 0 | 1 | 0 | 1 | 0 | 1 | 0 | 1 | 1 | 1 | 0 | 1 | 1 | 1 |
| 1 | 1 | 0 | 0 | 0 | 1 | 1 | 1 | 1 | 0 | 0 | 1 | 1 | 1 | 1 | 0 | 0 | 0 |
| 1 | 1 | 0 | 0 | 1 | 0 | 0 | 1 | 1 | 0 | 0 | 1 | 1 | 1 | 1 | 0 | 0 | 0 |
| 1 | 1 | 0 | 0 | 1 | 0 | 1 | 1 | 1 | 1 | 0 | 1 | 1 | 1 | 1 | 0 | 0 | 1 |
| 1 | 1 | 0 | 0 | 1 | 1 | 0 | 0 | 0 | 0 | 1 | 0 | 0 | 0 | 0 | 0 | 0 | 0 |
| 1 | 1 | 0 | 0 | 1 | 1 | 1 | 0 | 0 | 0 | 1 | 0 | 0 | 0 | 0 | 0 | 0 | 1 |
| 1 | 1 | 0 | 1 | 0 | 0 | 0 | 0 | 0 | 1 | 1 | 0 | 0 | 0 | 0 | 0 | 0 | 1 |
| 1 | 1 | 0 | 1 | 0 | 0 | 1 | 0 | 0 | 1 | 1 | 0 | 0 | 0 | 0 | 0 | 1 | 0 |
| 1 | 1 | 0 | 1 | 0 | 1 | 0 | 0 | 1 | 0 | 1 | 0 | 0 | 0 | 0 | 0 | 1 | 1 |
| 1 | 1 | 0 | 1 | 0 | 1 | 1 | 0 | 1 | 1 | 1 | 0 | 0 | 0 | 0 | 1 | 0 | 0 |
| 1 | 1 | 0 | 1 | 1 | 0 | 0 | 0 | 1 | 1 | 1 | 0 | 0 | 0 | 0 | 1 | 0 | 0 |
| 1 | 1 | 0 | 1 | 1 | 0 | 1 | 1 | 0 | 0 | 1 | 0 | 0 | 0 | 0 | 1 | 0 | 1 |
| 1 | 1 | 0 | 1 | 1 | 1 | 0 | 1 | 0 | 1 | 1 | 0 | 0 | 0 | 0 | 1 | 1 | 0 |
| 1 | 1 | 0 | 1 | 1 | 1 | 1 | 1 | 0 | 1 | 1 | 0 | 0 | 0 | 0 | 1 | 1 | 1 |
| 1 | 1 | 1 | 0 | 0 | 0 | 0 | 1 | 1 | 0 | 1 | 0 | 0 | 0 | 1 | 0 | 0 | 0 |
| 1 | 1 | 1 | 0 | 0 | 0 | 1 | 1 | 1 | 0 | 1 | 0 | 0 | 0 | 1 | 0 | 0 | 0 |
| 1 | 1 | 1 | 0 | 0 | 1 | 0 | 1 | 1 | 1 | 1 | 0 | 0 | 0 | 1 | 0 | 0 | 1 |
| 1 | 1 | 1 | 0 | 0 | 1 | 1 | 0 | 0 | 0 | 1 | 0 | 0 | 1 | 0 | 0 | 0 | 0 |
| 1 | 1 | 1 | 0 | 1 | 0 | 0 | 0 | 0 | 0 | 1 | 0 | 0 | 1 | 0 | 0 | 0 | 1 |
| 1 | 1 | 1 | 0 | 1 | 0 | 1 | 0 | 0 | 1 | 1 | 0 | 0 | 1 | 0 | 0 | 0 | 1 |
| 1 | 1 | 1 | 0 | 1 | 1 | 0 | 0 | 1 | 0 | 1 | 0 | 0 | 1 | 0 | 0 | 1 | 1 |
| 1 | 1 | 1 | 0 | 1 | 1 | 1 | 0 | 1 | 0 | 1 | 0 | 0 | 1 | 0 | 0 | 1 | 1 |
| 1 | 1 | 1 | 1 | 0 | 0 | 0 | 0 | 1 | 1 | 1 | 0 | 0 | 1 | 0 | 1 | 0 | 0 |
| 1 | 1 | 1 | 1 | 0 | 0 | 1 | 0 | 1 | 1 | 1 | 0 | 0 | 1 | 0 | 1 | 0 | 0 |
| 1 | 1 | 1 | 1 | 0 | 1 | 0 | 1 | 0 | 0 | 1 | 0 | 0 | 1 | 0 | 1 | 1 | 0 |
| 1 | 1 | 1 | 1 | 0 | 1 | 1 | 1 | 0 | 1 | 1 | 0 | 0 | 1 | 0 | 1 | 1 | 0 |
| 1 | 1 | 1 | 1 | 1 | 0 | 0 | 1 | 0 | 1 | 1 | 0 | 0 | 1 | 0 | 1 | 1 | 1 |
| 1 | 1 | 1 | 1 | 1 | 0 | 1 | 1 | 1 | 0 | 1 | 0 | 0 | 1 | 1 | 0 | 0 | 0 |
| 1 | 1 | 1 | 1 | 1 | 1 | 0 | 1 | 1 | 1 | 1 | 0 | 0 | 1 | 1 | 0 | 0 | 1 |
| 1 | 1 | 1 | 1 | 1 | 1 | 1 | 1 | 1 | 1 | 1 | 0 | 0 | 1 | 1 | 0 | 0 | 1 |

To recapitulate the matrix methods given above, to find any particular output circuit, it is only necessary to copy down the TTR relay input sequences corresponding to energized conditions of the desired circuit. First, confining attention to terminals *q*, *r*, *s* and *t*, it will be seen that these terminals depend only on contacts of the TTR relays. For example, one could read down the *q* column in Table XII and read off the corresponding TTR relay combination for each 1 in the *q* column. This would give the contact matrix for the required circuit. After reducing this matrix by the methods given above, the reduced circuit could readily be constructed, and will be found to correspond to one of the circuits shown in FIGS. 11*b* and 11*c*. Since the TTR relay positions constitute a saturated weighted binary sequence and each output terminal sequence corresponds to the decimal binary equivalent of the corresponding input sequence, it is readily apparent how the matrices can be expanded if it is desired to deal with larger numbers.

With regard to terminals *u*, *v*, *w* and *x*, these terminals are energized over contacts of the TTR and UTR relays. To understand these circuits, the contact matrices of the UTR relays in terms of the TTR relay conditions should first be written and reduced to the corresponding circuits. Thus, for example, the matrix for relay UTR4 is $$\text{UTR4 matrix}=\left|\begin{array}{c}0000110\\ \vdots\\ 0001100\end{array}\right|+\left|\begin{array}{c}0010011\\ \vdots\\ 0011001\end{array}\right|$$

$$+\left|\begin{array}{c}0100000\\ \vdots\\ 0100101\end{array}\right|+\left|\begin{array}{c}0101101\\ \vdots\\ 0110010\end{array}\right|$$

$$+\left|\begin{array}{c}0111010\\ \vdots\\ 0111111\end{array}\right|+\left|\begin{array}{c}1000110\\ \vdots\\ 1001100\end{array}\right|$$

$$+\left|\begin{array}{c}1010011\\ \vdots\\ 1011001\end{array}\right|+\left|\begin{array}{c}1100000\\ \vdots\\ 1100101\end{array}\right|$$

$$+\left|\begin{array}{c}1101101\\ \vdots\\ 1110010\end{array}\right|+\left|\begin{array}{c}1111010\\ \vdots\\ 1111111\end{array}\right|$$

on reduction, $$\text{UTR}=000\left|\begin{array}{l}011\text{-}\\ 10\text{--}\\ 1100\end{array}\right|+001\left|\begin{array}{l}0011\\ 01\text{--}\\ 100\text{-}\end{array}\right|$$

$$+0010\left|\begin{array}{l}0\text{--}\\ 10\text{-}\end{array}\right|+01\left|\begin{array}{c}011\left|\begin{array}{l}01\\ 1\text{-}\end{array}\right|\\ +\\ 100\left|\begin{array}{l}0\text{-}\\ 10\end{array}\right|\end{array}\right|$$

$$+0111\left|\begin{array}{l}01\text{-}\\ 1\text{--}\end{array}\right|+100\left|\begin{array}{l}011\text{-}\\ 1\left|\begin{array}{l}0\text{--}\\ 100\end{array}\right|\end{array}\right|$$

$$+101\left|\begin{array}{l}0\left|\begin{array}{l}011\\ 1\text{--}\end{array}\right|\\ 100\text{-}\end{array}\right|+1100\left|\begin{array}{l}0\text{--}\\ 10\text{-}\end{array}\right|$$

$$+11\left|\begin{array}{c}011\left|\begin{array}{l}01\\ 1\text{-}\end{array}\right|\\ +\\ 100\left|\begin{array}{l}0\text{-}\\ 10\end{array}\right|\end{array}\right|+1111\left|\begin{array}{l}01\text{-}\\ 1\text{--}\end{array}\right|$$

condensing, $$\text{UTR4}=\left|\begin{array}{l}000\\ 100\end{array}\right|\left.\begin{array}{l}011\text{-}\\ 10\text{--}\\ 1100\end{array}\right|+\left|\begin{array}{l}001\\ 101\end{array}\right|\left.\begin{array}{l}0011\\ 01\text{--}\\ 100\text{-}\end{array}\right|$$

$$+\left|\begin{array}{l}0010\\ 1100\end{array}\right|\left.\begin{array}{l}0\text{--}\\ 10\text{-}\end{array}\right|+\left|\begin{array}{l}01\\ 11\end{array}\right|\left.\begin{array}{c}011\left|\begin{array}{l}01\\ 1\text{-}\end{array}\right|\\ +\\ 100\left|\begin{array}{l}0\text{-}\\ 10\end{array}\right|\end{array}\right|$$

$$+\begin{array}{l}0111\\ 1111\end{array}\left|\begin{array}{l}01\text{-}\\ 1\text{--}\end{array}\right|$$

On further reduction $$\text{UTR4}=-00\left|\begin{array}{l}011\text{-}\\ 1\left|\begin{array}{l}0\text{--}\\ 100\end{array}\right|\end{array}\right|+-01\left|\begin{array}{l}0\left|\begin{array}{l}011\\ 1\text{--}\end{array}\right|\\ 100\text{-}\end{array}\right|$$

$$+\begin{array}{l}001\\ 110\end{array}\left|0\left|\begin{array}{l}0\text{--}\\ 10\text{-}\end{array}\right|\right|+-1\left|\begin{array}{l}011\left|\begin{array}{l}01\\ 1\text{-}\end{array}\right|\\ 100\left|\begin{array}{l}0\text{-}\\ 10\end{array}\right|\end{array}\right|$$

$$+-111\left|\begin{array}{l}01\text{-}\\ 1\text{--}\end{array}\right|$$

These reduced sub-matrices can now be reduced to circuits by the previously described methods. For example, the last sub-matrix in the above expression would give:

$$-TTR2\ TTR3\ TTR4-\left[\begin{array}{c}\overline{TTR5}\ TTR6\\ TTR5\end{array}\right]-$$

which can be seen in FIGS. 11*b* and 11*c* to extend from terminal B of the battery over a first path including the front point of contact *f* of relay TTR6, the front point of contact *g* of relay TTR4, the back point of contact *a* of relay TTR5, the front point of contact *a* of relay TTR3, the front point of contact *d* of relay TTR4, and the front point of contact *f* of relay TTR2 to the coil of relay UTR4, and from terminal B of the battery over a second path including the front point of contact *b* of relay TTR5, the front point of contact *a* of relay TTR3, the front point of contact *d* of relay TTR4 and the front point of contact *f* of relay TTR2. The circuits for the remaining UTR4 sub-matrices and the UTR5 and UTR6 matrices can be derived in the same manner, and are shown in detail in FIGS. 11*b* and 11*c*.

Given the UTR relay circuits, the terminal circuits for terminals *u, v, w* and *x* can be derived from matrices taken from Table XII above which include both the TTR and UTR conditions. For example, the first sub-matrix for terminal *u* can be seen from Table XII above to be,

| TTR | | | | | | | UTR | | |
|---|---|---|---|---|---|---|---|---|---|
| 1 | 2 | 3 | 4 | 5 | 6 | 7 | 4 | 5 | 6 |
| 0 | 0 | 0 | 1 | 0 | 1 | 0 | 1 | 1 | 0 |
| 0 | 0 | 0 | 1 | 0 | 1 | 1 | 1 | 1 | 1 |
| 0 | 0 | 0 | 1 | 1 | 0 | 0 | 1 | 1 | 1 |

where explanatory designations are given above each row in the matrix to make it clear how the matrix is derived from Table XII. Actually, in the case of the *u* matrix a radical short cut is possible which makes it unnecessary to write out all the sub-matrices and then reduce them. That is, from Table XII it can be seen that for all cases in which relays UTR4 and UTR5 are energized, terminal *u* is energized and is not energized in any other input combination. The circuit for terminal *u* could thus include only front contacts of relays UTR4 and UTR5 in series. An equivalent circuit is shown in FIGS. 11*b* and 11*c*. In order to simplify the remaining terminal circuits, the circuit of FIGS. 11*b* and 11*c* includes additional contacts resulting from the combination of contacts used in the *u* circuits with contacts used in other circuits. However, this circuit is also closed whenever relays UTR4 and UTR5 are energized. In particular, for the case UTR4 UTR5 UTR6, the circuit extends from terminal B of the battery over the front point of contact *d* of relay UTR6, the front point of contact *c* of relay UTR4, and the front points of contacts *a* of relays UTR4 and UTR5 to terminal *u*. For the case UTR4 UTR5 $\overline{UTR6}$, tracing back from terminal *u* over the front points of contacts *a* of relays UTR4 and UTR5, the front point of contact *c* of relay UTR4, and over the back point of contact *a* of relay UTR6, it will be seen that the heel of contact *a* of relay UTR6 is directly connected to the heel of contact *h* of relay TTR5, and connected over the front point of contact *d* of relay UTR5 to the heel of contact *i* of relay TTR5. Either the heel of contact *h* or the heel of contact *i* of relay TTR5 is always energized, over circuits shown in FIG. 11*b* and including contacts *a* and *b* of relay TTR6 and *d* and *e* of relay TTR7. Thus, terminal *u* is energized under all conditions in which relays UTR4 and UTR5 are both energized.

The circuits for terminals *v, w* and *x* can be derived in the same manner from Table XII above, and are shown in detail in FIGS. 11*b* and 11*c*.

As an example of the operation of this embodiment of my invention, let it be desired to generate the anti-log of 10.1001010001. This number is applied to the input terminals in FIG. 11*a* by energizing terminals *a, c, f, h* and *l* from terminal B of the battery and leaving the remaining terminals deenergized.

With terminal *a* energized, relay BRS2 will be energized. Relay BRS1 will be released because terminal *b* is deenergized. Since the value of *n* in this case is 2, the first 1 will occur on terminal *n*, and is applied over a circuit extending from terminal B of the battery over the front point of contact *a* of relay BRS2 and the back point of contact *a* of relay BRS1. Terminal *m* will remain deenergized. The remaining input terminals *c* through *k* will be registered as shown in Table XI above, with terminal *l* being unused in this combination.

As shown in Table XI (col. 29), terminal *c* is connected to output terminal *o*. Referring to the drawings, since terminal *c* is energized, terminal *o* is energized over a circuit extending from terminal *c* over the front point of contact *b* of relay BRS2 and the back point of contact *c* of relay BRS1 to terminal *o*.

Deenergized terminal *d* is connected to output terminal *p* over the front point of contact *c* of relay BRS2 and the back point of contact *e* of relay BRS1. Terminal *p* is accordingly deenergized and the units digit accordingly reads 0110, or 6.

As shown in Table XI (col. 29), terminals *e* through *k* are connected to relays TTR1 through TTR7, respectively. Terminal *e* is connected to relay TTR1 over the front point of contact *d* of relay BRS2 and the back point of contact *g* of relay BRS1. Relay TTR7 is connected to input terminal *k* over front contact *j* of relay BRS2 and the back point of contact *s* of relay BRS1. Similar circuits are provided for the remaining TTR relays, as will be apparent from FIGS. 11*a* and 11*b*. Accordingly, relays TTR1 through TTR7, respectively, are now energized in the sequence 0101000. It may be remarked to this point that we now have the anti-logarithm in weighted binary form as 0110.0101000, or 6.3125.

The next step in the operation is the translation into decimal binary code of the tenths and hundredths digits. The UTR relays, as shown in Table XII above, will now be in the combination 001. That is, the circuits for relays UTR4 and UTR5 will be interrupted and a circuit will be completed for relay UTR6. In particular, it can be seen that the circuit for relay UTR4 is interrupted by tracing back from the coil of relay UTR4 over the front point of contact *f* of relay TTR2, the front point of contact *d* of relay TTR4, and thence over a first path including the front point of contact *a* of relay TTR4 to the open back point of contact *d* of relay TTR2, and over a second path including the back point of contact *a* of relay TTR3 to the open front point of contact *a* of relay TTR5.

The circuits for relay UTR5 can be seen to be interrupted by tracing back from the coil of relay UTR5 over the back point of contact *h* of relay TTR3 and the back point of contact *g* of relay TTR5, and thence over a first path including the front point of contact *g* of relay TTR4 and the back point of contact *e* of relay TTR6 to open contact *d* of relay TTR6, and over back contact *d* of relay TTR5 to the open front point of contact *a* of relay TTR7. Returning again to the back point of contact *g* of relay TTR5, we can continue over a second path including the back point of contact *a* of relay TTR5 to the open front point of contact *a* of relay TTR3.

A circuit for relay UTR6 now extends from terminal B of the battery over the back point of contact *b* of relay TTR7, the back point of contact *e* of relay TTR5, the back point of contact *c* of relay TTR6, and the front point of contact *f* of relay TTR4 to the winding of relay UTR6.

As seen from Table XII above, terminals *q, r, s* and *t* will be energized in the pattern 0011, respectively. As seen in FIGS. 11*b* and 11*c*, the circuit for terminal *q* is interrupted at the open front point of contact *a* of relay TTR1.

The circuit for terminal *r* is interrupted, as may be seen by tracing back from terminal *r* over the back point of contact *a* of relay TTR1, the front point of contact *a* of relay TTR2, the back point of contact *d* of relay TTR1, and thence to the open front point of contact *d* of relay TTR3.

An energizing circuit for terminal *s* now extends from terminal B of the battery over the back point of contact *f* of relay TTR3, the back point of contact *e* of relay TTR1, and the front point of contact *b* of relay TTR2 to terminal *s*.

An energizing circuit for terminal *t* now extends from terminal B of the battery over the front point of contact *b* of relay TTR4, the front point of contact *d* of relay TTR2, the back point of contact *c* of relay TTR3 and over the back point of contact *c* of relay TTR1 to terminal *t*.

It will appear from Table XII above that terminals *u* through *x* are energized in the pattern 0001, respectively. As shown in FIG. 11*c*, and recalling now that relays UTR4 and UTR5 are released and that relay UTR6 is energized, the circuits for terminal *u* will be interrupted at the open front point of contact *a* of relay UTR4.

The circuits for terminal *v* will be interrupted as can be seen by tracing back from terminal *v* to open contact *b* of relay UTR4, and also over the back point of contact *a* of relay UTR4 to the open front point of contact *a* of relay UTR5.

The circuits for terminal *w* will be interrupted. This can be seen by tracing back from terminal *w*, first to the open front point of contact *c* of relay UTR5, and second, over the back point of contact *a* of relay UTR5, the back point of contact *c* of relay UTR4, the front point of contact *a* of relay UTR6, the back point of contact *h* of relay TTR5 and the back point of contact *d* of relay TTR7 to the open front point of contact *a* of relay TTR6.

Terminal *x* is now energized over a circuit extending from terminal B of the battery over the back point of contact *b* of relay TTR6 in FIG. 11*b*, the back point of contact *e* of relay TTR7, the back point of contact *i* of relay TTR5, the back point of contact *b* of relay UTR5 in FIG. 11*c*, the front point of contact *c* of relay UTR6, and over the back point of contact *d* of relay UTR4 to terminal *x*. Reading all of the outputs together, we have, in decimal binary code, the number 0110.00110001, which in decimal form is 6.31, which is seen to be the same as in the binary form supplied to the input.

The operation of this embodiment of my invention in cooperation with external circuits will be apparent from the description below of the flow computer of my invention.

THE ANTI-LOGARITHM DEVIATION GENERATOR

FIGS. 12*a* and 12*b* show a preferred embodiment of an anti-log deviation generator for generating the factor B to be subtracted from the binary logarithm to the base 2 of a number as a step in reducing the logarithm to the anti-logarithm. That is, the fractional part of a logarithm in the form $n+A+B$ is $A+B$; from an applied input of $A+B$, the deviation generator will provide the term B. In addition, the anti-log deviation generator shown is provided with a set of repeater contacts for repeating the input $A+B$ to supply the input to additional apparatus, where it is desirable to have an independent set of circuits for this purpose.

As shown in FIG. 12*a*, the anti-log deviation generator is provided with six input terminals *a*, *b*, *c*, *d*, *e* and *f*, to which the first six digits of the mantissa of a logarithm to the base 2 in binary form are supplied. As noted above, the deviation is always smaller than the logarithm.

Thus, the first six digits are sufficient to generate a correction factor B which is accurate to ten digits. As shown, each of these input terminals is connected to a corresponding input repeater relay DDS1 through DDS6. These relays are accordingly energized or deenergized according as the corresponding terminal is energized or deenergized.

The anti-log deviation generator is provided with a first set of seven output terminals *g*, *h*, *i*, *j*, *k*, *l* and *m*. These terminals are adapted to provide the last seven digits of a ten-digit value of B. The relative weights of each digit are shown on the drawing. Since the ½, ¼ and ⅛ digits of the factor B are always 0, as will appear, no terminals need be provided for these first three digits. The terminals for the remaining digits are supplied from terminal B of the battery over contacts of the DDS relays in circuits which will be described below.

As shown in FIG. 12*b*, the anti-log deviation generator may be provided with a further set of six output terminals *n*, *o*, *p*, *q*, *r* and *s*. These terminals are provided to repeat the input information to form an external independent supply of the input if so desired. Since these terminals are controlled over obvious circuits, each including a single

*Table XIII*

| DDS relays—Register positions | | | | | | Deviation B | | | | | | | | | |
|---|---|---|---|---|---|---|---|---|---|---|---|---|---|---|---|
| 1 | 2 | 3 | 4 | 5 | 6 | – | – | – | *g* | *h* | *i* | *j* | *k* | *l* | *m* |
| 0 | 0 | 0 | 0 | 0 | 1 | 0 | 0 | 0 | 0 | 0 | 0 | 0 | 1 | 0 | 1 |
| 0 | 0 | 0 | 0 | 1 | 0 | 0 | 0 | 0 | 0 | 0 | 0 | 1 | 0 | 1 | 0 |
| 0 | 0 | 0 | 0 | 1 | 1 | 0 | 0 | 0 | 0 | 0 | 0 | 1 | 1 | 1 | 1 |
| 0 | 0 | 0 | 1 | 0 | 0 | 0 | 0 | 0 | 0 | 0 | 1 | 0 | 1 | 0 | 0 |
| 0 | 0 | 0 | 1 | 0 | 1 | 0 | 0 | 0 | 0 | 0 | 1 | 1 | 0 | 0 | 1 |
| 0 | 0 | 0 | 1 | 1 | 0 | 0 | 0 | 0 | 0 | 0 | 1 | 1 | 1 | 1 | 0 |
| 0 | 0 | 0 | 1 | 1 | 1 | 0 | 0 | 0 | 0 | 1 | 0 | 0 | 0 | 1 | 1 |
| 0 | 0 | 1 | 0 | 0 | 0 | 0 | 0 | 0 | 0 | 1 | 0 | 1 | 0 | 0 | 0 |
| 0 | 0 | 1 | 0 | 0 | 1 | 0 | 0 | 0 | 0 | 1 | 0 | 1 | 0 | 1 | 1 |
| 0 | 0 | 1 | 0 | 1 | 0 | 0 | 0 | 0 | 0 | 1 | 0 | 1 | 1 | 1 | 0 |
| 0 | 0 | 1 | 0 | 1 | 1 | 0 | 0 | 0 | 0 | 1 | 1 | 0 | 0 | 0 | 1 |
| 0 | 0 | 1 | 1 | 0 | 0 | 0 | 0 | 0 | 0 | 1 | 1 | 0 | 1 | 0 | 0 |
| 0 | 0 | 1 | 1 | 0 | 1 | 0 | 0 | 0 | 0 | 1 | 1 | 0 | 1 | 1 | 1 |
| 0 | 0 | 1 | 1 | 1 | 0 | 0 | 0 | 0 | 0 | 1 | 1 | 1 | 0 | 1 | 0 |
| 0 | 0 | 1 | 1 | 1 | 1 | 0 | 0 | 0 | 0 | 1 | 1 | 1 | 1 | 0 | 1 |
| 0 | 1 | 0 | 0 | 0 | 0 | 0 | 0 | 0 | 1 | 0 | 0 | 0 | 0 | 0 | 0 |
| 0 | 1 | 0 | 0 | 0 | 1 | 0 | 0 | 0 | 1 | 0 | 0 | 0 | 0 | 1 | 0 |
| 0 | 1 | 0 | 0 | 1 | 0 | 0 | 0 | 0 | 1 | 0 | 0 | 0 | 1 | 0 | 0 |
| 0 | 1 | 0 | 0 | 1 | 1 | 0 | 0 | 0 | 1 | 0 | 0 | 0 | 1 | 1 | 0 |
| 0 | 1 | 0 | 1 | 0 | 0 | 0 | 0 | 0 | 1 | 0 | 0 | 1 | 0 | 0 | 0 |
| 0 | 1 | 0 | 1 | 0 | 1 | 0 | 0 | 0 | 1 | 0 | 0 | 1 | 0 | 1 | 0 |
| 0 | 1 | 0 | 1 | 1 | 0 | 0 | 0 | 0 | 1 | 0 | 0 | 1 | 1 | 0 | 0 |
| 0 | 1 | 0 | 1 | 1 | 1 | 0 | 0 | 0 | 1 | 0 | 0 | 1 | 1 | 1 | 0 |
| 0 | 1 | 1 | 0 | 0 | 0 | 0 | 0 | 0 | 1 | 0 | 1 | 0 | 0 | 0 | 0 |
| 0 | 1 | 1 | 0 | 0 | 1 | 0 | 0 | 0 | 1 | 0 | 1 | 0 | 0 | 1 | 0 |
| 0 | 1 | 1 | 0 | 1 | 0 | 0 | 0 | 0 | 1 | 0 | 1 | 0 | 1 | 0 | 0 |
| 0 | 1 | 1 | 0 | 1 | 1 | 0 | 0 | 0 | 1 | 0 | 1 | 0 | 1 | 1 | 0 |
| 0 | 1 | 1 | 1 | 0 | 0 | 0 | 0 | 0 | 1 | 0 | 1 | 0 | 1 | 1 | 1 |
| 0 | 1 | 1 | 1 | 0 | 1 | 0 | 0 | 0 | 1 | 0 | 1 | 1 | 0 | 0 | 0 |
| 0 | 1 | 1 | 1 | 1 | 0 | 0 | 0 | 0 | 1 | 0 | 1 | 1 | 0 | 0 | 0 |
| 0 | 1 | 1 | 1 | 1 | 1 | 0 | 0 | 0 | 1 | 0 | 1 | 1 | 0 | 0 | 0 |
| 1 | 0 | 0 | 0 | 0 | 0 | 0 | 0 | 0 | 1 | 0 | 1 | 1 | 0 | 0 | 0 |
| 1 | 0 | 0 | 0 | 0 | 1 | 0 | 0 | 0 | 1 | 0 | 1 | 1 | 0 | 0 | 0 |
| 1 | 0 | 0 | 0 | 1 | 0 | 0 | 0 | 0 | 1 | 0 | 1 | 1 | 0 | 0 | 0 |
| 1 | 0 | 0 | 0 | 1 | 1 | 0 | 0 | 0 | 1 | 0 | 1 | 1 | 0 | 0 | 0 |
| 1 | 0 | 0 | 1 | 0 | 0 | 0 | 0 | 0 | 1 | 0 | 1 | 1 | 0 | 0 | 0 |
| 1 | 0 | 0 | 1 | 0 | 1 | 0 | 0 | 0 | 1 | 0 | 1 | 1 | 0 | 0 | 0 |
| 1 | 0 | 0 | 1 | 1 | 0 | 0 | 0 | 0 | 1 | 0 | 1 | 1 | 0 | 0 | 0 |
| 1 | 0 | 0 | 1 | 1 | 1 | 0 | 0 | 0 | 1 | 0 | 1 | 1 | 0 | 0 | 0 |
| 1 | 0 | 1 | 0 | 0 | 0 | 0 | 0 | 0 | 1 | 0 | 1 | 0 | 1 | 0 | 0 |
| 1 | 0 | 1 | 0 | 0 | 1 | 0 | 0 | 0 | 1 | 0 | 1 | 0 | 0 | 1 | 0 |
| 1 | 0 | 1 | 0 | 1 | 0 | 0 | 0 | 0 | 1 | 0 | 1 | 0 | 0 | 0 | 0 |
| 1 | 0 | 1 | 0 | 1 | 1 | 0 | 0 | 0 | 1 | 0 | 0 | 1 | 1 | 1 | 0 |
| 1 | 0 | 1 | 1 | 0 | 0 | 0 | 0 | 0 | 1 | 0 | 0 | 1 | 1 | 0 | 0 |
| 1 | 0 | 1 | 1 | 0 | 1 | 0 | 0 | 0 | 1 | 0 | 0 | 1 | 0 | 0 | 1 |
| 1 | 0 | 1 | 1 | 1 | 0 | 0 | 0 | 0 | 1 | 0 | 0 | 0 | 1 | 1 | 0 |
| 1 | 0 | 1 | 1 | 1 | 1 | 0 | 0 | 0 | 1 | 0 | 0 | 0 | 0 | 1 | 1 |
| 1 | 1 | 0 | 0 | 0 | 0 | 0 | 0 | 0 | 1 | 0 | 0 | 0 | 0 | 0 | 0 |
| 1 | 1 | 0 | 0 | 0 | 1 | 0 | 0 | 0 | 0 | 1 | 1 | 1 | 1 | 0 | 1 |
| 1 | 1 | 0 | 0 | 1 | 0 | 0 | 0 | 0 | 0 | 1 | 1 | 1 | 0 | 1 | 0 |
| 1 | 1 | 0 | 0 | 1 | 1 | 0 | 0 | 0 | 0 | 1 | 1 | 0 | 1 | 1 | 1 |
| 1 | 1 | 0 | 1 | 0 | 0 | 0 | 0 | 0 | 0 | 1 | 1 | 0 | 1 | 0 | 0 |
| 1 | 1 | 0 | 1 | 0 | 1 | 0 | 0 | 0 | 0 | 1 | 1 | 0 | 0 | 0 | 1 |
| 1 | 1 | 0 | 1 | 1 | 0 | 0 | 0 | 0 | 0 | 1 | 0 | 1 | 1 | 1 | 0 |
| 1 | 1 | 0 | 1 | 1 | 1 | 0 | 0 | 0 | 0 | 1 | 0 | 1 | 0 | 1 | 1 |
| 1 | 1 | 1 | 0 | 0 | 0 | 0 | 0 | 0 | 0 | 1 | 0 | 0 | 1 | 0 | 0 |
| 1 | 1 | 1 | 0 | 0 | 1 | 0 | 0 | 0 | 0 | 1 | 0 | 0 | 0 | 0 | 0 |
| 1 | 1 | 1 | 0 | 1 | 0 | 0 | 0 | 0 | 0 | 0 | 1 | 1 | 1 | 0 | 0 |
| 1 | 1 | 1 | 0 | 1 | 1 | 0 | 0 | 0 | 0 | 0 | 1 | 1 | 0 | 0 | 0 |
| 1 | 1 | 1 | 1 | 0 | 0 | 0 | 0 | 0 | 0 | 0 | 1 | 0 | 1 | 0 | 0 |
| 1 | 1 | 1 | 1 | 0 | 1 | 0 | 0 | 0 | 0 | 0 | 0 | 1 | 1 | 0 | 0 |
| 1 | 1 | 1 | 1 | 1 | 0 | 0 | 0 | 0 | 0 | 0 | 0 | 1 | 0 | 0 | 0 |
| 1 | 1 | 1 | 1 | 1 | 1 | 0 | 0 | 0 | 0 | 0 | 0 | 0 | 1 | 0 | 0 |

front contact of the corresponding DDS relay, they will not be further described.

The transformation matrices for the anti-log deviation generator of FIGS. 12*a* and 12*b* are shown in Table XIII (col. 36). In Table XIII, the DDS relay positions are numbered in accordance with the relay designation and the corresponding deviation factors are assigned arbitrary digit position numbers for convenience. In addition, the terminal designations for the last seven digits of the factor B are given. Accordingly, the operation of the anti-log generator is summarized in the table in the manner made familiar by the previous discussion. That is, for example, taking the first entry in Table XIII, if only relay DDS6 is energized, terminals *k* and *m* will be energized from terminal B of the battery over circuits shown in FIGS. 12*a* and 12*b*.

The manner in which individual circuits may be constructed from Table XIII is the same as that described above. That is, individual terminal matrices are written from the table, and these matrices are reduced by the methods previously given to the required circuits. In order to fix the concepts involved, and to illustrate the derivation of these circuits, the individual circuits are discussed in somewhat more detail below.

$$g\text{ matrix}=\begin{vmatrix}0\\ \searrow 10000\\ \vdots\\ 110000\end{vmatrix}=\begin{vmatrix}010---\\011---\\100---\\101---\\110000\end{vmatrix}$$

$$g=\begin{vmatrix}01----\\10----\\110000\end{vmatrix}$$

which can be recognized as

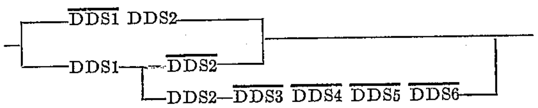

In FIG. 12*a*, this circuit involves contact *a* of relay DDS1, contacts *a* and *b* of relay DDS2, and the back points of contacts *a* of relays DDS3, DDS4, DDS5 and DDS6.

$$h\text{ matrix}=\begin{vmatrix}000111\\ \vdots\\ 001111\end{vmatrix}+\begin{vmatrix}110001\\ \vdots\\ 111001\end{vmatrix}$$

$$h=\begin{vmatrix}000111\\001---\end{vmatrix}+\begin{vmatrix}110001\\110010\\110011\\110100\\110101\\110110\\110111\\111000\\111001\end{vmatrix}$$

$$h=00\begin{vmatrix}0111\\1---\end{vmatrix}+11\begin{vmatrix}0\begin{vmatrix}0\begin{vmatrix}01\\1-\end{vmatrix}\\ 1--\end{vmatrix}\\ 1\,|00-|\end{vmatrix}$$

or

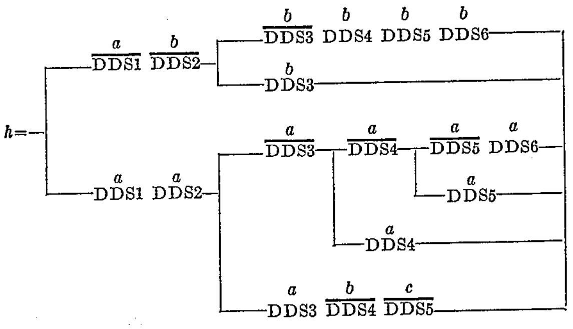

where the small letters above the relay designations indicate the contacts of the corresponding circuits in FIG. 12*a*.

The *i* and *j* terminal matrices can be reduced to circuits by the same methods, and the resultant circuits are shown in FIGS. 12*a* and 12*b*. The matrices, as can be seen from Table XIII, are as follows:

$$i\text{ matrix}=\begin{vmatrix}000100\\000101\\000110\\111010\\111011\\111100\end{vmatrix}+\begin{vmatrix}001011\\ \vdots\\ 001111\end{vmatrix}+\begin{vmatrix}011000\\ \vdots\\ 101010\end{vmatrix}+\begin{vmatrix}110001\\ \vdots\\ 110101\end{vmatrix}$$

$$j\text{ matrix}=\begin{vmatrix}000010\\000011\\000101\\000110\\001000\\001001\\001010\\001110\\001111\\010100\\010101\\010110\\010111\end{vmatrix}+\begin{vmatrix}011101\\ \vdots\\ 100111\end{vmatrix}+\begin{vmatrix}101011\\101100\\101101\\110001\\110010\\110110\\110111\\111010\\111011\\111101\\111110\end{vmatrix}$$

The groupings are, of course, not ultimately material, since $$\begin{vmatrix}abc\\def\\ghi\\jkl\end{vmatrix}$$

for example means the same as $$\begin{vmatrix}abc\\def\end{vmatrix}+\begin{vmatrix}ghi\\jkl\end{vmatrix}$$

However, more or less random sequences have been grouped together, as in the first sub-matrix of the *j* matrix, and sequences which appear to have a property in common that would simplify their reduction have been grouped together, as in the second sub-matrix of the *j* matrix.

It will be instructive to carry out part of the reduction of the *k* terminal matrix, since this matrix is typical of a random array which can be reduced by the methods herein described. From Table XIII, $$k\ \text{matrix}=\left|\begin{array}{c}000001\\000011\\000100\\000110\\001010\\001100\\001101\\001111\\010010\\010011\\010110\\010111\\011010\\011011\\011100\\101000\\101011\\101100\\101110\\110001\\110011\\110100\\110110\\111000\\111010\\111100\\111101\\111111\end{array}\right| = \left|000\left|\begin{array}{c}001\\011\\100\\110\end{array}\right|\right| + \left|001\left|\begin{array}{c}010\\100\\101\\111\end{array}\right|\right| + \left|010\left|\begin{array}{c}010\\011\\110\\111\end{array}\right|\right| + \left|011\left|\begin{array}{c}010\\011\\100\end{array}\right|\right| + \left|101\left|\begin{array}{c}000\\011\\100\\110\end{array}\right|\right| + \left|110\left|\begin{array}{c}001\\011\\100\\110\end{array}\right|\right| + \left|111\left|\begin{array}{c}000\\010\\100\\101\\111\end{array}\right|\right|$$

$$= \left|\begin{array}{c}000\\110\end{array}\left|\begin{array}{c}001\\011\\100\\110\end{array}\right|\right| + \left|\begin{array}{c}001\\111\end{array}\left|\begin{array}{c}010\\100\\101\\111\end{array}\right|\right| + 111000 + 010\text{-}1\text{-} + \left|\begin{array}{c}011\\101\end{array}\left|\begin{array}{c}011\\100\end{array}\right|\right| + 011010 + \left|101\left|\begin{array}{c}000\\110\end{array}\right|\right|$$

Further reduction by the previous methods gives $$k=00\left|\begin{array}{l}0\left|\begin{array}{c}0\text{-}1\\1\text{-}0\end{array}\right|\\ 1\left|\begin{array}{l}010\\1\left|\begin{array}{c}0\text{-}\\11\end{array}\right|\end{array}\right|\end{array}\right| + 01\left|\begin{array}{l}0\text{-}1\text{-}\\1\left|\begin{array}{c}01\text{-}\\100\end{array}\right|\end{array}\right| + 101\left|\begin{array}{l}0\left|\begin{array}{c}00\\11\end{array}\right|\\1\text{-}0\end{array}\right| + 11\left|\begin{array}{l}0\left|\begin{array}{c}0\text{-}1\\1\text{-}0\end{array}\right|\\1\left|\begin{array}{l}0\text{-}0\\1\left|\begin{array}{c}0\text{-}\\11\end{array}\right|\end{array}\right|\end{array}\right|$$

Each of the reduced arrays can now be circuited. The final circuits for terminal $k$ are shown in FIG. 12$a$. Each of the digits in the above matrix, in general, represents a separate contact, although in many instances combinations are possible. For example, the first 0 in each of the first two sub-matrices in $k$ above could represent the same back contact ($d$ in FIG. 12$a$) of relay DDS1.

The $l$ and $m$ matrices are best handled by one of the special methods given above; namely, by noting that in many cases the terminal values are the same as, or are opposite to, one of the input values for several sequential inputs. The matrix is written in such a case as a front or back contact of the input value to be followed in series with a circuit closed over all the sequences in which the selected input value is followed. Thus, the $l$ and $m$ matrices are, from Table XIII, $$l\ \text{matrix}=\text{DDS5}\left|\begin{array}{c}\left|\begin{array}{c}000001\\ \vdots\\001000\end{array}\right|\\ \left|\begin{array}{c}101011\\ \vdots\\110111\end{array}\right|\end{array}\right| + \text{DDS6}\left|\begin{array}{c}010000\\ \vdots\\011111\end{array}\right| + \left|\begin{array}{l}001\left|\begin{array}{c}001\\010\\101\\110\end{array}\right|\\ \\011100\\101001\end{array}\right|$$

$$m\ \text{matrix}=\text{DDS6}\left|\begin{array}{c}\left|\begin{array}{c}000001\\ \vdots\\001111\end{array}\right|\\ \left|\begin{array}{c}101100\\ \vdots\\110111\end{array}\right|\end{array}\right| + 011100$$

As shown above, the $l$ matrix includes a random sub-matrix and the $m$ matrix includes one random term. However, it is easier to treat the individual sub-matrices than to deal with a single large matrix. The first step in the reduction of the above sub-matrices that include an external DDS5 or DDS6 contact would be to remove the corresponding fifth or sixth row from the matrix. The detailed reduced circuits are shown in FIGS. 12$a$ and 12$b$.

In order to illustrate the operation of this embodiment of my invention, assume that it is desired to find the factor B corresponding to a value $A+B$ of .0110101100. The first six digits of this number, that is, 011010 are applied to terminals $a$ through $f$ by energizing terminals $b$, $c$ and $e$ from terminal B of the battery and leaving the remaining terminals deenergized. Accordingly, relays DDS2, DDS3 and DDS5 are energized and relays DDS1, DDS4 and DDS6 remain deenergized. Terminal $g$ will now be energized over a circuit extending from terminal B of the battery over the back point of contact $a$ of relay DDS1 and the front point of contact $b$ of relay DDS2.

Terminal $h$ will remain deenergized. This can be seen by tracing back from terminal $h$ over the front point of contact $b$ of relay DDS3 to the open back point of contact $b$ of relay DDS2, over the back point of contact $b$ of relay DDS4 to the open back point of contact $c$ of relay DDS5, to open front points $a$ of relays DDS4 and DDS6, and over the front point of contact $a$ of relay DDS5 and the back point of contact $a$ of relay DDS4 to the open back point of contact $a$ of relay DDS3.

Terminal $i$ will be energized over a circuit extending from terminal B of the battery over front contact $e$ of relay DDS3, the front point of contact $d$ of relay DDS2 and the back point of contact $b$ of relay DDS1.

Terminal $j$ will be deenergized. This can be seen by tracing back from terminal $j$ over the back point of contact $c$ of relay DDS1 and the front point of contact $f$ of relay DDS2 to the open front point of contact $k$ of relay DDS4.

Terminal $k$ will be energized over a circuit extending from terminal B of the battery over the front point of contact $h$ of relay DDS5, the back point of contact $m$ of relay DDS4, the front point of contact $m$ of relay DDS3, the front point of contact $h$ of relay DDS2, and the back point of contact $d$ of relay DDS1.

Terminal $l$ will be deenergized. This can be seen by tracing back from terminal $l$ over the back point of contact $e$ of relay DDS1, the front point of contact $j$ of relay DDS2, the front point of contact $p$ of relay DDS3, the back point of contact $p$ of relay DDS4, and thence over a plurality of paths which may be traced; first, over the back point of contact $r$ of relay DDS4 to the open back point of contact $s$ of relay DDS3; second, to the open back point of contact $p$ of relay DDS3; third, over the front point of contact $t$ of relay DDS3 to the open front contact $n$ of relay DDS4; fourth, to the open back point of contact $l$ of relay DDS2; fifth, over the back point of contact $o$ of relay DDS4 and the front point of contact $o$ of relay DDS3 to the open back point of contact $i$ of relay DDS2; sixth, to the open front point of contact *i* of relay DDS6; and finally, over the front point of contact *i* of relay DDS5, the back point of contact *s* of relay DDS4, and front contact *l* of relay DDS3 to the open back point of contact *g* of relay DDS2.

Terminal *m* will be deenergized. This can be seen by tracing back from terminal *m* over the back point of contact *f* of relay DDS1, the front point of contact *l* of relay DDS2, front contact *r* of relay DDS3 and thence to the open front point of contact *q* of relay DDS4.

From the above description, it will be apparent that terminals *g* through *m* are energized in the pattern 1010100, which will be seen from Table XIII above to be correct.

The manner in which this embodiment of my invention cooperates with external apparatus will be illustrated below in the description of the flow computer of my invention.

THE DECIMAL REGISTER SHIFT REGISTER, SHIFT GENERATOR, CONTROL AND RANGE CONTROL

This apparatus is shown in FIGS. 13*a* through 13*f*, inclusive. Since the various units, while possessing independent functions, are structurally and functionally interrelated, they will be considered together.

The purpose of this group of modules is to convert logarithms over a wide magnitude range to a logarithm of given narrower magnitude range by subtracting the logarithm of a fractional power of 10 depending on the size of the input. The particular embodiment to be described is especially adapted to be used as a component of the flow computer of my invention, to be described. In the flow computer, various factors of 10 and of the square root of 10 are introduced for convenience in different stages of the computation process, and these must be removed in order to restore the computer output to the correct value dictated by the inputs. In particular, it is necessary, in order to handle the range of inputs encountered in one practical embodiment of the flow computer, to subtract from a given input the binary logarithm to the base 2 of 10 to the ½, 1½, 2½ or 3½ power in accordance with the value of the input. The result of this operation is to give a logarithm which will always have a characteristic *n* of either 0, 1, 2 or 3. The apparatus for carrying out this subtraction will now be described.

Referring now to FIGS. 13*a*, 13*b* and 13*c*, the input, which is assumed to be in the form $n+A+B$, is applied to a module arbitrarily designated as a decimal register shift input register comprising four characteristic repeater relays DRSC1, DRSC2, DRSC4 and DRSC8 and eight mantissa repeater relays DRS1 through DRS8. The DRSC relays repeat the corresponding 1, 2, 4 and 8 digits of the characteristic of the logarithm, while the DRS relays, from DRS1 through DRS8, repeat the ½ through 1/256 digits of the mantissa of the applied logarithm, respectively. As shown in FIG. 13*a*, these input digits are applied to the series of terminals *a*, *b*, *c* and *d* for the 8, 4, 2 and 1 digits of the characteristic, respectively, and to terminals *e*, *f*, *g*, *h*, *i*, *j*, *k* and *l* for the ½ through the 1/256 digits of the mantissa. These relays are accordingly energized or deenergized according as the corresponding digits are 1 or 0. The armatures of these relays operate contacts in the remaining modules, as will now be described.

As shown in FIGS. 13*a*, 13*b* and 13*c*, the armatures of the register relays control contacts arbitrarily set off by dotted lines and designated as a decimal register shift generator. The function of this unit is to generate three sets of outputs, a first or *a* group corresponding to $n+A+B-\log_2 10^{0.5}$ or $n+A+B-\log_2 10^{3.5}$ depending on the setting of the range control, FIG. 13*c*, to be described. The second or *b* group of outputs is adapted to provide $n+A+B-\log_2 10^{2.5}$. A third or *c* group of outputs is adapted to provide $n+A+B-\log_2 10^{1.5}$. The individual output terminals of these groups have been given the designations $a_1$ through $a_{10}$, $b_1$ through $b_{10}$ and $c_1$ through $c_{10}$, respectively. The manner in which these outputs are generated over contacts of the DRS and DRSC relays will be described after the range control of FIG. 13*c* is described.

Referring now to FIG. 13*c*, the range control unit comprises a single relay SL3160 and a manual switch M having two positions. In the first position, the relay is deenergized as shown, and the flow computer, to be described, is adapted to compute flows between 0 and 999 in increments of 1. With relay SL3160 energized, the flow computer is adapted to handle flows between 0 and 9990 in increments of 10, where the units can be arbitrarily selected but may, as in one practical embodiment of my invention, be measured in millions of cubic feet per day.

The functions of the contacts shown on relay SL3160 are to rearrange the circuits for the other SL relays, and for the contacts of the first subtracter network, so that when large range inputs are encountered, the logarithm of an appropriately larger power of 10 will be subtracted from the input at the upper end of the input range to bring the range of the output down to the desired range in which it can be expressed as a logarithm having a characteristic of 0, 1, 2 or 3. In order to better comprehend this operation, the operation of the subtracer networks will now be described.

Each of the subtracter networks terminating in terminal set *a*, terminal set *b* and terminal set *c* and shown in FIGS. 13*a*, 13*b* and 13*c*, may be considered as a group of subtracter modules of the type described in connection with FIGS. 6*a* and 6*b* which have been simplified by permanently wiring in as the subtrahend an input which is the appropriate logarithm to the base 2 of the power of 10 to be subtracted. That is, since only one set of variable inputs is provided, the register relays can be reduced from double coil as shown in FIGS. 6*a* and 6*b* to single coil as shown in FIGS. 13*a*, 13*b* and 13*c*. The contacts of the network to which a particular digit is applied will be reversed if the permanently wired-in digit is a 1, since this would cause an opposite reaction to an input in the double coil module previously described. The contacts of the range control in the first subtracter network for the group *a* outputs of the shift generator simply rearrange the connections to form a constant subtraction input corresponding to a higher power of 10. The detailed circuits for carrying out these functions are shown in the drawings, and will now be described in more detail.

The basic purpose of the decimal register shift equipment and the range control of FIGS. 13*a*–13*f* is, as noted above, to provide a logarithm of uniform range for further processing. Table XIV below shows the values to be subtracted from the input in terms of the particular SL relay that is operated. As will appear, one of relays SL316, SL32 or SL3 is selected through a chain that determines whether the binary input is equal to or larger than the binary equivalent associated with the corresponding SL relay (Table XIV). If the input is smaller, it is passed through the chain to the next lower numbered SL relay. The operation of a particular SL relay determines which binary group is subtracted from the input combination. The output thus is never larger than the binary log of 9.99 or smaller than the binary log of 1.00. If the SL316 relay is operated, then in the flow computer to be described, three output digits will be translated. If relay SL32 is operated, then the first two digits will be translated. If relay SL3 is operated, then only the first digit will be translated. With only one digit to translate, the binary equivalent of $\log_2 10^{0.5}$ can be a rough approximation of its exact value. As will appear, a supression circuit is provided for the *a* group of outputs to prevent the first digit from being larger than a 9 when this approximate value is used. Relay SL3160 operates to change the output of the $a$ group of terminals, as will appear.

*Table XIV*

| Relay operated | Max. input | Min. input | $Log_2 10^P$ Subtracted | P |
|---|---|---|---|---|
| SL3 | 100.11111011 | 1.10100000 | 1.10100000 | ½ |
| SL32 | 1000.01001101 | 100.11111100 | 100.11111100 | 1½ |
| SL316 | 1011.10011111 | 1000.01001110 | 1000.01001110 | 2½ |
| SL3, SL3160 | 1111.10011111 | 1011.10100000 | 1011.10100000 | 3½ |

The detailed structure and operation of the subtraction circuits forming the decimal register shift generator of FIGS. 13*a*, 13*b* and 13*c* will now be described.

First, consider the $a$ group of output terminals $a_1$–$a_{10}$. Assuming first that relay SL3160 is deenergized, in accordance with Table XIV above, this group provides outputs from $$\begin{array}{r} 100.11111011 \\ -\underline{\quad 1.10100000} \end{array} \quad \text{to} \quad \begin{array}{r} 1.101000000 \\ -\underline{1.101000000} \end{array}$$

with a suppression circuit to prevent an output above $\log_2 9.99$ (approximately 11.01010100) in the case of inputs 100.11110101
100.11110110
100.11110111
100.11111000
100.11111001
100.11111010
100.11111011

Ignoring the suppression circuit for the time being, the subtraction may be formalized as $$\begin{array}{r} b\ c\ d\ .\ e\ f\ g\ h\ i\ j\ k\ l \\ -\underline{\quad 1\ .\ 1\ 0\ 1\ 0\ 0\ 0\ 0\ 0} \\ a_1 a_2\ .\ a_3 a_4 a_5 a_6 a_7 a_8 a_9 a_{10} \end{array}$$

where the input is represented by the corresponding input terminals of the decimal register shift register and the output is indicated in terms of the corresponding $a$ terminals of the shift generator. It will be obvious that $a_6$, $a_7$, $a_8$, $a_9$ and $a_{10}$ can be repeated from the input, since 0's are subtracted from $h$, $i$, $j$, $k$ and $l$. Accordingly, in FIGS. 13*a* and 13*b*, the circuits for these terminals are shown as comprising a single front contact of the corresponding DRS relay, such as the circuit from terminal B of the battery over front contact $a$ of relay DRS7 for terminal $a_9$.

Terminal $a_5$ has the possibilities $$(1)\ \begin{array}{r} 1 \\ \underline{1} \\ 0 \end{array} \qquad (2)\ \begin{array}{r} 0 \\ \underline{1} \\ \leftarrow 1 \end{array}$$

In case (2), when terminal $g$ is deenergized, relay DRS3 is released and terminal $a_5$ will be energized over the back point of contact $a$ of relay DRS3. A "borrow 1" will also be supplied over this circuit to the back point of contact $c$ of relay DRS2. In case (1), the back point of contact $a$ of relay DRS3 will be open and the front point will be closed, deenergizing terminal $a_5$ and supplying a "no borrow" to the back point of contact $a$ and the front point of contact $c$ of relay DRS2.

Terminal $a_4$ has the possibilities $$(1)\ \begin{array}{r} 0 \\ \underline{0} \\ 0 \end{array} \qquad (2)\ \begin{array}{r} 0 \\ \underline{0}\leftarrow \\ \leftarrow 1 \end{array} \qquad (3)\ \begin{array}{r} 1 \\ \underline{0} \\ 1 \end{array} \ \text{and} \ (4)\ \begin{array}{r} 1 \\ \underline{0}\leftarrow \\ 0 \end{array}$$

In cases (1) and (2), relay DRS2 is deenergized. If a "borrow 1" is present at the back point of contact $c$ of relay DRS2 from the operation described above, which is case (2), terminal $a_4$ will be energized over a circuit extending from terminal B of the battery over the back point of contact $a$ of relay DRS3, the back point of contact $c$ of relay DRS2, the back point of contact $c$ of relay SL3160 (FIG. 13*c*), and the back point of contact $a$ of relay DRSC4 (if relay DRSC4 were energized, the suppression circuit, to be described, would be in effect) to terminal $a_4$. With no borrow from the preceding digit (case (1)), terminal $a_4$ will be deenergized.

With relay DRS2 energized, and no previous borrow (case (3)), terminal $a_4$ will be energized over a circuit extending from terminal B of the battery over the front point of contact $a$ of relay DRS3, the front point of contact $c$ of relay DRS2, the back point of contact $c$ of relay SL3160, and the back point of contact $a$ of relay DRSC4. If there is a previous borrow (case (4)), there will be no energy at the front point of contact $a$ of relay DRS3 and terminal $a_4$ will remain deenergized.

It is believed that the above description is sufficient to enable the remaining circuits to be analyzed from their input possibilities, which are as follows:

$$a_3:\quad (1)\ \begin{array}{r} 0 \\ \underline{1}\leftarrow \\ \leftarrow 0 \end{array} \qquad (2)\ \begin{array}{r} 0 \\ \underline{1} \\ \leftarrow 1 \end{array} \qquad (3)\ \begin{array}{r} 1 \\ \underline{1}\leftarrow \\ \leftarrow 1 \end{array} \qquad (4)\ \begin{array}{r} 1 \\ \underline{1} \\ 0 \end{array}$$

$$a_2:\quad (1)\ \begin{array}{r} 0 \\ \underline{1}\leftarrow \\ \leftarrow 0 \end{array} \qquad (2)\ \begin{array}{r} 0 \\ \underline{1} \\ \leftarrow 1 \end{array} \qquad (3)\ \begin{array}{r} 1 \\ \underline{1}\leftarrow \\ \leftarrow 1 \end{array} \qquad (4)\ \begin{array}{r} 1 \\ \underline{1} \\ 0 \end{array}$$

$$a_1:\quad (1)\ \begin{array}{r} 00 \\ \underline{0} \\ 0 \end{array} \qquad (2)\ \begin{array}{r} 01 \\ \underline{0}\leftarrow \\ 0 \end{array} \qquad (3)\ \begin{array}{r} 01 \\ \underline{0} \\ 1 \end{array} \qquad (4)\ \begin{array}{r} 10 \\ \underline{0}\leftarrow \\ 1 \end{array}$$

These circuits are shown in detail in FIGS. 13*a*, 13*b* and 13*c*.

Next, the operation of the suppression circuit will be described. As shown in FIGS. 13*a*, 13*b* and 13*c*, the energizing circuit for terminal $a_4$ extends over the back point of contact $a$ of relay DRSC4, which is energized when the input is 0100.0 or larger. With relay DRSC4 energized, lead $a_4$ cannot be energized and the output cannot register over 11.00111111, which prevents the first digit in the computer output, to be described, from being larger than 9.

Range control relay SL3160, when energized, converts the subtraction circuits for the $a$ terminals to subtract $\log_2 10^{3.5}$, or, formally, to perform the operation, $$\begin{array}{r} a\ b\ c\ d\ .\ e\ f\ g\ h\ i\ j\ k\ l \\ -\underline{1\ 0\ 1\ 1\ .\ 1\ 0\ 1\ 0\ 0\ 0\ 0\ 0} \\ a_1 a_2 .\ a_3 a_4 a_5 a_6 a_7 a_8 a_9 a_{10} \end{array}$$

Obviously, the last five terminals $a_6$–$a_{10}$ may be circuited as before, to repeat the inputs. Also, it will be noted that the digits 1.101 of the subtrahend are not changed, and the circuits for terminals $a_2$, $a_3$, $a_4$, and $a_5$ accordingly remain the same, except that the suppression circuit is not needed, and is dispensed with by bypassing contact $a$ of relay DRSC4 through the circuit over front contact $c$ of relay SL3160.

The following possibilities exist for terminal $a_1$ in this case:

$$(1)\ \begin{array}{r} 111 \\ \underline{101}\leftarrow \\ 1 \end{array} \qquad (2)\ \begin{array}{r} 110 \\ \underline{101}\leftarrow \\ 0 \end{array} \qquad (3)\ \begin{array}{r} 110 \\ \underline{101} \\ 1 \end{array} \qquad (4)\ \begin{array}{r} 101 \\ \underline{101} \\ 0 \end{array}$$

It can be seen that if relay DRSC2 is energized, corresponding to cases (1) and (4), $a_1$ is 0 if there is no previous borrow and 1 if there is a previous borrow. Thus, in FIGS. 13*a*, 13*b* and 13*c*, with relays DRSC2 and SL3160 energized, lead $a_1$ may be energized over a circuit extending from terminal B of the battery over the back point of contact $b$ of relay DRSC1, the front point of contact $b$ of relay SL3160, and the front point of contact $a$ of relay DRSC2. (As can be seen from cases (1) and (2) for terminal $a_2$ above, there will be a previous borrow if relay DRSC1 is released.) Terminal $a_1$ can also be energized with relay DRSC1 energized and relay DRS1 released (case (3) of terminal $a$ above) over a circuit extending from terminal B of the battery over the back point of contact $a$ of relay DRS1, the front point of contacts $c$ and $b$ of relay DRSC1, the front point of contact $b$ of relay SL3160, and the front point of contact $a$ of relay DRSC2.

If relay DRSC2 is released, corresponding to cases (2) and (3) for terminal $a_1$ above, with relay SL3160 energized, $a_1$ is energized only when there is no previous borrow. In this case, the circuit extends from terminal B of the battery over the front point of contact $a$ of relay DRS2, the front point of contact $b$ of relay DRS1, the front point of contact $a$ of relay DRSC1, the front point of contact $a$ of relay SL3160, and the back point of contact $b$ of relay DRSC2 to terminal $a_1$.

The structure and operation of the circuits for the $b$ and $c$ output groups will be understood from the above description of the $a$ output group, noting that there are no suppression or range modification circuits used for these groups, and in view of their terminal input conditions, which will now be described.

The $b$ output subtraction network can be summarized in terms of register input terminals and generator output terminals as follows:

$$\begin{array}{r} a\,b\,c\,d\,.\,e\,f\,g\,h\,i\,j\,k\,l \\ -\underline{1\,0\,0\,0\,.\,0\,1\,0\,0\,1\,1\,1\,0} \\ b_1 b_2\,.\,b_3 b_4 b_5 b_6 b_7 b_8 b_9 b_{10} \end{array}$$

where the maximum input is 1011.10011111 and the minimum is 1000.01001110 (from Table XIV). The $b_{10}$ output can be repeated directly from the input over a front contact of relay DRS8. The remaining terminal conditions are as follows:

| | (1) | (2) | (3) | (4) |
|---|---|---|---|---|
| $b_9$: | 1<br>1<br>—<br>0 | 0<br>1<br>—<br>←1 | | |
| $b_4, b_7, b_8$: | 1<br>1<br>—<br>0 | 1<br>1←<br>—<br>←1 | 0<br>1<br>—<br>←1 | 0<br>1←<br>—<br>←0 |
| $b_2, b_3, b_5, b_6$: | 1<br>0<br>—<br>1 | 1<br>0←<br>—<br>0 | 0<br>0<br>—<br>0 | 0<br>0←<br>—<br>←1 |
| $b_1$: | 100<br>100<br>—<br>0 | 101<br>100<br>—<br>1 | 101<br>100←<br>—<br>0 | |

The $c$ output subtraction network can be summarized as follows:

$$\begin{array}{r} a\,b\,c\,d\,.\,e\,f\,g\,h\,i\,j\,k\,l \\ -\underline{1\,0\,0\,.\,1\,1\,1\,1\,1\,1\,0\,0} \\ c_1 c_2\,.\,c_3 c_4 c_5 c_6 c_7 c_8 c_9 c_{10} \end{array}$$

where $c_9$ and $c_{10}$ merely repeat the inputs on relays DRS7 and DRS8, respectively. From Table XIV, the maximum and minimum inputs are 1000.01001101 and 100.11111100 respectively. Thus, the remaining conditions on the terminals are

| | (1) | (2) | (3) | (4) |
|---|---|---|---|---|
| $c_8$: | 1<br>1<br>—<br>0 | 0<br>1<br>—<br>←1 | | |
| $c_3, c_4, c_5, c_6, c_7$: | 1<br>1<br>—<br>0 | 1<br>1←<br>—<br>←1 | 0<br>1<br>—<br>←1 | 0<br>1←<br>—<br>←0 |
| $c_2$: | 1<br>0<br>—<br>1 | 1<br>0←<br>—<br>0 | 0<br>0<br>—<br>0 | 0<br>0←<br>—<br>←1 |
| $c_1$: | 010<br>10<br>—<br>0 | 011<br>10<br>—<br>1 | 011<br>10←<br>—<br>0 | 100<br>10←<br>—<br>1 |

Detailed circuits for energizing the respective terminals in the appropriate cases above are shown in FIGS. 13$a$, 13$b$ and 13$c$.

FIGS. 13$d$, 13$e$ and 13$f$ show the details of a decimal register shift control which selects the appropriate output terminal group from the register shift generator outputs for use in external circuits. In accordance with Table XIV above, the SL relays are operated in response to the input applied to the DRS and DRSC relays of the register to be energized for all values between their minimum and maximum permissible inputs. It is believed that the structure and operation of these circuits will be readily understood in terms of the previous matrix analysis theory given, the contact matrices for the individual relays in terms of the register shift register input terminals being shown below.

$$\text{SL3 marrix}=\left\{\begin{array}{l} \left|\begin{array}{c} abcd.efghijkl \\ 0001.10100000 \\ \vdots \\ 0100.11111011 \end{array}\right| \overline{\text{SL3160}} \\ \quad + \\ \left|\begin{array}{c} 1011.10100000 \\ \vdots \\ 1111.10011111 \end{array}\right| \text{SL3160} \end{array}\right.$$

$$\text{SL32 matrix}=\left|\begin{array}{c} 0100.11111100 \\ \vdots \\ 1000.01001101 \end{array}\right|$$

$$\text{SL316 matrix}=\left|\begin{array}{c} 1000.01001110 \\ \vdots \\ 1011.10011111 \end{array}\right|$$

In the above expressions, the SL3160 designations will be understood to include the corresponding front or back contact of relay SL3160, these contacts being shown in FIG. 13$c$ as contacts $d$ and $e$ of relay SL3160. It should be noted in this connection that relays SL32 and SL316 are operated for their appropriate inputs regardless of the condition of relay SL3160.

As shown in FIG. 13$d$, the register shift control has a plurality of input terminals connected to the corresponding output terminals of the register shift generator. Each of these input terminal groups is connected over front contacts of its corresponding SL relays to a plurality of output terminals $d$, $e$, $f$, $g$, $h$, $i$, $j$, $k$, $l$ and $m$ as shown in FIG. 13$f$. In a manner obvious from the drawing, and noting that only one of the relays SL3, SL32 and SL16 is operated at any given time, it will be apparent that the appropriate output group is connected to the output terminals.

At this point, it may be remarked that the SL3160 relay is operated, in the embodiment shown, by a manual switch, which in the case of a flow computer constructed in accordance with one embodiment of my invention was actuated or not depending on which set of flow inputs were supplied to the computer. That is, if it was desired to process an input having a larger range than normal, relay SL3160 would be energized.

As shown in FIG. 13$f$, the decimal register shift control includes an additional pair of output terminals $o$ and $p$. These terminals are controlled over contacts of the SL relays to determine the proper decimal register shift needed to restore the output to the proper range, thus taking care of extraneous factors of 10 introduced during the computation. Terminal $o$, as will appear, is connected to control a relay DRSA in FIG. 16, and terminal $p$ is connected to control a relay DRSB in FIG. 16. (See FIGS. 19$f$ and 19$g$.)

Terminal $o$ is energized over a first circuit which extends from terminal B of the battery (FIG. 13$d$) over front contact $k$ of relay SL32. Terminal $o$ is accordingly energized by this circuit for all inputs between 100,11111100 and 1000.01001101, inclusive (Table XIV). A second circuit for terminal $o$ extends from terminal B of the battery (FIG. 13c) over the back point of contact $e$ of relay SL3160 and the front point of contact $k$ of relay SL3. This circuit energizes terminal $o$ for all inputs between 1.10100000 and 100.11111011. A third circuit for terminal $o$ extends from terminal B of the battery over the front point of contact $e$ of relay SL3160 in FIG. 13$c$, through FIGS. 13$f$ and 13$e$ to FIG. 13$d$, and hence over front contact $k$ of relay SL316 to output terminal $o$. This circuit energizes terminal $o$ in the high range condition for inputs between 1000.01001110 and 1011.10011111.

Terminal $p$ has a first energizing circuit extending from terminal B of the battery (FIG. 13*c*) over the back point of contact *e* of relay SL3160 to terminal *t* of the decimal register shift control, FIG. 13*f*, thence through FIGS. 13*e* and 13*d* to the front point of contact *l* of relay SL3, and thence to terminal *p* in FIG. 13*f*. This circuit energizes terminal *p* from input 1.10100000 to input 100.11111011. A second circuit, including the front point of contact *e* of relay SL3160 and the front point of contact *l* of relay SL32, is used in the high range to energize terminal *p* between input 100.11111100 and input 1000.01001101.

From the above description, it will appear that in the low range, with relay SL3160 released, both terminals *o* and *p* will be energized when relay SL 3 is energized; only terminal *o* will be energized when relay SL32 is energized, and neither terminal will be energized when relay SL316 is energized. In the high range, with relay SL3160 energized, both terminals *o* and *p* will be energized when relay SL32 is energized, only terminal *o* will be energized when relay SL316 is energized, and neither terminal will be energized when relay SL3 is energized. This control of the terminals is used to control relays DRSA and DRSB, to be described, to register the output, available as X.YZ, as X.0, XY.0, XYZ.0, in the low range, or X0.0, XY0.0, or XYZ0.0, in accordance with the correct decimal point position dictated by the inputs, in a manner hereinafter to be more fully described.

The operation of the above-described modules in connection with external circuits will be apparent from the description hereinafter given of the flow computer of my invention.

THE TRANSLATOR

FIGS. 14*a* and 14*b* show the details of a translator in accordance with my invention which is adapted to translate a decimal binary code input to a weighted binary output. In accordance with this embodiment of my invention, all the inputs are translated as though they were in the decimal form XY.Z. This simplifies the translation circuits, and the resultant factors of 10 which may incidentally be introduced can readily be removed by means of a register control of the type described above. Accordingly, referring now to FIG. 14*a*, the unit may alternately be termed a translator divider to bring out the fact that in general the decimal point of the decimal equivalent of the output will need to be adjusted, and, in practical applications such as the flow computer to be described, the result of the translation will frequently be a division by 10.

Referring now to FIG. 14*a*, the decimal binary code input is applied to a set of input terminals *a* through *l* which are divided into a first group *a, b, c* and *d* which are adapted to receive the 0.1, 0.2, 0.4 and 0.8 digits of the tenths decimal digit, terminals *e, f, g* and *h*, which receive the 1, 2, 4 and 8 binary digits of the units decimal digit, and terminals *i, j, k* and *l* which receive the 10, 20, 40 and 80 binary digits of the tens decimal digit.

Referring to FIG. 14*b*, the translator divider is provided with fourteen output terminals *m, n, o, p, q, r, s, t, u, v, w, x, y* and *z*. These output terminals are adapted to receive the 64 through 1/128 digits of the weighted binary number corresponding to the decimal binary input.

It will be found that the decimal units digits in decimal binary are the same in weighted binary. Further, in the (1) digit of the decimal units digits, the tenths or tens digits will never have any effect. Accordingly, the circuit for output terminal *s* is a simple connection to input terminal *e*. The remaining terminals are circuited over contacts of input repeater relays, as will now be described.

The tenths decimal digit applied to input terminals *a, b, c* and *d* is translated by means of relays TDU1, TDU2, TDU4 and TDU8. These relays are controlled directly from the input terminals in a manner which will be apparent from the drawings. Since the highest value of the tenths digit is always less than 1.0, the output will always translate into a number expressible on output terminals *t* through *z*. The individual translation circuits may be understood from the transformation matrices given in Table XV below.

*Table XV*

| TDU relays | | | | Output terminals | | | | | | |
|---|---|---|---|---|---|---|---|---|---|---|
| 8 | 4 | 2 | 1 | *t* | *u* | *v* | *w* | *x* | *y* | *z* |
| 0 | 0 | 0 | 1 | .0 | 0 | 0 | 1 | 1 | 0 | 1 |
| 0 | 0 | 1 | 0 | .0 | 0 | 1 | 1 | 0 | 1 | 0 |
| 0 | 0 | 1 | 1 | .0 | 1 | 0 | 0 | 1 | 1 | 0 |
| 0 | 1 | 0 | 0 | .0 | 1 | 1 | 0 | 0 | 1 | 1 |
| 0 | 1 | 0 | 1 | .1 | 0 | 0 | 0 | 0 | 0 | 0 |
| 0 | 1 | 1 | 0 | .1 | 0 | 0 | 1 | 1 | 0 | 1 |
| 0 | 1 | 1 | 1 | .1 | 0 | 1 | 1 | 0 | 1 | 0 |
| 1 | 0 | 0 | 0 | .1 | 1 | 0 | 0 | 1 | 1 | 0 |
| 1 | 0 | 0 | 1 | .1 | 1 | 1 | 0 | 0 | 1 | 1 |

The binary values above will be recognized as only approximations of the decimal input equivalents, but they are sufficiently accurate for practical purposes.

It will be noted that the individual terminal matrices are relatively simple, because of the limited number of inputs. It should be remembered that in decimal binary code the value of the input never exceeds 1001, as shown in Table XV above. The detailed circuits for the reduced terminal matrices are shown in FIG. 14*b*, and will not be discussed in detail because they are believed to be sufficiently clear from the previous discussion of circuit derivation by circuit matrix analysis.

The circuits for the units and tens digits of the input are somewhat complicated by the fact that the translations overlap in the binary range. This problem is handled, as shown in FIG. 14*a*, by adding the units digit to the tens digit after translating the tens digit to weighted binary. It should be recalled that the (1) digit in decimal binary translates directly to weighted binary, and, therefore, no translation of this digit is necessary before the addition is performed. There is no overlapping in the (1) digit position of the decimal units digit code, and for this reason terminal *e* may be directly connected to terminal *s* as previously pointed out. That is, no combination of 10, 20, 40 and 80 has a (1) in the binary equivalent.

The addition function is carried out by a three module adder comprising relays TDT2, TDT4 and TDT8 of the type described in connection with FIGS. 5*a* and 5*b*. It is only necessary to note that terminals *f, g* and *h* are connected to these relays in the same manner as inputs to the adder modules previously described, in connection with FIGS. 5*a* and 5*b*, whereas the translation of the tens digit is supplied in a very similar manner over contacts of the translation relay TDH1, TDH2, TDH4 and TDH8, which will next be described.

Relays TDH1, TDH2, TDH4 and TDH8 are respectively connected to input terminals *i, j, k* and *l*.

The transformation matrices for terminals *i, j, k* and *l*, and the corresponding relays TDH1, TDH2, TDH4 and TDH8, are as follows, the outputs being designated by their binary weights since they are not immediately applied to output terminals:

*Table XVI*

| Decimal | TDH input | | | | TDH output | | | | | | |
|---|---|---|---|---|---|---|---|---|---|---|---|
| | 8 | 4 | 2 | 1 | 64 | 32 | 16 | 8 | 4 | 2 | 1 |
| 0 | 0 | 0 | 0 | 0 | 0 | 0 | 0 | 0 | 0 | 0 | 0 |
| 10 | 0 | 0 | 0 | 1 | 0 | 0 | 0 | 1 | 0 | 1 | 0 |
| 20 | 0 | 0 | 1 | 0 | 0 | 0 | 1 | 0 | 1 | 0 | 0 |
| 30 | 0 | 0 | 1 | 1 | 0 | 0 | 1 | 1 | 1 | 1 | 0 |
| 40 | 0 | 1 | 0 | 0 | 0 | 1 | 0 | 1 | 0 | 0 | 0 |
| 50 | 0 | 1 | 0 | 1 | 0 | 1 | 1 | 0 | 0 | 1 | 0 |
| 60 | 0 | 1 | 1 | 0 | 0 | 1 | 1 | 1 | 1 | 0 | 0 |
| 70 | 0 | 1 | 1 | 1 | 1 | 0 | 0 | 0 | 1 | 1 | 0 |
| 80 | 1 | 0 | 0 | 0 | 1 | 0 | 1 | 0 | 0 | 0 | 0 |
| 90 | 1 | 0 | 0 | 1 | 1 | 0 | 1 | 1 | 0 | 1 | 0 |

The (1) digit of the TDH output is always 0 and requires no output. It will be recalled that the (1) digit of the decimal units digit, on input terminal *e*, is directly connected to output terminal *s*.

The (2) digit of the TDH output is added to the (2) digit of the decimal units digit on input terminal *f* in the adder module comprising relay TDT2. It will be noted from Table XVI above that output digit (2) follows the TDH1 relay. Thus, the input circuit to the adder is from terminal B of the battery over the front point of contact *f* of relay TDH1, which corresponds to an "A0" input described in connection with FIGS. 5*a* and 5*b*. The "no A0" input (see FIGS. 5*a* and 5*b*) is over the back point of contact *f* of relay TDH1.

The output of the adder module comprising relay TDT2 is applied from terminal B of the battery over the front point of contact *a* of relay TDT2 to output terminal *r*.

The (4) digit of the TDH output is added to the (4) digit on input terminal *g* by relay TDT4. It will be seen from Table XVI above that the (4) digit of the TDH output follows relay TDH2. Thus, the input A1 (see FIGS. 5*a* and 5*b*) is applied from terminal B of the battery over the front point of contact *h* of relay TDH2, and the "no A1" input is applied over the back point of contact *h* of relay TDH2.

The output of the adder module comprising relay TDT4 is applied from terminal B of the battery over the front point of contact *b* of relay TDT2 and the front point of contact *a* of relay TDT4 to output terminal *q*, when there is no previous carry. Another output circuit for the TDT4 module, when there is no input to the TDT2 module, includes the back points of contacts *f* and *b* of relays TDH1 and TDT2, respectively, and the front point of contact *a* of relay TDT4. A third output circuit extends from terminal B of the battery over front contact *f* of relay TDH1, the back point of contact *c* of relay TDT2, and the back point of contact *a* of relay TDT4, when there is a previous carry.

The (8) digit of the TDH output is added to the (8) digit appearing on input terminal *h* by relay TDT8. From Table XVI, it appears that the (8) digit matrix is as follows:

$$(8)\text{ matrix}=\left|\begin{matrix}0001\\0011\\0100\\0110\\1001\end{matrix}\right| = 0\left|\begin{matrix}0\left|\begin{matrix}0\\1\end{matrix}\right|0\\[4pt]1\left|\begin{matrix}0\\1\end{matrix}\right|0\end{matrix}\right| + 1001$$

$$(8)=0\left|\begin{matrix}0\text{-}1\\1\text{-}0\end{matrix}\right| + 1001$$

noting that there can never be an input greater than 1001, there is no harm in writing this as $$(8)=0\left|\begin{matrix}0\text{-}1\\1\text{-}0\end{matrix}\right| + \left|1\left|\begin{matrix}0\text{-}1\\1\text{-}1\end{matrix}\right|\right|$$

since the only other permissible 1– – – input, 1000, is still excluded. But the revised matrix obviously condenses into $$(8)=-\left|\begin{matrix}0\text{-}1\\1\text{-}0\end{matrix}\right|$$

The corresponding A2 input is thus applied from terminal B of the battery through an "exclusive-or" circuit comprising contact *f* of relay TDH4 and contacts *g* and *h* of relay TDH1, as shown in FIG. 14*a*.

The output from adder relay TDT8, under one condition of no-previous-carry, is applied from terminal B of the battery over the back point of contact *h* of relay TDH2, the back point of contact *b* of relay TDT4, and the front point of contact *a* of relay TDT8 to output terminal *p* in FIG. 14*b*. One output circuit, when there is a previous-carry, includes the front point of contact *h* of relay TDH2, the back point of contact *c* of relay TDT4, and the back point of contact *a* of relay TDT8. Other obvious output circuits for other conditions may also be traced as desired.

The (16) digit of the TDH output may be directly applied to output terminal *o* when there is no carry from the previous addition, but must be reversed when there is a previous-carry. The no-carry output from the adder module comprising relay TDT8 is from the heel of contact *b* of relay TDT8, and the carry output is from the heel of contact *c* of relay TDT8.

Obviously, from previous considerations, a (16) digit matrix from Table XVI leads to the circuit from the no-carry output to terminal *o*, and a $(\overline{16})$ digit matrix from Table XVI (the collection of 0's on digit (16)), leads to the circuit from the carry output to terminal *o*. In addition, carry and no-carry circuits must be prepared for the next digit input. Taking these items one at a time, the $$(16)\text{ matrix}=\left|\begin{matrix}0010\\0011\\0101\\0110\\1000\\1001\end{matrix}\right| = 0\left|\begin{matrix}01\text{-}\\1\left|\begin{matrix}01\\10\end{matrix}\right|\end{matrix}\right| + 100\text{-}$$

since inputs about 1001 are inhibited, this may be written as $$(16)=0\left|\begin{matrix}01\text{-}\\1\left|\begin{matrix}01\\10\end{matrix}\right|\end{matrix}\right| + 1\text{---}$$

The corresponding circuits are shown in FIG. 14*a*, tracing from the heel of contact *b* of relay TDT8 through rectifier 92, which prevents sneak circuits, and thence over the plurality of paths indicated by the above matrix to terminal *o* in FIG. 14*b*.

The $(\overline{16})$ matrix is, from Table XIII, $$(\overline{16})+\left|\begin{matrix}0000\\0001\\0100\\0111\end{matrix}\right| = 000\text{-} + 01\left|\begin{matrix}00\\11\end{matrix}\right|$$

The corresponding circuits extend from the heel of contact *c* of relay TDT8 to the back point of contact *b* of relay TDH8, the first item in the above matrix, and thence over circuits shown in detail in FIG. 14*a* to terminal *o* in FIG. 14*b*.

With a carry from (8) and a 1 on (16), there will be a 1 on (32) only for inputs $$\left|\begin{matrix}0010\\0011\\1000\\1001\end{matrix}\right| = 001\text{-} + 1\text{---}$$

(for which there is always a 1 on (16)). The first circuit extends from the heel of contact *c* of relay TDT8 over the back point of contact *b* of relay TDH8, the back point of contact *d* of relay TDH4, the front point of contact *e* of relay TDH2, and the back point of contact *b* of relay TDH4 to output terminal *n* in FIG. 14*b*. The second circuit extends from the heel of contact *c* of relay TDT8 over the front point of contact *b* of relay TDH8 and the back point of contact *b* of relay TDH4 (which will be closed for all permissible 1– – – inputs), and thence to output terminal *n*.

With no carry from (8), there will be a 1 on (32) for $$(32)=\left|\begin{matrix}0100\\0101\\0110\end{matrix}\right| = 01\left|\begin{matrix}0\text{-}\\10\end{matrix}\right|$$

Since there are no permissible 11– – inputs, the 0 condition on TDH8 can be ignored, and we can write $$(32)=-1\left|\begin{matrix}0\text{-}\\10\end{matrix}\right|$$

These circuits extend from the heel of contact *b* of relay TDT8 through rectifier 92 and over the front point of contact *c* of relay TDH4, and thence over a first path including the back point of contact *c* of relay TDH2, and a second path including the front point of contact *c* of relay TDH2 and the back point of contact *c* of relay TDH1 to terminal *n* in FIG. 14*b*.

There will always be a 1 on output terminal *m* for TDH inputs $$\left|\begin{matrix}0111\\1000\\1001\end{matrix}\right| = 0111 + 1\text{---}$$

These circuits are shown in FIG. 14*a*, and involve front contacts *a* of relays TDH1, TDH2, TDH4 and TDH8. In addition, there will be a 1 on terminal *m* for $$\left|\begin{matrix}0101\\0110\end{matrix}\right| = 01\left|\begin{matrix}01\\10\end{matrix}\right|$$

if there is a carry from (8). This circuit extends from the heel of contact *c* of relay TDT8 over the back point of contact *b* of relay TDH8, the front point of contact *d* of relay TDH4, thence over a first path including the back point of contact *d* of relay TDH1, the front point of contact *e* of relay TDH2, the front point of contact *b* of relay TDH4, the front point of contact *b* of relay TDH2, and the back point of contact *b* of relay TDH1 to output terminal *m*, and from the front point of contact *d* of relay TDH4 over a second path including the front point of contact *d* of relay TDH1, the back point of contact *d* of relay TDH2, the front point of contact *b* of relay TDH4, and the back point of contact *b* of relay TDH2 to output terminal *m*.

The operation of this embodiment of my invention will be illustrated by the translation of 36.8, *or* 0011 0110 1000 in decimal binary. This input is applied to terminals *a* through *l* by energizing terminals *d, f, g, i* and *j* from terminal B of the battery and leaving the remaining terminals deenergized. With the assumed inputs, relays TDU8, TDH1 and TDH2 will be energized, and the upper coils of relay TDT4 and TDT2 will be energized.

With relay TDH1 energized, the lower coil of relay TDT2 will be energized from terminal B of the battery over the front point of contact *f* of relay TDH1. Relay TDT2 will be released, since both of its coils are energized.

The lower coil of relay TDT4 will be energized over the front point of contact *h* of relay TDH2. With both of its coils energized, relay TDT4 will be released.

With relay TDH4 deenergized and relay TDH1 energized, the lower coil of relay TDT8 will be energized over the back point of contact *f* of relay TDH4 and the front point of contact *h* of relay TDH1, and relay TDT8 will be picked up.

Terminal *m* will now be deenergized, its circuits being interrupted at the open front points of contacts *a* of relays TDH8 and TDH4, and at the open back points of contacts *b* of relays TDH1 and TDH2.

Terminal *n* will be energized over a circuit extending from terminal B of the battery over the front point of contact *h* of relay TDH2, the back point of contact *c* of relay TDT4, the front point of contact *c* of relay TDT8, the back point of contact *b* of relay TDH8, the back point of contact *d* of relay TDH4, the front point of contact *e* of relay TDH2, and the back point of contact *b* of relay TDH4.

Terminals *o* and *p* will be deenergized, all of their previously traced circuits being open at this time.

Terminal *q* will be energized over a circuit extending from terminal B of the battery over the front point of contact *f* of relay TDH1, the back point of contact *c* of relay TDT2, and the back point of contact *a* of relay TDT4.

Terminals *r* and *s* will be deenergized. The circuit for terminal *r* is interrupted at the open front point of contact *a* of relay TDT2, and terminal *s* is directly connected to deenergized input terminal *e*.

Terminal *t* is energized from terminal B of the battery over the front point of contact *a* of relay TDU8. Terminal *u* is energized over a similar circuit extending from terminal B of the battery over front contact *b* of relay TDU8.

Terminals *v* and *w* are deenergized, as will be seen by tracing back from the terminals over their circuits as shown in FIG. 14*b*.

Terminal *x* will be energized over a circuit extending from terminal B of the battery over the back point of contact *e* of relay TDU1 and the front point of contact *d* of relay TDU8.

Terminal *y* will be energized over a circuit extending from terminal B of the battery over front contact *e* of relay TDU8.

Terminal *z* will be deenergized, as will be seen by tracing back over its circuits as shown in FIG. 14*b*.

The output terminals will accordingly be energized in the pattern 0100100.1100110, or decimal 36.796875≅36.8, the applied input.

THE MODIFIED TRANSLATOR

FIGS. 15*a* and 15*b* show a translator similar to that shown in FIGS. 14*a* and 14*b*, except that it has been modified to add binary 1.1 to the output. The unit has also been modified by omitting the *y* and *z* terminal circuits, since the digits corresponding to these terminals are never 1 in the flow computer of my invention, to be described.

The terminal designations are the same in FIGS. 15*a* and 15*b* as the corresponding designations in FIGS. 14*a* and 14*b*, but the relay designations have been changed for reference convenience. However, it will be apparent that relays MH8, MH4, MH2, MH1, MT8, MT4, MT2, MU8, MU4, MU2 and MU1 in FIGS. 15*a* and 15*b* correspond generally to relays TDH8, TDH4, TDH2, TDH1, TDT8, TDT4, TDT2, TDU8, TDU4, TDU2 and TDU1, respectively in FIGS. 14*a* and 14*b*.

An additional relay MT1, in FIG. 15*b*, is provided, because in the modified translator, the 1 binary digit of the units decimal digit can no longer be supplied directly to the output.

The circuits for output terminals *m, n, o, p, q, u, v, w* and *x* in FIGS. 15*a* and 15*b* are the same as the above-described circuits in FIGS. 14*a* and 14*b*, and will not be further described.

As in the previous embodiment, relays MT8, MT4 and MT2 are components of adder modules, the difference being that the circuits controlled by relay MT2 now include provision for previous-carry and no-previous-carry inputs.

The circuits for terminal *t* must be modified to take care of the addition of 0.1. The result of this addition is to give 0 if the output would otherwise be 1, and 1 if the previous output was 0. Thus, from Table XV above, the condition for terminal *t* in terms of the inputs on terminals *a, b, c* and *d* are, $$t\text{ matrix}=\left|\begin{matrix}0000\\ \vdots\\ 0100\end{matrix}\right| = 00\text{--} + 0100$$

$$t=0\left|\begin{matrix}0\text{--}\\100\end{matrix}\right|$$

The corresponding circuits in FIG. 15*b* extend from terminal B of the battery over the back point of contact *a* of relay MU8, and thence over a first path including the back point of contact *a* of relay MU4 to terminal *t*, and over a second path including the front point of contact *a* of relay MU4, and the back points of contacts *a* of relays MU2 and MU1 to terminal *t*. The same circuits serve to provide a no-carry signal to the adder module comprising relay MT1, which appears at the back point of contact *a* of relay MT1. As shown, this back point is directly connected to output terminal *t*.

A carry signal for the adder circuits controlled by relay MT1 is completed when the output given for terminal *t* in Table XV above would be 1. From Table XV, the matrix would be, $$\text{carry matrix}=\begin{vmatrix}0101\\0110\\0111\\1000\\1001\end{vmatrix}$$

Recalling that inputs over 1001 are inhibited, the $$\text{carry matrix}=01\begin{vmatrix}01\\1-\end{vmatrix}+1---$$

The carry signal is applied in parallel to the front point of contact *a* and the back point of contact *c* of relay MT1, over a first circuit from terminal B of the battery including the front point of contact *a* of relay MU8, and a second circuit extending from terminal B of the battery over the back point of contact *a* of relay MU8 and the front point of contact *a* of relay MU4, and thence either over the front point of contact *a* of relay MU2 or the back point of contact *a* of relay MU2 and the front point of contact *a* of relay MU1.

In order to effect the addition of 1 to the digit on terminal *e* in FIG. 15*a*, the circuits of the adder comprising relay MT1 are inverted. That is, a carry output is supplied to the circuits of relay MT2 over the front point of contact *c* of relay MT1, and a no-carry output is supplied, when there is no-previous-carry, from the previously described no-carry circuit to the back point of contact *a* of relay MT1 and over the back point of contact *b* of relay MT1 to the adder module comprising relay MT2. The output to terminal *s* is also inverted, extending over the no-previous-carry lead and the back point of contact *a* of relay MT1, or over the previous-carry lead and the front point of contact *a* of relay MT1, to terminal *s*, to give 1+ the terminal *e* input at terminal *s*.

The circuits for relay MT2 and output terminal *r* comprise a typical general adder module of the type shown in FIGS. 5*a* and 5*b*, and will not be described in detail.

The operation of this embodiment of the translator of my invention is similar to that described for FIGS. 14*a* and 14*b*, except for the modified circuits described in detail above. It will be apparent from this description that the unit will function to provide an output in weighted binary equal to the decimal binary input plus binary 1.1.

The cooperation of this embodiment of my invention with external circuits will appear from the description below of the flow computer of my invention.

THE OUTPUT REGISTER CONTROL

FIG. 16 shows the deails of a unit for properly registering the output in the flow computer of my invention, to be described, to correct for register shifts which were introduced for convenience in other parts of the computer. As shown in FIG. 16, the unit is provided with an input terminal 0D which controls a 0 detector relay 0DR to interrupt all of the output circuits when a 0 factor has been introduced as a multiplier in previous computations. This terminal is energized directly from terminal 0D of the aproximate log generator previously described and shown in FIGS. 9*a* and 9*b*.

The register control further includes two input terminals *a* and *b* which control register shift relays DRSB and DRSA, respectively, in a manner obvious from FIG. 16. These terminals are controlled by the corresponding output terminals *p* and *o*, respectively, of the decimal register shift control of FIGS. 13*d*, 13*e* and 13*f*, previously described. Neither, one (DRSA) or both of these relays is operated in accordance with the magnitude of the inputs to give the appropriate output, as will be described.

The input to the output register control unit further includes 12 terminals *c* through *n*, terminal *c* through *f* repeating the 8, 4, 2 and 1 digits of the decimal units digit in decimal binary code of the input, terminals *g*, *h*, *i* and *j* repeating the corresponding .8, .4, .2 and .1 digits, and terminals *k*, *l*, *m* and *n* repeating the .08, .04, .02 and .01 digits of the input.

The output register control unit is provided with twelve output terminals *o* through *z*. The actual weight of the outputs will depend on the position of the switch M of the range control unit shown in FIG. 13*f* and previously described. The output will be in decimal binary code. Terminals *o*, *p*, *q* and *r* will repeat digits 8000, 4000, 2000 and 1000, respectively, in the high range position of the range switch and 800, 400, 200 and 100 in the low range position with relay SL3160 in FIG. 13*f* deenergized. Similarly, terminals *s*, *t*, *u* and *v* will repeat either 800, 400, 200 and 100, respectively, or 80, 40, 20 and 10, depending on the range switch position. Terminals *w*, *x*, *y* and *z* will have either weights 80, 40, 20 and 10 or 8, 4, 2 and 1, respectively, depending on the position of the range switch. It should be noted that the output register control functions exactly the same in either position of the range switch, and the weights given above pertain only to the significance and not to the values of the digits (0 or 1) on the various output terminals.

The output terminals are each directly energized over the front contact of a corresponding relay as shown in FIG. 16. These relays are TH8, TH4, TH2 and TH1 for terminals *o* through *r*, respectively, HT8, HT4, HT2 and HT1 for terminals *s*, *t*, *u* and *v*, respectively, and TU8, TU4, TU2 and TU1 for terminals *w*, *x*, *y* and *z*, respectively.

If neither relay DRSA or DRSB is energized, the inputs on terminals *c*, *d*, *e* and *f* are applied to relays TH8, TH4, TH2 and TH1, respectively, over back contacts *a*, *b*, *c* and *d* of relay DRSA and back contacts *a*, *b*, *c* and *d* of relay 0DR, respectively, the latter interrupting the circuit if there has been a 0 in the calculation.

Under the same conditions, terminals *g* through *j* are applied to relays HT8, HT4, HT2 and HT1 and terminals *h* through *n* are applied to relays TU8, TU4, TU2 and TU1 over back contacts of all of relays DRSA, DRSB and 0DR in a manner obvious from FIG. 16.

With relay DRSA energized and relay DRSB released, the inputs on terminals *c* through *f* are applied to the HT relays, the inputs on terminals *g* through *j* are applied to the TU relays, and the inputs on terminals *k* through *n* are discarded, in a manner obvious from FIG. 16.

With both relays DRSA and DRSB energized, inputs on terminals *c* through *f* are applied to the TU relays and all of the remaining input digits are discarded. It will be apparent that the unit thus performs the readout operation in accordance with Table XVII below, in which X, Y and Z are used to indicate the corresponding decimal digits of the binary decimal inputs and outputs.

The operation of this component in cooperation with the other components of the flow computer of my invention will hereinafter appear.

*Table XVII*

| Input | DRSA | DRSB | Output—SL3160 | |
|---|---|---|---|---|
| | | | Down | Up |
| X.YZ | Down | Down | XYZ or XYZO | |
| X.YZ | Up | Down | OXY or OXYO | |
| X.YZ | Up | Up | OOX or OOXO | |

THE UTILIZATION DEVICE

FIG. 17 shows a typical utilization device for the flow computer of my invention, to be described. As will be apparent to those skilled in the art, the output of my computer is applicable to any type of indicator or to any control device which can accept a digital input. However, for purposes of illustration I have shown an indicator for registering the computer output in decimal binary code by means of a plurality of indicator lamps.

The operation of the utilization device should be relatively obvious from FIG. 17. Indicating arms S1, S2 and S3 are assumed to be moved to a position to the left as shown to indicate the output in thousands, hundreds and tens, or to be moved to the right to indicate the output in hundreds, tens and units, and it is assumed that this movement is in accordance with the position of switch M of the range control of FIG. 13*c*.

The inputs in decimal binary code are supplied to terminals *a* through *l* of the utilization device, and, with the indicating arms S in the positions shown, the relative weights of the inputs to terminals *a* through *l* would be 8000, 4000, 2000, 1000, 800, 400, 200, 100, 80, 40, 20, and 10, respectively. These inputs control indicating lamps L800, L400, L200, L100, L80, L40, L20, L10, L8, L4, L2 and L1, respectively, in a manner obvious from FIG. 17.

THE FLOW COMPUTER

FIGS. 19*a* through 19*g*, when arranged as shown in FIG. 18, form a wiring diagram showing the manner in which the various modules previously described may be connected to form a flow computer in accordance with one specific embodiment of my invention.

Figure 19G:
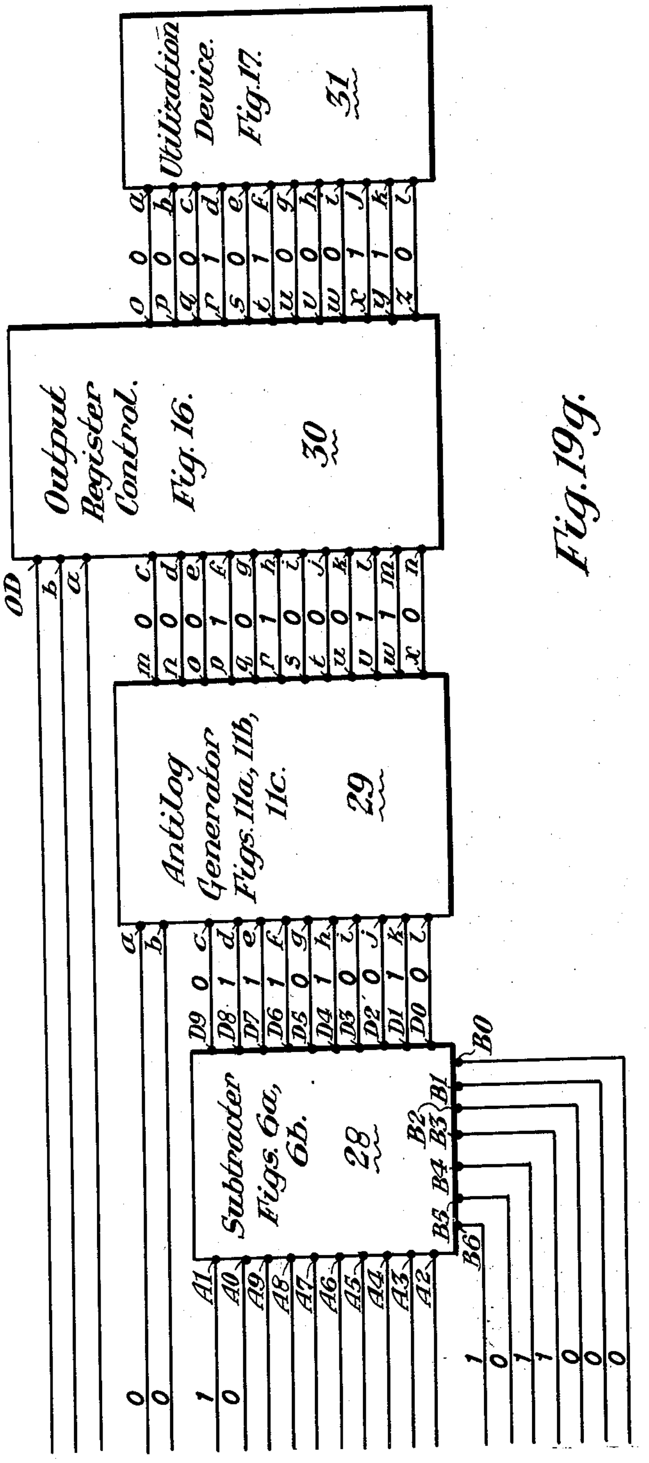
Figure 19A:
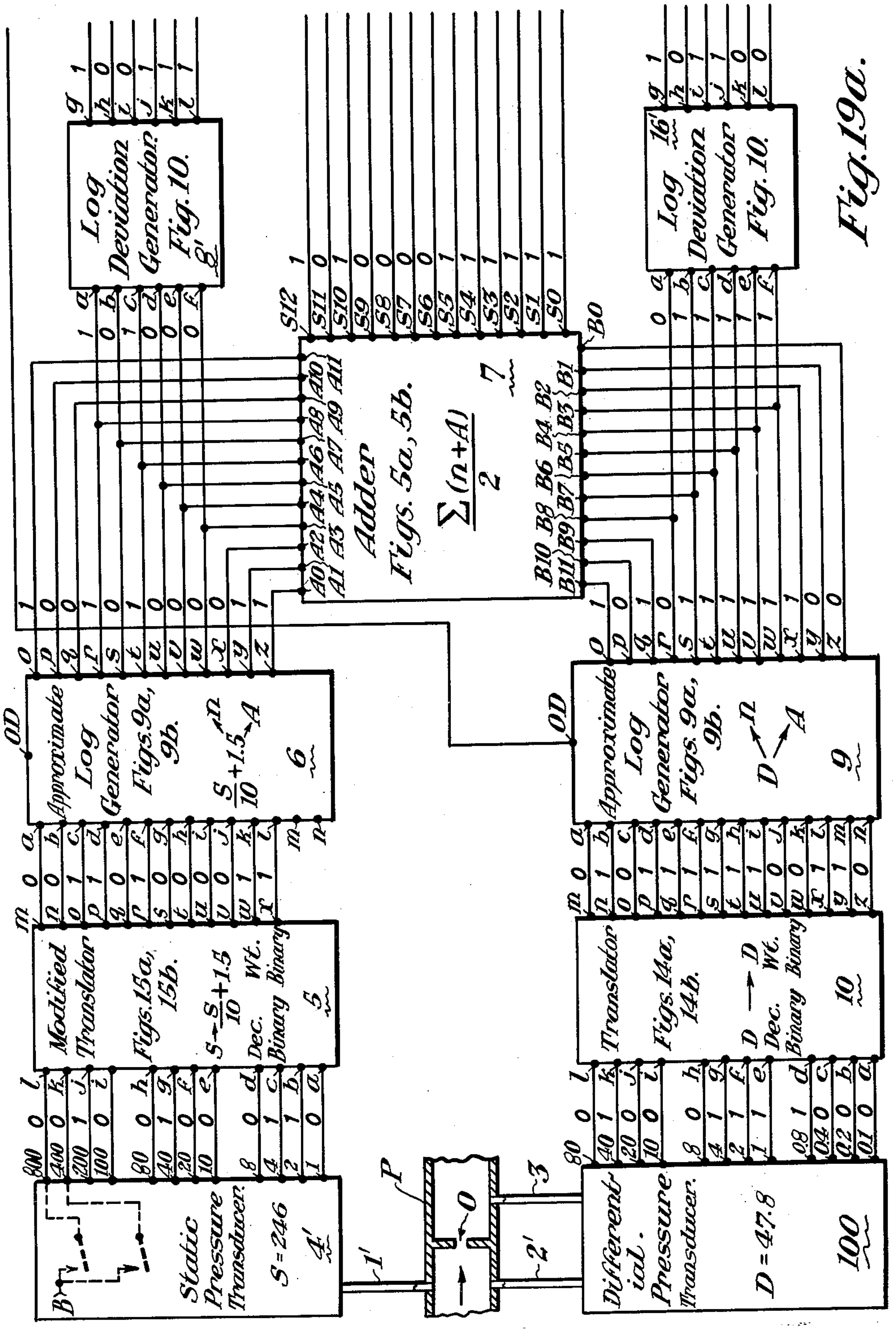

Referring now to FIG. 19*a*, I have shown a segment of a pipe line P through which fluid is assumed to be flowing in the direction of the arrow at a rate Q′, which may, for example, be measured in millions of cubic feet per day. It is assumed that up to seven additional similar pipes, in the illustrated embodiment of my invention, can be connected in parallel with pipe P so that the total flow Q will be an even multiple of the flow Q′ through pipe P.

As shown, pipe P is provided with an orifice plate having an orifice 0. The pressure drop across the orifice is measured by connections made to taps 2′ and 3, and static pressure is measured by means of a tap 1′ upstream from the orifice. The total flow Q is to be computed by means of the equation $$Q=CN\sqrt{D(S+15)}$$

where S is the static pressure, in p.s.i.g., and S+15 is the absolute static pressure, in p.s.i.a., D is the differential pressure, in p.s.i., N is the number of pipes in parallel, and C is an orifice coefficient associated with the orifice 0 and including the appropriate unit conversion factors to give Q in millions of cubic feet per day. The apparatus for evaulating the above flow equation will now be described in detail.

As shown in FIG. 19*a*, a static pressure transducer 4′ is connected to pipe 1′ to produce an output signal in decimal binary code in accordance with the measured static pressure. The details of such a transducer do not form a part of my invention, and are accordingly not shown, but any number of well-known forms of transducers could be employed. For example, a Bourdon tube connected to tap 1′ could be mounted to rotate a shaft carrying a commutator on which patterned segments are mounted in a manner known to the art to successively close contacts of the type schematically indicated by dotted lines in unit 4′ to produce a decimal binary output in accordance with the shaft angle and thus in accordance with the pressure. Regardless, however, of the form which the static pressure transducer may take, it is sufficient for present purposes to note that it provides an output in decimal binary code, in which the individual digits have the weights shown immediately adjacent the output terminals of transducer 4′. As shown, these leads provide a first, or hundreds digit on leads having relative weights 800, 400, 200 and 100, a second, or tens digit on output leads having weights 80, 40, 20 and 10, and a third, or units, digit on output leads having weights 8, 4, 2 and 1.

The differential pressure D in the above formula is provided by a second transducer 100, which may be of any conventional type, and in practice will generally be of the same type as that used for static pressure transducer 4′. In the illustrated embodiment, this unit is assumed to provide an output in decimal binary code on a first set of leads weighted 80, 40, 20 and 10 for the tens digit, 8, 4, 2 and 1 for the units digit, and 0.8, 0.4, 0.2 and 0.1 for the tenths digit, and is thus adapted to read out a differential pressure between 0 and 99.9.

Figure 19B:
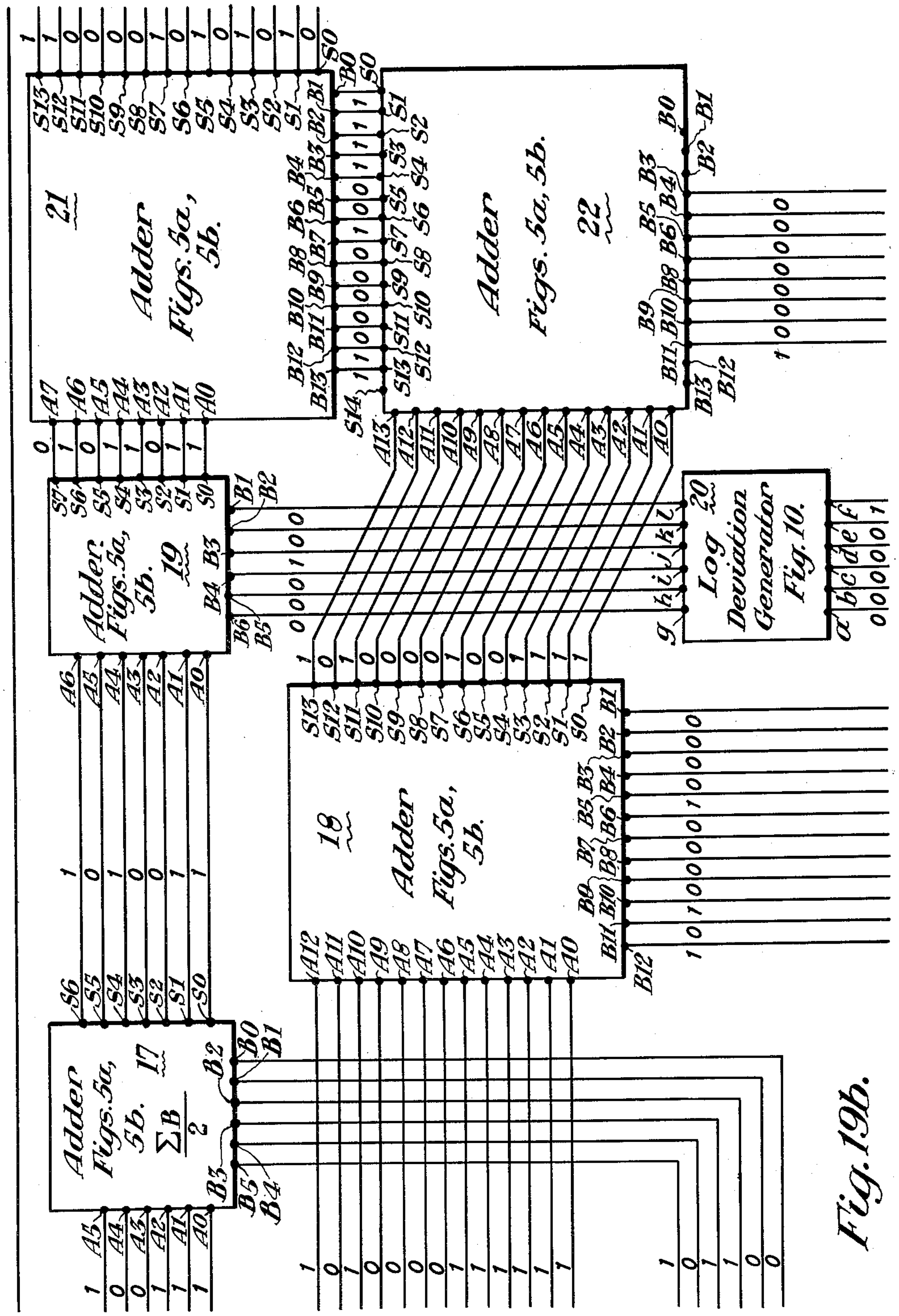
Figure 19C:
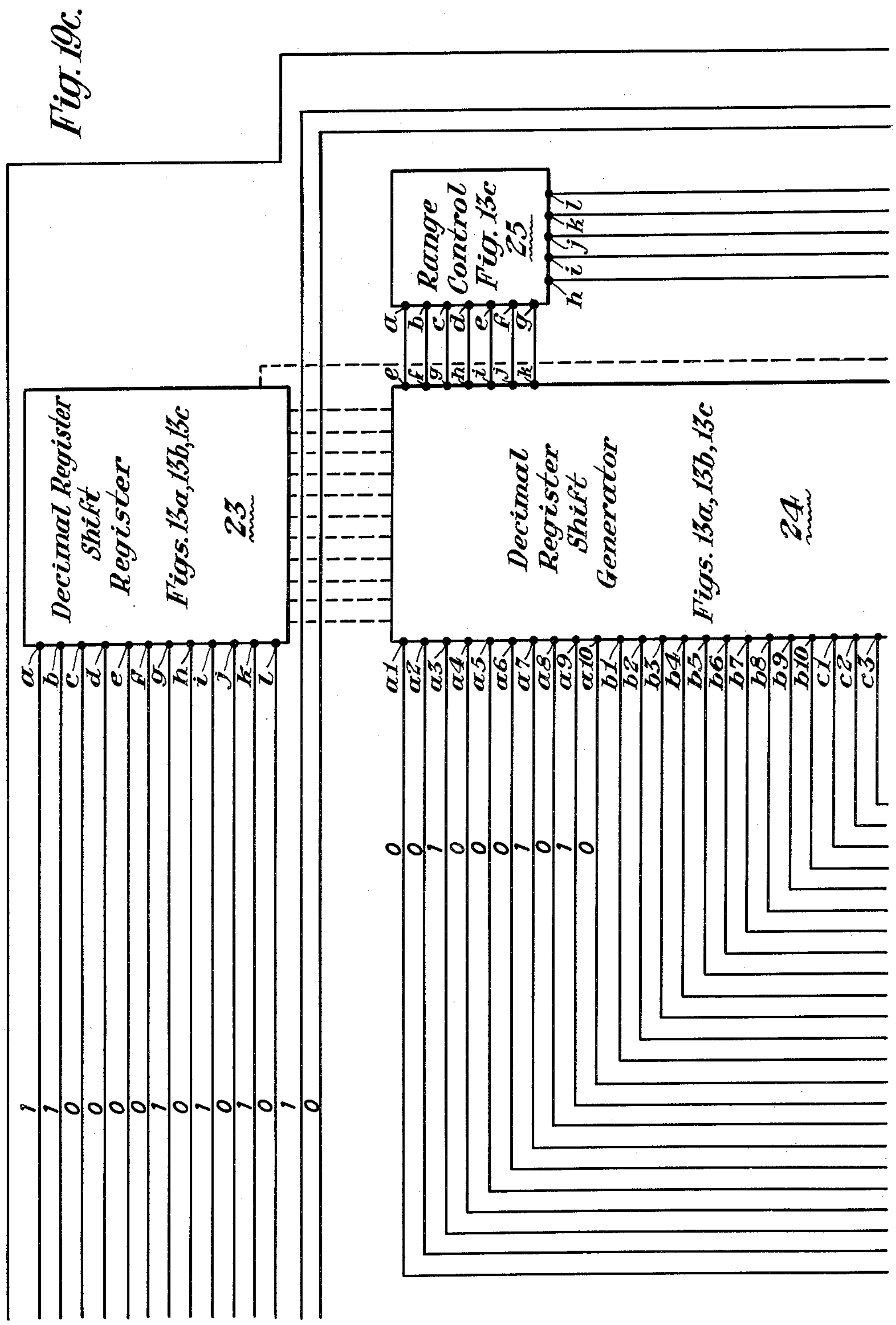
Figure 19D:
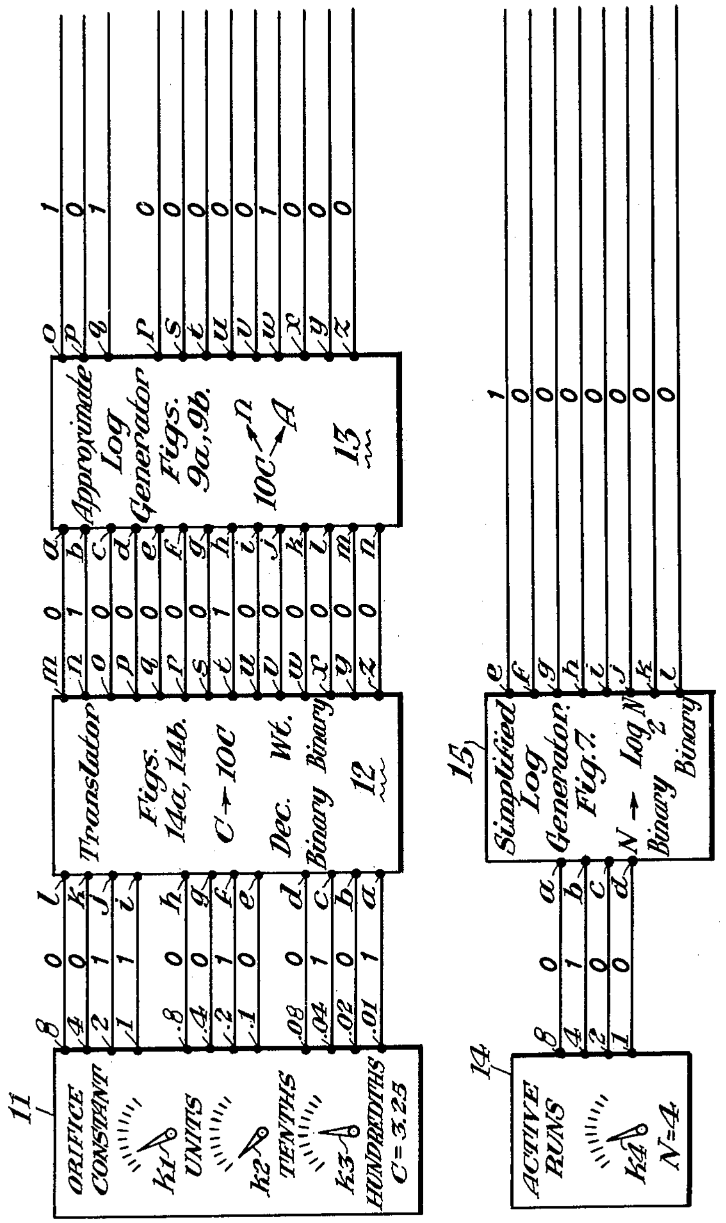

Referring now to FIG. 19*d*, the orifice constant C in the above equation is provided by means of a unit schematically indicated at 11 which may be any suitable means for applying a decimal binary code on twelve output leads, here shown having the relative weights 8, 4, 2 and 1 for the units digit, 0.8, 0.4, 0.2 and 0.1 for the tenths digit, and .08, .04, .02 and .01 for the hundredths digit. As schematically indicated, this code could be generated by three knobs K1, K2 and K3 manually moved over a scale in accordance with the orifice constant for the particular orifice which had been observed as the result of tests. These knobs could control switches, not shown, in a conventional manner which will be understood in the art, to provide the appropriate decimal binary output for each knob setting. As will later appear, under some conditions it is desirable to handle an abnormally high value of the orifice constant, and it is under these circumstances that the aforementioned range control switch M will be actuated to pick up the previously described relay SL3160. It should be understood that when this is done, the orifice constant is to be read in units, tenths and hundredths, as shown. When relay SL3160 is unoperated, the output should be read in tenths, hundredths and thousandths.

As shown in FIG. 19*d*, a unit schematically indicated at 14 is adapted to provide a binary code from 1 to 8 in accordance with the number of active runs; that is, in accordance with the number of pipes connected in parallel as described above. While the details of this unit do not form a part of my invention, this code could obviously be provided by a knob K4 manually movable over a scale as shown, and connected in a conventional manner through switches, not shown, to energize appropriate ones of the output leads shown to provide the proper binary code input to the computer.

Referring again to FIG. 19*a*, the outputs of static pressure transducer 4′ and differential pressure transducer 100 are each applied to translators. The output of transducer 4′ is applied to terminals *a* through *l* of a modified translator 5 of the type shown in FIGS. 15*a* and 15*b* and previously described. The output of differential pressure transducer 100 is applied as shown to input terminals *a* through *l* of a translator 10 of the type shown in FIGS. 14*a* and 14*b* and previously described. Referring to FIG. 19*d*, the output of orifice constant unit 11 is applied to terminals *a* through *l* of a translator 12 of the type shown in FIGS. 14*a* and 14*b*. The terminal designations on these and other units shown in FIGS. 19*a* through 19*g* will be found to coincide with the terminal designations given in the detailed drawings referred to in each block. Accordingly, no discussion of the internal circuitry of the blocks will be given here, but reference is made for this purpose to the detailed description above.

As shown in FIGS. 19*a* and 19*d*, the output of modified translator 5, and translators 10 and 12, are applied to approximate log generators 6, 9 and 13, respectively. As shown in FIG. 19*a*, the output of modified translator 5 appearing on terminals *m* through *x* is applied to input terminals $a$ through $l$ of an approximate log generator 6 As described above, and indicated schematically in the drawing, the output of unit 5 is a weighted binary code in accordance with the decimal binary input. Since transducer 4' reads in hundreds, tens and units, and unit 5 treats all inputs as though they read in tens, units and tenths, the output of unit 5 is the binary equivalent of decimal $S/10+1.5$.

This output is applied to terminals $a$ through $l$ of an approximate log generator 6, terminals $n$ and $m$ not being used because they would not be energized for any of the permissible inputs. In accordance with the above discussion, output terminals $o$, $p$ and $q$ of approximate log generator 6 read the characteristic $n$ of the logarithm of the input and terminals $r$ through $z$ provide the binary component A of the input. The 0 detector terminal 0D of unit 6 is not used.

As indicated in FIG. 19$a$, since the differential pressure transducer reads in tens, units and tenths, translator 10 will merely translate its input to an output on its leads $m$ through $z$ equivalent to the weighted binary value of the decimal binary input. This input is applied to terminals $a$ through $n$ of an approximate log generator 9 and produces an output on its terminals $o$, $p$ and $q$ in accordance with the characteristic $n$ of the logarithm of the input. Terminals $r$ through $z$ provide the binary equivalent of component A of the input.

The 0 detector terminal 0D of unit 9 is connected to input terminal 0D of the output register control 30 in FIG. 19$g$, to interrupt the output in the manner previously described when the differential pressure input is 0. This prevents the unit from giving a false output.

Referring now to FIG. 19$d$, the orifice constant output from unit 11 will be in either units, tenths and hundredths, as shown, or in tenths, hundredths and thousandths, respectively, if the range control is not operated. Accordingly, with the range control and previously described relay SL3160 operated, the translator 12 will produce an output on its terminals $m$ through $z$ in accordance with ten times the value of the input. If the range control was not operated, the output would be in accordance with one hundred times the input. The extraneous factors thus introduced are inserted for convenience, and are later removed, as will appear.

The output of translator 12 is applied to input terminals $a$ through $n$ of an approximate log generator 13, as shown. Unit 13 provides the characteristic $n$ of the input on its output terminals $o$, $p$ and $q$ and the binary component A on its output terminals $r$ through $z$.

Further referring to FIG. 19$d$, the output of the runs generator 14 is applied to terminals $a$ through $d$ of a simplified log generator 15 of the type described in connection with FIG. 7. This unit produces a binary output on its terminals $e$ through $l$ in accordance with the log to the base 2 of the input, recalling that the ⅛ position is always 0 and is not represented by a terminal.

Referring now to FIG. 19$a$, the outputs of approximate log generators 6 and 9 are applied to an adder 7 which may be of the form shown in FIGS. 5$a$ and 5$b$. As remarked above, the operation of this unit is independent of the location of the binary point. However, since both D and $(S+15)$ appear under the radical in the flow equation, it is necessary to divide their logarithms by 2 in order to get the logarithm of the square root. This is actually done in the output wiring of adder 7 by connecting it to the next unit with its wiring register shifted one digit down. That is, if the inputs were, for example, 1.0 giving a sum 10.0 the output would be wired to the next input as if it read 1.00. Thus, the actual square root operation is carried out without the use of any apparatus whatsoever.

The output of approximate log generator 13 in FIG. 19$d$ is connected, as shown in FIGS. 19$d$, 19$e$ and 19$b$, to one input of a second adder 18. The other input of the adder is provided from adder 7 in FIG. 19$a$. As shown, the output of adder 7 has one more active digit than the output of approximate log generator 13 (because of the register shift just described). Thus, in comparing the adder shown in FIGS. 5$a$ and 5$b$ with adder 18 in FIG. 19$b$, the input terminals should be numbered as shown in FIG. 19$b$ with no input wiring to the B0 input, which will always be 0.

The first six mantissa digits of approximate log generators 6 and 9 are applied to input terminals $a$ through $f$ of log deviation generators 8' and 16', as shown in FIG. 19$a$. The outputs on terminals $g$ through $l$ of these units are, as described in connection with FIG. 10, equal to the fourth, fifth, sixth, seventh, eighth and ninth fractional binary digits of the deviation correction factors B of the inputs.

These deviation factors from units 8' and 16' are applied to the inputs of an adder 17 as shown in FIG. 19$b$. Since these deviation factors are part of the logarithms of S and D, which both appear under the radical sign in the flow equation, the output of adder 17 is register shifted to the input of adder 19 in the manner previously described to effectively divide the sum by 2 and perform the square root operation.

The output of approximate log generator 13 in FIG. 19$d$, appearing on terminals $r$ through $w$ corresponding to the first six digits of the factor A, is applied as shown in FIGS. 19$d$, 19$e$ and 19$b$ to input terminals $a$ through $f$ of a log deviation generator 20 of the type shown in FIG. 10.

The output appearing on terminals $g$ through $l$ of log deviation generator 20, corresponding to the deviation factor B of the logarithm of the orifice constant, is applied to the input terminals B1 through B6 of an adder 19 as shown in FIG. 19$b$. Terminals A0 through A6 of adder 19 are supplied from terminals S0 through S6 of adder 17 as shown. Again, the output of adder 17 carries one more fractional bit than the output of deviation generator 20 because of the register shift to account for the square root.

The outputs of adder 18 in FIG. 19$b$ and simplified log generator 15 in FIG. 19$d$ are supplied to an adder 22 as shown in FIG. 19$b$. The inputs are registered to the adder inputs as shown; note that there is no B7 terminal shown because this digit is always 0.

The outputs of adders 19 and 22 are applied to an adder 21 as shown in FIG. 19$b$. The output of this adder now equals the logarithm of the desired flow plus an extraneous factor of a logarithm of the fractional power of 10 which was introduced in the translators. The remaining apparatus to be described removes this extraneous factor and generates the anti-logarithm of the output.

Referring now to FIGS. 19$b$ and 19$c$, the output of adder 21 is applied to input terminals $a$ through $l$ of a decimal shift register 23, except output terminals S1 and S0 are directly connected to a subtracter 28 in FIG. 19$g$, as will later be described, because these last two digit positions are not needed to properly register-shift the input.

Referring now to FIGS. 19$c$ and 19$f$, the decimal register shift apparatus comprising decimal register shift register 23, decimal register shift generator 24, decimal register shift control 26, and range control 25 are interconnected and function in a manner described in detail above. Decimal register shift control 26 now provides outputs on its terminals $d$ and $e$ in accordance with the 2 and 1 digits of the characteristic $n$ of the logarithm of the output, and terminals $f$ through $m$ provide the binary characteristic $A+B$ of the logarithm of the output Q. Terminals $o$ and $p$ of decimal register shift control 26 supply outputs to terminals $b$ and $a$ of output register control 30 to control relays DRSA and DRSB in the manner previously described in detail.

The first six digits appearing on leads $f$ through $k$ of decimal register shift control 26 are applied to input terminals $a$ through $f$ of an anti-log deviation generator 27 of the type shown in FIGS. 12*a* and 12*b*. The output on terminals *g* through *m* of unit 27 provides the deviation factor B to be subtracted from $A+B$ as a step in the generation of the anti-logarithm.

The outputs of decimal register shift control 26 and anti-log deviation generator 27 in FIG. 19*b* are applied to the inputs of a subtracter 28, as shown in FIG. 19*g*. The subtracter obtains its last two digits of the minuend, A0 and A1, from output terminals S0 and S1 of adder 21 in FIG. 19*b* as previously described. The characteristic of the logarithm is not required at the subtracter because the mantissa appearing on leads A0 through A9 is always larger than the deviation factor B appearing as the subtrahend on leads B0 through B6.

The output of subtractor 28 appearing on leads D0 through D9 is applied to input terminals *l, k, j, i, h, g, f, e, d* and *c*, respectively, of an anti-log generator 29 of the type shown in FIGS. 11*a*, 11*b* and 11*c*. The characteristic *n* of the logarithm is supplied to terminals *a* and *b* of the anti-log generator from terminals *d* and *e*, respectively, of the decimal register shift control 26, as shown.

As previously described, the output appearing on terminals *m* through *x* of anti-log generator 29 is applied to terminals *c* through *n* of an output register control 30. This unit functions as described in connection with FIG. 16 to properly register the output in accordance with DRSA and DRSB relay inputs on terminals *b* and *a*, and to provide a 0 output when a 0 detection terminal 0D is energized. Register control 30 will accordingly provide an output in decimal binary code in which the first, first and second, or first, second and third digits of the input are retained in accordance with the operated condition of relays DRSA and DRSB. With range control switch M in FIG. 13*c* in the position shown, terminals *o, p, q* and *r* of unit 30 are read 800, 400, 200 and 100, terminals *r, s, t* and *u* are read 80, 40, 20 and 10, respectively, and terminals *w, x, y* and *z* are read 8, 4, 2 and 1, respectively. With range control switch M in its other position, with relay SL3160 energized, these output terminals read ten times the previous values as described above.

The output of register control 30 appearing on terminals *o* through *z* is applied to input terminals *a* through *l* of utilization device 31 as exemplified by FIG. 17. This utilization device may be either an indicator or a control device responsive to the value of flow to control any desired condition.

The operation of this embodiment of my invention will best be understood in terms of a suitable actual example.

For this purpose, a set of inputs will be assumed, and the operation of the system to compute the value of the flow Q from the assumed inputs will be described.

In order that the operation of the equipment for the example to be considered may readily be followed, I have shown on FIGS. 19*a* through 19*g* typical values of the inputs and outputs for each of the units.

As shown in FIG. 19*a*, it is assumed for the example to be considered that the static pressure is 246 p.s.i.g. and the differential pressure is 47.8 p.s.i. It will be assumed that the range control switch M has been actuated to the position in which relay SL3160 is operated. Accordingly, referring now to FIG. 19*d*, orifice constant unit 11 will read as shown in units, tenths and hundredths, and it is assumed that the value of C is 3.25. It is assumed that there are three pipes in parallel with pipe P, so that the value of N is 4.

As shown in FIG. 19*a*, the output on pressure transducer 4′ in response to a pressure of 246 p.s.i.g. is, reading downward, 0010 (decimal binary 200), 0100 (decimal binary 40) and 0110 (decimal binary 6). For reasons noted above, translator 5 will read this as 24.6. Terminals *l* through *a*, respectively, of translator 5 will be energized in the pattern 001001000110. The output will be the binary equivalent of 24.6+1.5, or decimal 26.1. As shown, this value, reading downward from output terminal *m* to output terminal *x*, will be 0011010.00011, and the output will be applied to input terminals *a* through *l* of approximate log generator 6. By the reasoning given in detail above, the value of *n* for this input will be decimal 4 or binary 100 which now appears on terminals *o, p* and *q*, respectively, of log generator 6. The part A of the input is now .101000011, which appears on output terminals *r* through *z*.

Referring now to translator 10, the output of differential pressure transducer 100 is decimal binary 47.8 or 0100 0111 1000. The binary equivalent of this input, or 0101111.1100110, appears on output terminals *m* through *z* of unit 10. As will be appreciated from the above considerations, the characteristic *n* of this output is decimal 5 or 101. This value accordingly appears on output terminals *o, p* and *q* of approximate log generator 9. The approximate mantissa A is now .011111100110. The last three digits of this mantissa are discarded, since they will not affect the accuracy within the over-all accuracy of the equipment, and the first nine digits appear on terminals *r* through *z* of approximate log generator 9.

The factors $n+A$ of log generators 6 and 9 are now added in adder 7. The addition is mathematically as follows:

```
 100.101000011
 101.011111100
1010.000111111
```

However, since the output of adder 7 is register shifted to take care of the square root, the output on terminals S12 through S0 of adder 7 should be read 101.0000111111.

The first six digits of factor A from unit 6 are 101000. In accordance with the description above, the corresponding deviation factor B is .000100111. Since the first three digits are always 0, the output of log deviation generator 8′ is 100111.

The first six digits of the factor A from unit 9 are 011111. The corresponding deviation is .000101100. Log deviation generator 16′ accordingly reads the last six digits of this factor, 101100, on terminals *g* through *l*.

Adder 17 in FIG. 19*b* adds the outputs of log deviation generators 8′ and 16′. Mathematically, this addition is as follows:

```
.000100111
.000101100
.001010011
```

However, since the output is to be register-shifted, this should now be read .0001010011. Since the first three digits of this sum will always be 0, the output of adder 17 reads 1010011.

The output of translator 12 in FIG. 19*d* is the binary equivalent of decimal 32.5, or 100000.1000000. The characteristic *n* of this number is decimal 5, or 101 in binary code. The partial mantissa A is .000001000. Accordingly, the output on leads *o* through *z* of log generator 13 in FIG. 19*d* is 101.000001000.

The outputs of added 7 in FIG. 19*a* and approximate log generator 13 in FIG. 19*d* are added in adder 18 in FIG. 19*b*. This addition is mathematically as follows:

```
 101.0000111111
 101.0000010000
1010.0001001111
```

This is accordingly the output appearing on terminals S13 through S0 of adder 18 and applied to the input of adder 22.

Referring now to FIG. 19*d*, for runs equal 4, the output of active runs generator 14 is 0100, and the corresponding log to the base 2 is 10.0000000. The latter number accordingly appears on the output terminals of simplified log generator 15, with the exception that the ⅛ position is always 0 and is accordingly not circuited.

The outputs of adder 18 in FIG. 19*b* and simplified log generator 15 in FIG. 19*d* are added in adder 22. Mathematically, this addition is as follows:

$$\begin{array}{r} 1010.0001001111 \\ 10.0000000 \\ \hline 1100.0001001111 \end{array}$$

This output accordingly appears on terminals S13 through S0 of adder 22.

Figure 19E:
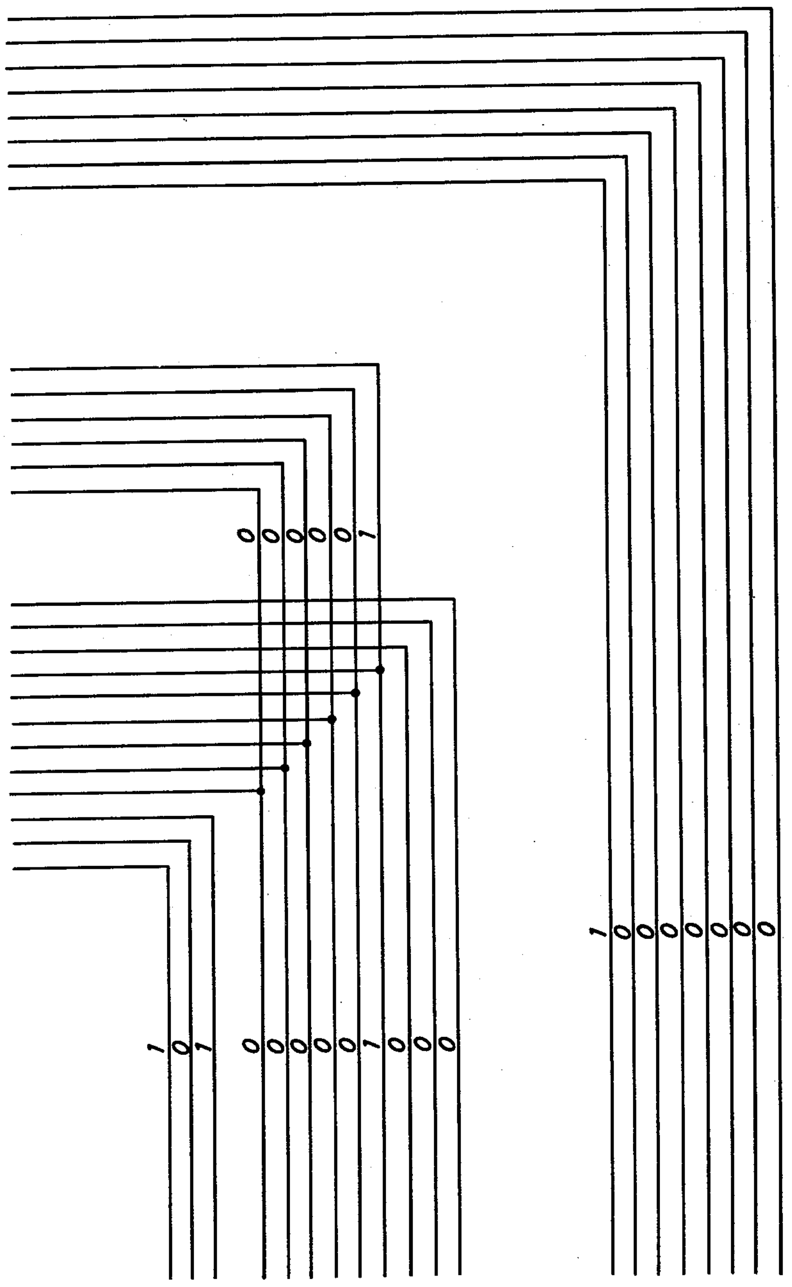
Figure 19F:
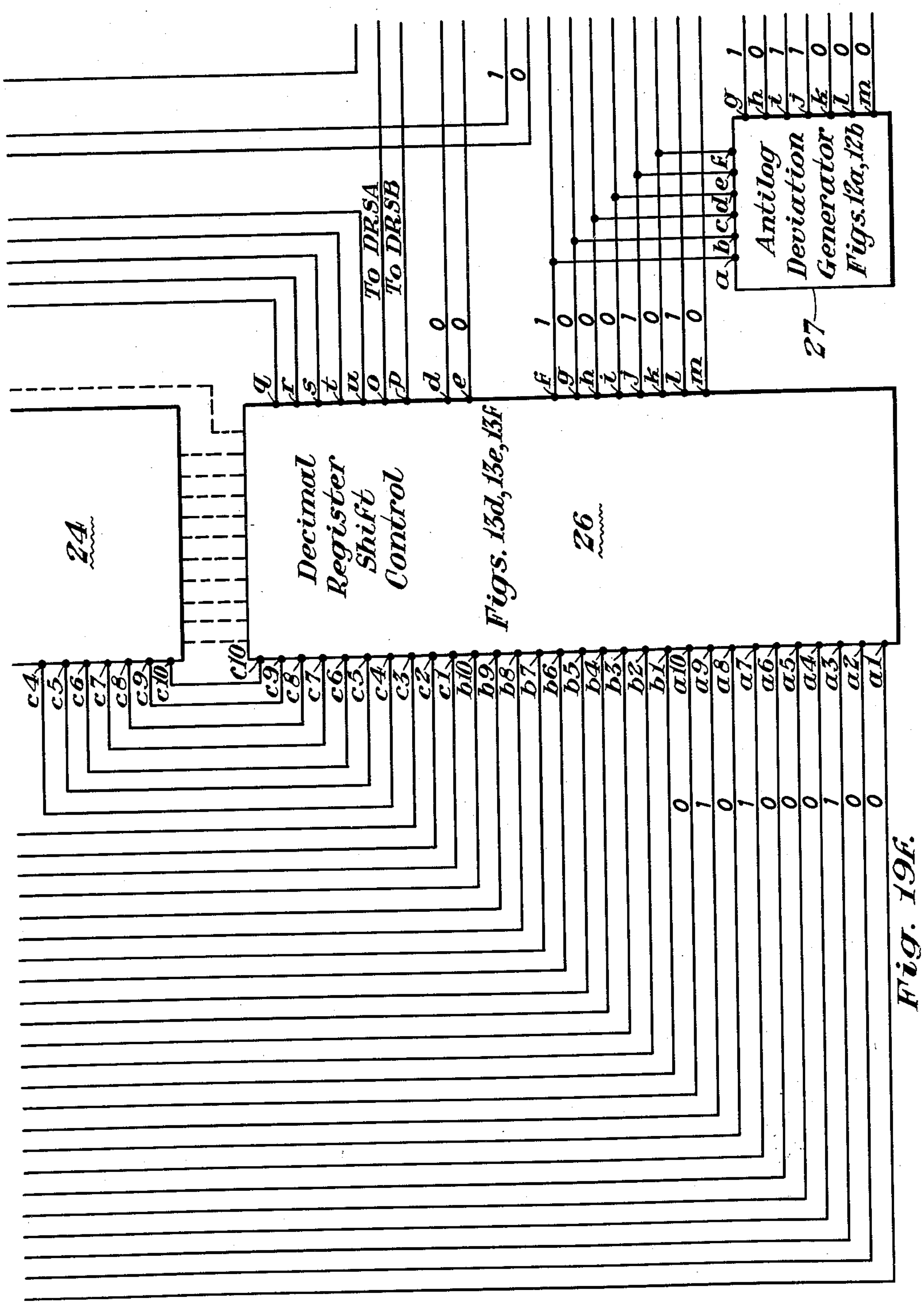

As shown in FIGS. 19*d*, 19*e* and 19*b*, the first six digits of the fractional output A of approximate log generator 13 in FIG. 19*d* are applied to log deviation generator 20 in FIG. 19*b*. Since the first six digits of A in this case are .000001, the corresponding deviation factor B is .000000100, and the output of log deviation generator 20, which is the last six digits of this factor, is .000100.

The outputs of adder 17 in FIG. 19*b* and of log deviation generator 20 in FIG. 19*b* are added in adder 19. Mathematically, this addition is as follows:

$$\begin{array}{r} .000000100 \\ .0001010011 \\ \hline .0001011011 \end{array}$$

Since at the most the last eight digits of this sum can be other than 0, only these eight digits appear at the output of adder 19 as .01011011.

The outputs of adder 19 and adder 22 are added in adder 21 in FIG. 19. Matematically, this addition is as follows:

$$\begin{array}{r} .0001011011 \\ 1100.0001001111 \\ \hline 1100.0010101010 \end{array}$$

Accordingly, this sum appears at the output of adder 21.

The next step is to provide the appropriate register shift for the output. First, as indicated above, it is assumed that relay SL3160 is operated. From the above description of the register shift equipment, it will be apparent that relay SL3 will be operated, and the *a* group of outputs of decimal register shift generator 24 will be selected to subtract the binary log of 10 to the 3½ power from the input. This subtraction is mathematically as follows:

$$\begin{array}{r} 1100.00101010 \\ 1011.10100000 \\ \hline 0000.10001010 \end{array}$$

Accordingly, the output appearing on leads *a*1 through *a*10 in FIG. 19*c* is 00.10001010. This output is applied as an input to register shift control 26 in FIG. 19*f*, and thence applied as an output to leads *d*, *e* and *f* through *m*, respectively, of unit 26, with the *b* group and *c* group information being discarded as described above.

Under the assumed conditions, and referring for details to the above description of the register shift equipment, neither of the circuits for relays DRSA and DRSB will be energized and terminals *o* and *p* of register shift control 26 will accordingly be deenergized.

The output on terminals *f* through *m* of register shift control 26 now corresponds to the mantissa of the logarithm of the required flow Q. The deviation correction factor B must now be found and subtracted from the mantissa. For this purpose, the first six digits of the mantissa appearing on terminals *f* through *k* of unit 26 are applied to anti-log deviation generator 27. Since these six digits are .100010, the corresponding deviation is .0001011000. The last seven digits of this correction factor, or .1011000, appear on terminals *g* through *m* of anti-log deviation generator 27.

The deviation factor B just generated is now subtracted from the mantissa in subtracter 28. For this purpose, the last two digits of the mantissa are applied to terminals A0 and A1 of subtracter 28 from terminals S0 and S1 of adder 21 of FIG. 19*b*. Mathematically, the operation of subtracter 28 is now as follows:

$$\begin{array}{r} .1000101010 \\ .0001011000 \\ \hline .0111010010 \end{array}$$

This output, as shown in FIG 19*g*, now appears at the output of subtracter 28.

The factor A from subtracter 28 is now $$A = .0111010010$$

The corresponding factor $1+A$ is then 1.0111010010. The characteristic *n*, appearing on terminals *a* and *b* of anti-log generator 29 from terminals *d* and *e* of decimal register shift control 26, is 00. Accordingly, the antilogarithm is simply $1+A$, given above, which in decimal form is approximately 1.455. The decimal binary equivalent of 1.455, or approximately 1.46, now appears on output leads *m* through *x* of anti-log generator 29 as 0001 0100 0110.

Since neither the 0 detector relay ODR nor the DRSA and DRSB relays in output register control 30 are operated in this example, the output of this unit will appear in the same form as the input, as shown in FIG. 19*g*. Utilization device 31 of FIG. 17 will now operate, and, the range control being in the position stated, the output should be interpreted as 1,460 million cubic feet per day. This value can be verified readily on the slide rule by carrying out the following indicated calculation.

$$Q=3.25\times 4\sqrt{47.8\ (246+15)}$$

It is believed that the operation of the flow computer of my invention under various conditions will be obvious from the above consideration of its operation under one typical condition, in view of the detailed discussion given of the operation of the various units which make it up.

Further, it will appear to those skilled in the art that the computer units of my invention may be variously modified and combined as suggested by the requirements of actual problems encountered in practice and, in particular, that they may be so combined as to carry out any computation amenable to the ordinary calculation techniques using multiplication, addition, division and various logarithmic processes involving multiplication, division, addition and subtraction. It will be apparent that I have described adders, subtracters, logarithm and anti-logarithm generators, code translation devices and register control devices that can be readily manufactured and produced in packaged modules with attendant economies in manufacture.

While I have described various embodiments of my invention in detail, many modifications will be suggested to those skilled in the art by the above description, and accordingly, I do not wish to be limited to the details shown, but only by the scope of the following claims.

Having thus described my invention, what I claim is:

1. A flow computer for computing fluid flow in accordance with the equation $Q=C\sqrt{DS}$, where Q is the rate of flow, D is the differential pressure across an orifice in a conduit in which the fluid is flowing, S is the static pressure in the conduit, and C is an orifice coefficient, comprising, in combination, first, second and third logarithm generators for producing outputs in accordance with the logarithms of an applied input signal, means for applying a signal in accordance with C to said first logarithm generator, means for applying a signal in accordance with D to said second logarithm generator, means for applying a signal in accordance with S to said third logarithm generator, first adder means controlled by the outputs of said second and third logarithm generators for producing an output in accordance with one-half the sum of their outputs, second adder means controlled by said first adder means and said first logarithm generator for producing an output in accordance with the sum of their outputs, an anti-logarithm generator for producing an output in accordance with the anti-logarithm of an applied input, and means connecting the output of said second adder to control said anti-logarithm generator, whereby the output of said anti-logarithm generator varies in accordance with Q.

2. A logarithm generator, comprising, in combination, means controlled by a binary code input for producing a first binary code sequence in accordance with the highest ordered 1 in said input, means controlled by said input for producing a second binary code sequence in accordance with the code sequence of said input of lower order than the highest ordered 1, means controlled by said second sequence for producing a third binary code sequence in accordance with the difference between said second sequence and the mantissa of the logarithm to the base 2 of the input, and means for adding said first, second and third sequences to produce a fourth sequence in accordance with the binary logarithm to the base 2 of the input.

3. A logarithm generator, comprising, in combination, a plurality of relays, means for energizing said relays in a weighted binary code combination, a plurality of output terminals, and means controlled by said relays for energizing said output terminals in a binary code sequence in accordance with the logarithm to the base 2 of the code combination in which said relays are energized.

4. A logarithm generator, comprising, in combination, first means controlled by the integral digit of an applied binary code signal sequence for generating a first signal in accordance with the binary order of magnitude thereof and second means controlled by said integral digits for generating a second signal in accordance with the sum of all digits of lower binary order than the order of the applied signal, whereby said first signal varies in accordance with the characteristic and said second signal varies approximately in accordance with the mantissa of the logarithm to the base 2 of the applied signal.

5. A logarithm deviation generator, comprising, in combination, a plurality of relays, means for energizing said relays in a first binary code combination, a plurality of output circuits, and means controlled by said relays for energizing said output circuits in a binary code sequence in accordance with the difference between said first binary code combination and the mantissa of the logarithm to the base 2 of 1 followed by a binary point followed by said first binary code combination.

6. An anti-logarithm generator, comprising, in combination, an ordered array of output circuits, means controlled by the integral digits of an applied binary code sequence including integral and fractional digits for energizing a first of said output circuits selected in accordance with the sum of said integral digits, and means controlled by said integral digits for applying the fractional digits to the lower ordered remainder of said array of circuits adjacent said selected circuit.

7. An anti-logarithm generator, comprising, in combination, a subtracter for producing a binary output in accordance with the difference between two applied inputs, an anti-logarithm deviation generator for generating an output binary sequence in accordance with the difference between the mantissa of a logarithm to the base 2 of a number and sequence of binary digits of the number of lower order than the highest order 1, means for applying a binary code signal in accordance with the mantissa of a logarithm to the base 2 to said anti-logarithm deviation generator, means for applying the output of said deviation generator as the subtrahend to said subtracter, means for applying said logarithm as the minuend to said subtracter, an ordered array of output circuits, first means controlled by the sum of the integral digits of the output of said subtracter for energizing one of said array selected in accordance with said sum, and second means controlled by the sum of said integral digits for applying the fractional digits of the output of said subtracter to the remainder of said array of circuits ordered lower than said selected circuits.

8. In apparatus for translating decimal binary code to weighted binary code, in combination, adder means for producing an output in accordance with the sum of two applied inputs, means for applying the decimal units digits of a decimal binary code as one input to said adder, four register relays, means for applying each of the decimal tens digits of a decimal binary code to one of said relays, and means controlled by said relays for applying the binary equivalent of said decimal tens digits as the second input to said adder, whereby the output of said adder varies in accordance with the binary equivalent of said decimal units and tens digits of the applied decimal binary code.

9. A binary digit adder module, comprising, in combination, a relay having first and second coils and contact means operated from a first to a second condition when only one of said coils is energized, first and second circuit means for energizing said first and second coils, respectively, third and fourth circuit means for producing when energized a previous-carry and a no-previous-carry signal, respectively, a carry circuit, means controlled by said third circuit means in its energized condition and said contact means in its second condition for energizing said carry circuit, means controlled by said first circuit means when energized and said contact means in its first condition for energizing said carry circuit, a no-carry circuit, means controlled by said no-previous-carry circuit when energized and said contact means in its second condition for energizing said no-carry circuit, fifth circuit means, means for energizing said fifth circuit means when and only when said first circuit means is deenergized, means controlled by said fifth circuit means when energized and said contact means in its first condition for energizing said no-carry circuit, a sum circuit, means controlled by said previous-carry circuit when energized and said contact means in its first condition for energizing said sum circuit, and means controlled by said no-previous-carry circuit when energized and said contact means in its second condition for energizing said sum circuit.

10. A binary digit subtracter module, comprising, in combination, a double coil relay having contact means actuated from a first condition to a second condition when and only when only one of said coils is energized, first and second means for energizing the first and second relay coils, respectively, when energized, in accordance with a minuend digit and a subtrahend digit, respectively, a previous-borrow circuit adapted to be energized, a no-previous-borrow circuit adapted to be energized, a borrow circuit, means controlled by said second means when energized and said contact means in its second condition for energizing said borrow circuit, means controlled by said previous-borrow circuit when energized and said contact means in its first condition for energizing said borrow circuit, a no-borrow circuit, means controlled by said no-previous-borrow circuit when energized and said contact means in its first condition for energizing said no-borrow circuit, means controlled by said first means when energized and said contact means in its second condition for energizing said no-borrow circuit, a difference circuit, means controlled by said previous-borrow circuit when energized and said contact means in its first condition for energizing said difference circuit, and means controlled by said no-previous-borrow circuit when energized and said contact means in its second condition for energizng said difference circuit.

11. An anti-log deviation generator, comprising, in combination, an ordered array of control devices having energized and deenergized conditions, means for energizing ones of said devices selected in a binary code combination, an ordered array of output terminals, and means controlled by said control devices for energizing said output terminals in a binary code sequence B ordered as the difference between said code combination and the binary anti-logarithm to the base 2 of said binary code combination less one.

12. A computer for computing a function comprising a product of even integral or fractional powers of a plurality of numbers greater than 1, comprising, in combination, a source of signals representing each number in a weighted binary sequence, means controlled by each source for generating an integral binary sequence having a value in accordance with the order of the corresponding sequence, means controlled by each source for generating mantissa signals in a binary sequence corresponding to the source sequence below the highest ordered digit of the source sequence, means for adding integral sequences and mantissa signal sequences of common powers in said function to produce a first series of sums, means for adding said sums off register by their power differences in said function to produce a function logarithm sequence having an integral part and a fractional part, means controlled by said integral part for generating an anti-logarithm sequence of 1 plus said fractional part, and means controlled by said integral part for registering said anti-logarithm sequence in accordance with the order of magnitude of said function.

13. Apparatus for computing fluid flow in response to orifice data supplied in binary digital code, comprising, in combination, first, second and third means controlled by an applied binary sequence for producing a binary sequence in accordance with the logarithm of the applied sequence, means for applying a differential pressure sequence to said first means, means for applying a static pressure sequence to said second means, means for applying an orifice coefficient sequence to said third means, first adder means for producing a binary sum sequence in response to two applied binary sequences, means for applying the output sequences of said first and second means to said first adder means, second adder means for producing a binary sum sequence in response to two applied binary sequences, means for applying the output sequences of said third means and said first adder means to said second adder means, and means controlled by said second adder means for producing a binary sequence in accordance with the anti-logarithm of its output sequence.

14. Apparatus of the class described, comprising, in combination, a plurality of input terminals adapted to be energized in a weighted binary code sequence having at least an integral part, a first plurality of output terminals, means controlled by ones of said terminals energized in said integral part of said sequence for energizing said first output terminals in a code sequence in accordance with the order of said integral part, a second plurality of output terminals, means controlled by energized ones of all of said terminals for applying the sequence of said input terminals of lower order than the highest ordered energized terminal to said second plurality of output terminals, means controlled by said second plurality of terminals for producing a binary sequence in accordance with the difference between the sequence on said second terminals and the mantissa of the logarithm of said input terminal sequence, adder means, and means controlled by said output terminals and said difference sequence producing means for controlling said adder to produce a sum sequence in accordance with the logarithm of said input sequence.

15. In combination, means for generating a plurality of binary signals representing the digits of the characteristic and mantissa of a binary logarithm to the base 2 of a number, means controlled by said mantissa digit signals for generating a plurality of binary deviation signals representing the difference between said mantissa digit signals and the sequence of digits in the binary representation of said number below the highest ordered 1 in said representation, means controlled by said deviation signals and said mantissa signals for producing an output binary signal sequence in accordance with the difference therebetween, an ordered plurality of output terminals, means controlled by said characteristic signals for energizing one of said output terminals ordered in accordance with the sum of said characteristic signals, and means controlled by said characteristic signals for applying said output signal sequence to the lower ordered remainder of said output terminals.

16. In combination, a plurality of constant subtraction means for generating a binary digit signal sequence in accordance with the difference between a constant digit sequence and an applied binary signal sequence, the constant digit sequences for said subtraction means representing progressively larger numbers, register means for applying a binary signal sequence to said subtraction means in parallel, and means controlled by said register means for producing an output signal sequence in accordance with one of said subtraction means selected in accordance with the magnitude of said applied sequence.

17. Apparatus of the class described, comprising, in combination, means for producing a first binary signal sequence in decimal binary code divided into first, second and third subsequences representing the tenths, units and tens decimal digits, respectively, of a number, a first group of relays, means controlled by said first sequence producing means for energizing said first group of relays in a combination in accordance with said first subsequence, means controlled by said first relays for generating a weighted binary sequence corresponding to the decimal tenths digit of said number, a second group of relays, means controlled by said first sequence producing means for energizing said second group of relays in a combination in accordance with said third subsequence, means controlled by said second relays for generating a weighted binary sequence in accordance with the tens digit of said number, adder means for generating a weighted binary sequence in accordance with the sum of two applied binary sequences, and means controlled by said first sequence producing means and said second relays for applying said second subsequence and said binary tens digit sequence to said adder means to produce a binary sequence in accordance with the binary translation of the tens and units decimal digits of said number.

18. A binary adder, comprising, in combination, a plurality of differential relays each having a pair of control circuits, said relays being actuated when either control circuit is energized and unactuated when neither control circuit or both control circuits are energized, a first ordered plurality of terminals adapted to be energized in accordance with the truth values of a first series of digits representing a first number in weighted binary code, a second ordered plurality of terminals adapted to be energized in accordance with the truth values of a second series of digits representing a second number in weighted binary code, a third ordered plurality of terminals adapted to be energized in accordance with the negative truth value of said second series of digits, means for energizing one control circuit of each relay in accordance with the energized or deenergized condition of one of said first terminals, means for energizing the other control circuit of each relay in accordance with the energized or deenergized condition of one of said second terminals of the same order as the corresponding first terminal, a plurality of contacts actuated by said relays, a fourth ordered group of terminals, and circuit means controlled by said contacts and said third terminals for energizing said fourth terminals in a binary code sequence in accordance with the sum of said numbers.

19. Apparatus for generating a binary sequence B in response to an applied binary sequence $A+B$, where $1+A=2^{A+B}$, comprising, in combination, a plurality of relays, a plurality of contacts controlled by said relays, a plurality of terminals, means for energizing said relays in a binary combination $A+B$, and circuit means controlled by said contacts for energizing said terminals in the binary combination B.

20. Code translation means, comprising, in combination, a source of decimal binary code tens, units and tenths signals representing the tens, units and tenths decimal digits of a number, first translation means controlled by said tenths signals for generating a binary sequence in accordance with the sum of fractional binary digits of said number and a fractional constant, means controlled by said first translation means for generating a carry signal when said sum is 1 or larger, second translation means controlled by said tens signals for generating a binary sequence signal in accordance with the binary translation of said tens signals, adder means controlled by said second translation means, said carry signal, and said units signals for generating a binary sequence in accordance with the sum of the binary digits of said tens and units decimal digits, an integral constant, and the truth value of said carry signal.

21. A multiplier, comprising, in combination, a first register adapted to be energized in a first binary sequence representing a first number, a second register adapted to be energized in a second binary sequence representing a second number, a first adder, means for connecting said registers to said first adder to add the binary sequences following the highest 1's in said registered sequences, means controlled by each register for generating a binary sequence corresponding to the order of the highest 1 in the register, second adder means controlled by said generating means for adding said order sequences to produce an output sequence characteristic of the order of the product of said numbers, and third register means controlled by said adders for generating a sequence corresponding to one plus said first adder output and ordered in accordance with said second adder output which corresponds to the product of said numbers.

22. A multiplier, comprising, in combination, first and second sources of binary digits signals representing first and second numbers, respectively, means controlled by said signals for generating a characteristic signal corresponding to the sum of the binary orders of said signals, means controlled by said signals for producing a binary sequence of signals in accordance with the sum of the digit signals except the highest ordered signals for each source, register means having an ordered array of output terminals, means controlled by said characteristic signal for generating a 1 signal on a selective terminal of said register ordered in accordance with said characteristic signal, and means controlled by said characteristic signal for connecting said binary sequence signals in order to the remaining terminals of said register of lower order than said selected terminal.

23. A multiplier, comprising, in combination, a pair of sources of binary signals each representing a number, means controlled by each source for generating a binary signal in accordance with the characteristic of the binary logarithm of the number represented by that source, means controlled by each source for generating a binary signal in accordance with the mantissa of the binary logarithm of the number represented by that source, means for adding said characteristic and mantissa signals to produce a product logarithm signal, and means controlled by said adding means for generating an anti-logarithm signal in accordance with the product of said numbers.

24. A digital binary divider, comprising, in combination, means controlled by binary digit signal sequences representing first numbers for generating a first output signal in accordance with the difference between the binary orders thereof, means controlled by said signals for generating a second output signal in accordance with the difference between the digits following the highest ordered 1's in said sequences, means controlled by said first output signal and said second output signal for generating a quotient signal sequence in accordance with 1 followed by the digit sequence of said second output signal, and means controlled by said first output signal for indicating the order of said quotient signal sequence.

25. Apparatus for computing flow Q from the equation $Q=CN\sqrt{DS}$, where C is an orifice constant of an orifice in a flow channel, N is the number of flow channels, D is the differential pressure across the orifice, and S is the static pressure in the channel, comprising, means for generating a binary signal for each of the parameters, means controlled by said binary signals for generating signals in accordance with the logarithm of each parameter signal, first means for adding the D and S logarithm signals, second means for adding the C and N signals, third adder means connected in register to said second means and off register to said first means to produce an output signal in accordance with log $CN\sqrt{DS}$, and anti-logarithm generating means controlled by said third adder means for generating an anti-logarithm signal in accordance with Q.

26. In computing apparatus for computing the value of the product of a first number with the square root of a second number, means adjustable in accordance with the numbers for adding the binary sequences following the highest 1 in the binary representations of the numbers with each digit of the first number added to the next higher ordered digit of the first number, means adjustable in accordance with the order of the numbers for producing a signal in accordance with the sum of the order of the first number and one-half the order of the second number, and means controlled by said signal and said adding means for indicating 1 plus said sequence sum registered in accordance with said order sum.

27. A digital logarithm generator, comprising, in combination, a source of parallel digit signals representing a number in weighted binary code, first means controlled by said signals for generating a series of parallel digits signals representing the order of said first signals in binary code, second means controlled by said signals for generating the series of parallel digit signals corresponding to the digits following the highest ordered 1 in the source signals, third means controlled by said second means signals for generating a series of parallel digit signals corresponding to the difference between said last mentioned signals and the digit sequence of the mantissa of the logarithm to the base 2 of the number, and means for adding the outputs of said first, second and third means.

References Cited in the file of this patent

UNITED STATES PATENTS

| | | |
|---|---|---|
| 1,471,100 | Cherry | Oct. 16, 1923 |
| 2,318,591 | Couffignal | May 11, 1943 |
| 2,364,540 | Luhn | Dec. 5, 1944 |
| 2,428,811 | Rajchman | Oct. 14, 1947 |
| 2,444,042 | Hartley et al. | June 29, 1948 |
| 2,679,977 | Andrews | June 1, 1954 |
| 2,784,907 | Williams et al. | Mar. 12, 1957 |
| 2,803,401 | Nelson | Aug. 20, 1957 |
| 2,898,042 | Womersley et al. | Aug. 4, 1959 |
| 2,934,754 | Jackel | Apr. 26, 1960 |

OTHER REFERENCES

Bird: Computing Machines Input and Output, Electronic Engineering (October 1953) pp. 407 to 410.

Cohen: The Role of General Purposes Digital Computers in Automatic Control and Information Systems, I.R.E. Convention Record, Part IV (March 1954), pp. 82 to 86, p. 83 relied on.